(12) United States Patent
Inoue et al.

(10) Patent No.: US 6,227,109 B1
(45) Date of Patent: May 8, 2001

(54) MULTICOLOR PRINTING APPARATUS WITH HORIZONTALLY ROTATABLE DISCHARGE STATION

(75) Inventors: Yoshinori Inoue; Michio Yamasaki, both of Otsu; Hiroaki Iwai, Kyoto, all of (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 09/197,489

(22) Filed: Nov. 23, 1998

Related U.S. Application Data

(63) Continuation-in-part of application No. PCT/JP98/01281, filed on Mar. 24, 1998.

(30) Foreign Application Priority Data

| Mar. 24, 1997 | (JP) | ................................................ 9-069637 |
| Apr. 25, 1997 | (JP) | ................................................ 9-109375 |
| May 21, 1997 | (JP) | ................................................ 9-130990 |
| Jul. 16, 1997 | (JP) | ................................................ 9-191491 |

(51) Int. Cl.[7] .................. B41F 5/16; B41F 5/18; B41F 7/02; B41F 5/02; B41F 13/64

(52) U.S. Cl. .................. 101/177; 101/183; 101/217; 101/231; 101/240; 101/229

(58) Field of Search .................. 101/174, 177, 101/183, 206, 207, 217, 229, 231, 232, 240, 350.5, 424.1

(56) References Cited

U.S. PATENT DOCUMENTS

| 1,137,859 | * | 5/1915 | Hodgman . | |
| 1,481,783 | * | 1/1924 | Meisel . | |
| 3,037,451 | * | 6/1962 | Davis | 101/350 |
| 3,570,398 | * | 3/1971 | Mowry | 101/183 |
| 4,141,293 | | 2/1979 | Corse | 101/181 |
| 4,280,406 | | 7/1981 | Corse | 101/177 |
| 4,854,232 | * | 8/1989 | Oda | 101/211 |
| 5,062,359 | * | 11/1991 | Giori | 101/175 |
| 5,069,437 | * | 12/1991 | Ishikawa | 271/3.1 |
| 5,094,933 | | 3/1992 | Uhrig | 430/300 |
| 5,339,731 | * | 8/1994 | Howard et al. | 101/174 |
| 5,339,737 | | 8/1994 | Lewis et al. | 101/454 |
| 5,447,303 | * | 9/1995 | Smith | 217/291 |
| 5,448,348 | * | 9/1995 | Azeta | 355/319 |
| 5,603,262 | * | 2/1997 | Uera et al. | 101/350 |
| 5,797,324 | * | 8/1998 | Schoppe et al. | 101/424.1 |
| 5,909,708 | * | 6/1999 | Bolza-Schunemann | 101/177 |

FOREIGN PATENT DOCUMENTS

| 19523378 | 6/1995 | (DE) . |
| 564212 | 12/1923 | (FR) . |
| 54-152504 | 11/1979 | (JP) . |
| 55-28860 | 7/1980 | (JP) . |
| 56-76438 | 6/1981 | (JP) . |
| 57-140167 | 8/1982 | (JP) . |
| 57-178872 | 11/1982 | (JP) . |
| 61-179741 | 8/1986 | (JP) . |
| 63-179745 | 7/1988 | (JP) . |
| 63-239056 | 10/1988 | (JP) . |

(List continued on next page.)

Primary Examiner—Kimberly Asher
(74) Attorney, Agent, or Firm—Morgan, Lewis & Bockius LLP

(57) ABSTRACT

A printing apparatus (1001) having a plurality of blanket cylinders (1051 to 1054) normally-contacting to impression cylinders (1031, 1032), plate cylinders (1041 to 1044) normally-contacting to the respective blanket cylinders, and a ink coating apparatus (1061 to 1064), a printing apparatus, an imaging apparatus, an imaging method, an imaging medium, a printing system, and a printing method. In the printing apparatus (1001), a plurality of ink coating apparatus (1061 to 1064) is arranged in a substantially gravity direction, a feeding apparatus (1020) of sheets of recording mediums to the printing apparatus and a discharging apparatus (1070) are provided at a side opposite to a setting side of the ink coating apparatus with respect to the blanket cylinders. The printing apparatus can execute a back face printing easily, and has good workability.

3 Claims, 34 Drawing Sheets

FOREIGN PATENT DOCUMENTS

| | | |
|---|---|---|
| 63-302049 | 12/1988 | (JP) . |
| 3-24549 | 2/1991 | (JP) . |
| 3-114836 | 5/1991 | (JP) . |
| 3-71983 | 11/1991 | (JP) . |
| 3-293133 | 12/1991 | (JP) . |
| 04105941 | 4/1992 | (JP) . |
| 4-68147 | 10/1992 | (JP) . |
| 4-334452 | 11/1992 | (JP) . |
| 5-8366 | 1/1993 | (JP) . |
| 5-237997 | 9/1993 | (JP) . |
| 5-301335 | 11/1993 | (JP) . |
| 6-64151 | 3/1994 | (JP) . |
| 8-72311 | 3/1996 | (JP) . |
| WO 95/25015 * | 9/1995 | (WO) ................. 101/172 |

* cited by examiner (a) IDEAL CASE (b) CASE WHEN SCANNING DIRECTION
OF BEAM IRRADIATION APPARATUS (c) CASE WHEN SCANNING DIRECTION
OF BEAM IRRADIATION APPARATUS

MULTICOLOR PRINTING APPARATUS WITH HORIZONTALLY ROTATABLE DISCHARGE STATION

This is a continuation-in-part application of PCT International Application number PCT/JP98/01281 filed Mar. 24, 1998 designating the United States for the national phase.

TECHNICAL FIELD

The present invention relates to a coating apparatus, a printing apparatus, an imaging apparatus, an imaging method, an imaging medium, a printing system, and a printing method.

BACKGROUND ART

As a technique of this type of printing apparatus, there are known the techniques disclosed in, for example, Unexamined Japanese Patent Publication No. 54-152504 (corresponding to U.S. Pat. No. 4,280,406), Examined Japanese Patent Publication No. 55-28860 (corresponding to U.S. Pat. No. 4,141,293), and Examined Japanese Patent Publication No. 3-71983. All of the above mentioned publications are incorporated by reference.

In the printing apparatus of Unexamined Japanese Patent Publication No. 54-152504, as shown in FIG. 29, plate cylinders 1041 to 1044 and blanket cylinders 1051 to 1054, which were positioned at an ink coating apparatus setting side separately from a feeding side for web paper and a discharging side for paper cut into sheets, were arranged in the same frame to be slidably drawn. This resulted in easy plate replacements, and easy change of a print format, and operability of the printing apparatus was improved.

In Examined Japanese Patent Publication No. 55-28860, as shown in FIG. 30, in order to carry out multicolor printing on continuous paper, a plurality of print units was vertically arranged, thereby reducing a setting floor area for the printing apparatus. Also, the ink coating apparatus were provided on the same side, so that easy plate replacements were achieved. In the printing apparatus of Examined Japanese Patent Publication No.3-71983, as shown in FIG. 31, spaces for setting dampening water apparatuses are omitted by use of waterless plates. Instead, a plate feed and discharge device was provided to the omitted space for each plate cylinder so as to improve operability.

As a technique of the coating apparatus used in these printing apparatus, there are known the techniques disclosed in, for example, Unexamined Japanese Patent Publication No. 57-178872, Unexamined Japanese Utility Model Publication No. 56-76438, and Examined Japanese Patent Publication No.4-68147. These techniques are used as an ink coating technique for the printing apparatus, and frequently employed mainly in waterless lithographic printing, a letterpress printing, etc. In particular, Examined Japanese Patent Publication No. 4-68147 disclosed a coating apparatus having a coating roller with an elastic surface, and a doctor blade, which freely moved back and forth to the outer peripheral surface of the coating roller and controlled a thickness of a coated ink film to be formed on the outer peripheral surface. This was an extremely useful coating technique when ink having high viscosity was used.

The feature of the techniques used in these coating apparatus is that the doctor blade is used as a method for setting the thickness of the ink film to be applied onto the coating roller. For example, in the technique of Examined Japanese Patent Publication No. 4-68147, as shown in FIG. 32, an ink unit 1002, serving as an ink coating apparatus, comprises a form roller 1201, a doctor blade 1202, an eccentric cam 1203 for controlling the movement of the doctor blade, ink distributing rollers 1210, 1211, and an auxiliary form roller 1212 having an elastic surface. The form roller 1201, the doctor blade 1202, side plates 1207 and 1208, which are arranged at both sides of the form roller 1201 in its axial direction, and an ink fountain 1206 form an ink fountain space 1205, which is filled with printing ink i.

A small gear (not shown) rotating solidly with the form roller 1201 is engaged with a large gear (not shown) rotating solidly with a plate cylinder 1015. Thus, the form roller 1201 and the plate cylinder 1015 are synchronized with each other and rotated at the same circumferential speed at their contact section.

The ink unit 1002 is configured so that the eccentric cam 1203 attached to a shaft 1204 is rotated so as to move the doctor blade 1202 back and fourth in a direction of an arrow A, thereby changing the engagement between the doctor blade 1202 and the form roller 1201 in order to control the thickness of the coated ink film formed on the outer periphery of the form roller 1201.

Conventionally, a printing plate, serving as an imaging medium used in such a printing apparatus, has been generally manufactured by a photomechanical process in which a lith type film (lithographic film) for plate-making is applied to a PS plate (presensitized plate or the like). Since the plate-making apparatus and the printing apparatus are normally independent devices, the positioning of the imaging medium of each color in the multicolor printing is carried out by the following process.

At the outset register marks were drawn on the imaging medium for each color. Then, the imaging medium for each color was installed around each plate cylinder of the printing apparatus. Ink was fed to the imaging medium of each color, and printing was performed on a recording medium such as paper. Then, the positions of the imaging mediums of the respective colors in the printing apparatus and the print timing were adjusted until the positions of the register marks printed on the recording mediums of the respective colors coincided with each other. Thus the mutual positions of the imaging mediums of the respective colors were determined.

In recent years, there has been increased the use of the imaging apparatus for making the printing plate, which serves as the imaging medium, based on digital imaging information in accordance with imaging data. As an imaging medium fixing method in these imaging apparatuses, there are known techniques disclosed in Unexamined Japanese Patent Publication No.3-24549 (corresponding to U.S. Pat. No. 5,094,933) and Unexamined Japanese Patent Publication No. 5-8366, which are incorporated by reference.

In the apparatus of Unexamined Japanese Patent Publication No. 3-24549, as shown in FIG. 33, after imaging on a web imaging medium, the imaging medium is cut to a predetermined size, developed and carried by a transfer roller or a conveyor belt.

In Unexamined Japanese Patent Publication No. 5-8366, as shown in FIG. 34, the imaging medium is wound around an attaching member and rotated, and imaging is executed by irradiation of an energy beam. The imaging medium is fixed to the plate cylinders with flat-headed screws, or adhered thereto with adhesive.

As a technique in which the imaging medium is wound around an attaching member and rotated, and imaging is executed by irradiation of the energy beam, the imaging apparatus disclosed in Unexamined Japanese Patent Publication No. 5-8366 was configured as described as follows.

That is, the attaching member to which the imaging medium was attached was rotated and the energy beam scans in a circumferential direction of the imaging medium. Also, the laser block having a semiconductor laser is scanned in the axial direction of the attaching member by use of a ball screw.

The shaft of the attaching member and the ball screw are arranged to be parallel with the axial direction of the attaching member. The scanning in the axial direction is executed for each scanning in the circumferential direction while the attaching member is rotated. The scanning is performed over the entire surface of the imaging medium thereby imaging is executed.

The imaging apparatus disclosed in Unexamined Japanese Patent Publication No. 8-72311 is configured as follows.

That is, as shown in FIG. 35, the imaging medium, which is wound around the attaching member and rotates, is irradiated with the energy beam from a plurality of recording heads having a plurality of energy beam irradiation sources, so as to execute imaging. The imaging medium, which is wound around the attaching member and rotates, is scanned in the circumferential direction by its rotation and simultaneously, the recording heads are scanned in the axial direction of the attaching member by a linear motor, etc. Therefore, the rotation shaft of the attaching member and a carriage apparatus such as a linear motor, which scans the plurality of recording heads in the axial direction of the attaching member, are arranged in parallel with respect to the axial direction of the attaching member.

The energy beam irradiation position is determined by detecting means for detecting the position of a beam spot light of the energy beam and means for correcting the irradiation position of the beam spot light to the attaching member based on the output from the detecting means.

In the printing apparatus of Unexamined Japanese Patent Publication No. 54-152504 shown in FIG. 29, there was a problem in that it was impossible to carry out a back face printing after feeding a sheet of paper. When the interval between grippers for gripping paper on an impression cylinder 1031 in the circumferential direction is shorter than a length of the sheet of paper to be printed in the progress direction the paper is sandwiched between the pressure cylinder 1031 and blanket cylinders at two portions simultaneously so that the paper is suffered some tension. As a result, the printing position may shift, which is a problem. Moreover, if the interval between the grippers for gripping paper is increased in order to solve the problem, the ink coating apparatuses could not be arranged for three or more color printing, which is also a problem.

On the other hand, if the impression cylinder 1031 is enlarged in order to arrange the ink coating apparatus, the diameter of the impression cylinder 1031 becomes too large, and the entire printing apparatus must be enlarged. As a result, a large setting space for such a printing apparatus was required and the cost of the impression cylinder 1031 was increased, so that the printing apparatus became expensive.

The method disclosed in Examined Japanese Patent Publication No. 55-28860 was limited to the printing apparatus using continuous webs, and could not be applied to the printing apparatus using sheets of paper. In the technique disclosed in Examined Japanese Patent Publication No. 3-71983, since one blanket cylinder was shared by two ink coating apparatus, there occurred a problem in which process color printing could not be carried out. Also, since one blanket cylinder was shared by two ink coating apparatus, the distance of the ink coating apparatus could not be increased due to the structure of the printing apparatus, so that workability of plate replacements became worse. In the technique disclosed in Examined Japanese Patent Publication No. 3-71983, a plate feeding and discharging apparatus was used to improve workability. Though the plate was easily replaced by use of the plate feeding and discharging apparatus, there occurred a problem in which the printing apparatus became expensive.

In the ink coating apparatus disclosed in Examined Japanese Patent Publication No. 4-68147, there was a problem in which striped defects were generated in the circumferential direction of the surface of the coated ink film because of paper dust clogged at the doctor blade portion as shown in FIG. 6. In other words, when the doctor blade portion is clogged with paper dust, a form roller 1201 bends at the clogging portion and escapes therefrom. Since the thickness of the ink layer of this portion is increased and the portion between the doctor blade 1202 and the form roller 1201 is clogged with paper dust, striped defects 1252 are generated in an ink layer in the circumferential direction.

Since the defects were left in the ink layer on the coating roller as a deep groove, such troublesome defects could not be easily eliminated even if the distributing roller is simply used.

In the imaging apparatus disclosed in Unexamined Japanese Patent Publication No. 3-24549, the printing plate, which is the imaging medium exposed and developed, is cut by a built-in cutting apparatus, thereafter the printing plate is automatically on the imaging apparatus. According to such the imaging apparatus, the positioning of the mutual printing positions of imaging mediums of the respective colors was not accurately made in the multicolor printing apparatus. As a result, there was a problem in which the mutual printing positions of imaging mediums of the respective colors had to be adjusted again before continuous printing was executed.

Unexamined Japanese Patent Publication No. 5-8366 describes a method in which the imaging medium is fixed to the plate cylinder with a flat-headed screw, or adhered thereto with adhesive. However, the positioning of the imaging medium and that of the print pattern cannot be accurately made. Moreover, this publication describes no specific method other than the positioning of the imaging medium and that of the print pattern. Therefore, in the imaging medium prepared by the apparatus as described in Unexamined Japanese Patent Publication No. 5-8366, there was no other way than the aforementioned method of positioning the register marks in connection with the positioning method at attaching of the imaging medium to the printing apparatus.

On the other hand, the printing apparatus having a laser head for imaging is known. In this apparatus, imaging is executed after imaging medium is wound around the plate cylinder, and ink is directly fed and printing is executed. In this apparatus, if the positional relationship between the plate cylinder and the imaging head are made to completely corresponding to each other for each color, the positioning of the imaging medium can be omitted or largely simplified at the printing time.

However, the above printing apparatus can neither perform imaging during the printing and nor print during the imaging when the imaging head is provided therein. It cannot avoid a decrease in productivity as a printing apparatus or independent apparatus. In addition, since the imaging head occupies most of the manufacturing cost of the imaging apparatus. If the head is provided for each plate cylinder of each color, the manufacturing cost of the entire apparatus is largely increased. One imaging apparatus is not necessary for one printing apparatus. Generally, imaging mediums to be used for many printing apparatus are made by one imaging apparatus. As compared with the case in which the printing apparatus and the imaging apparatus are separately provided as a different structure the structure in which the imaging apparatus is provided in the printing apparatus as in the above-mentioned apparatus has demerits in terms of productivity and the manufacturing cost.

As explained above, the mutual positioning of the image patterns for the respective colors in the multicolor printing was performed as the follows. That is, the positioning was made by adjusting the position of the plates in the printing apparatus and the timing such that the positions of the register marks printed on the recording mediums for the respective colors were coincide with each other.

Hence, simple installing of the imaging medium S which were directly prepared by the imaging apparatus to the printing apparatus cannot achieve accurate positioning of the imaging mediums.

Moreover, there has been no imaging apparatus in which some contrivance was added to a positioning hole size, which was necessary for adjusting the positions of the imaging mediums, and chamfering of end portions of the imaging mediums for another reason. Moreover, there was no imaging apparatus in which the imaging medium attaching member was subjected to a surface coating process to improve accuracy of attaching the imaging medium to the imaging apparatus.

In the configuration that a beam irradiation apparatus having a plurality of beam irradiation sources is continuously scanned in the direction of a rotation axis of the attaching member at a fixed speed as continuously rotating the attaching member around which the imaging medium is wound at a fixed speed, there was a problem in which the image was obliquely formed with respect to a reference direction of an original imaging area of the imaging medium.

In the imaging apparatus as shown in FIG. 34, the imaging medium is rotated in a direction of an arrow R (rotational direction of the attaching member) at peripheral speed Vr, and that the beam irradiation apparatus is scanned in a direction of an arrow S (direction of a rotation axis of the attaching member) at feeding speed Vy. As shown in FIG. 27A, it would be ideal if imaging dots 2092 formed in an imaging area 2091 of an imaging medium 2018 would be arranged in a matrix form of rectangle along an arrow direction 93 of the imaging area 2091.

However, in the imaging apparatus as shown in FIG. 34, since the beam irradiation apparatus is scanned in the direction of the rotation axis of the attaching member as rotating the attaching member, if the imaging medium 2018 is fixed to a plate cylinder 2011, serving as the attaching member, such that the reference direction of the imaging area is parallel to the rotation axis of the plate cylinder 2011, and the scanning direction of the beam irradiation apparatus completely coincide with the direction of an arrow S ($\theta=0$ in FIGS. 27A to 27C), there occurred a problem in which the imaging dots 2092 were deformed to be a parallelogram as shown in FIGS. 27B and 27C.

A first object of the present invention is to provide a multicolor printing apparatus in which the disadvantages of the prior art can be improved in that a back face printing can be easily carried out, and a good workability can be obtained.

A second object of the present invention is to provide a multicolor printing apparatus in which a good printing quality can be obtained, no large space is necessary for setting a printing apparatus, and a manufacturing cost is reasonable.

A third object of the present invention is to provide an duplex printing method for providing a good printing quality at a small space easily.

A fourth object of the present invention is to provide a coating apparatus in which disadvantages of the prior art can be improved and striped defects are not easily generated in the circumferential direction of the surface of the coated ink film because of paper dust even when ink having high viscosity is coated.

A fifth object of the present invention is to provide an imaging apparatus in which the disadvantages of the prior art can be improved in that the positioning of the printing position at printing in that can be easily realized in a state that an imaging apparatus and a printing apparatus are maintained as independent structures, and provide a printing apparatus and printing system, and an imaging method, and a printing method.

A sixth object of the present invention is to provide an imaging apparatus with a reasonable cost in which disadvantages of the prior art can be improved in that an image can be formed without having an inclination with respect to the imaging medium, the positioning of the imaging medium at an imaging time can be easily carried out where an imaging apparatus and a printing apparatus are independent structures, and an inclination of the image position in the imaging medium can be restrained and corrected, so that the positioning of printing plate in a printing apparatus can be easily carried out, and provide an imaging method and a printing system.

DISCLOSURE OF INVENTION

According to the present invention, there is provided a multicolor printing apparatus including a printing apparatus comprising a plurality of blanket cylinders normally-contacting to a impression cylinder plate cylinders normally-contacting to the respective blanket cylinders; and ink coating apparatus for coating the respective plate cylinders with ink, wherein the ink coating apparatus are arranged substantially in a direction of gravity, a feeding apparatus for feeding sheets of recording mediums to the printing apparatus and a discharging apparatus for discharging sheets of recording mediums are provided on a side opposite to a setting side of the ink coating apparatus with respect to the blanket cylinders.

According to a preferred embodiment of the present invention, there is provided the multicolor printing apparatus wherein the number of the impression cylinder is the plural number.

According to a preferred embodiment of the present invention, there is provided the multicolor printing apparatus wherein the feeding apparatus for feeding sheets of recording mediums is positioned at a lower side than the discharging apparatus such that the sheets of recording mediums flow from a lower side to an upper side.

According to a preferred embodiment of the present invention, there is provided the multicolor printing apparatus wherein each of the ink coating apparatus comprises a coating roller with an elastic surface, and a doctor blade, structured to move back and forth freely to the outer peripheral surface of the coating roller, for controlling the thickness of coated ink film formed on the outer peripheral surface.

According to a preferred embodiment of the present invention, there is provided the multicolor printing apparatus wherein the impression cylinders are double-diametered impression cylinders, and the transfer of the recording mediums between the double-diametered impression cylinders is carried out by a triple-diametered transfer cylinder.

According to a preferred embodiment of the present invention, there is provided the multicolor printing apparatus wherein the impression cylinders are triple-diametered impression cylinders, and the transfer of the recording mediums between the triple-diametered impression cylinders is carried out by a double-diametered transfer cylinder.

According to a preferred embodiment of the present invention, there is provided the multicolor printing apparatus further comprising means for drying coloring agent on the sheets of recording mediums after discharging printed sheets of recording mediums between the final blanket cylinder and the final impression cylinder.

According to a preferred embodiment of the present invention, there is provided the multicolor printing apparatus further comprising a discharge station on which the printed sheets of recording mediums are stacked after the printed sheets of recording mediums are discharged between the final blanket cylinder and the final impression cylinder, the discharge station is configured to be horizontally rotatable, thereby the stacked printed sheets of recording mediums can be rotatable in a 180° arc with respect to the direction of a normal line.

According to a preferred embodiment of the present invention, there is provided the multicolor printing apparatus further comprising discharge station moving means for moving the discharge station to the feeding position of the recording mediums of the feeding means after the stacked printed sheets of recording mediums are rotated in a 180° arc with respect to the direction of the normal line of the recording mediums.

According to a preferred embodiment of the present invention, there is provided the multicolor printing apparatus wherein the plate cylinders will have waterless plates to be wound therearound.

According to another embodiment of the present invention, there is provided a duplex printing method, in a printing apparatus comprises a plurality of blanket cylinders normally-contacting to an impression cylinder, plate cylinders normally-contacting to the respective blanket cylinders, and ink coating apparatus, arranged in a substantially gravity direction, for coating the respective plate cylinders with ink, the duplex printing method comprising the steps of: feeding recording mediums to the blanket cylinders of the printing apparatus from a recording medium feeding position on a side opposite to a side where the ink coating apparatus are arranged; passing the sheets of recording mediums between the blanket cylinders and the impression cylinders so as to transfer an ink image onto a first surface of the recording mediums; stacking the recording mediums discharged from the opposite side on a discharge station; rotating the discharge station in a 180° arc with respect to the direction of a normal line of the recording mediums so as to feed the stacked recording mediums to the recording medium feeding position; and passing the recording mediums again between the blanket cylinders and the impression cylinder so as to transfer an ink image onto a second surface of the recording mediums.

According to the present invention, there is provided a coating apparatus comprising: a coating roller with an elastic surface; and a doctor blade, configured to move back and forth freely to the outer peripheral surface of the coating roller, for controlling the thickness of coated film formed on the outer peripheral surface; wherein the coating apparatus is provided at least one flattening member for flattening a surface of the coated film on the coating roller.

According to a preferred embodiment of the present invention, there is provided the coating apparatus wherein a plurality of flattening members for flattening the surface of the coated film is provided.

According to a preferred embodiment of the present invention, there is provided the coating apparatus wherein at least one flattening member for flattening the surface of the coated film is a blade.

According to a preferred embodiment of the present invention, there is provided the coating apparatus wherein at least one flattening member for flattening the surface of the coated film is a roller, and its peripheral speed is lower than the coating roller or its rotational direction is the same as the coating roller.

According to a preferred embodiment of the present invention, there is provided the coating apparatus wherein at least one flattening member for flattening the surface of the coated film is positioned at an upstream side of the doctor blade with respect to the direction where the coating roller progresses.

According to a preferred embodiment of the present invention, there is provided the coating apparatus wherein at least one flattening member for flattening the surface of the coated film is positioned at a downstream side of the doctor blade with respect to the direction where the coating roller progresses on a coating surface.

According to a preferred embodiment of the present invention, there is provided the coating apparatus wherein at least one flattening member for flattening the surface of the coated film is a blade, front edges of leading sides of the doctor blade and the blade as the flattening member, are formed to be curved, and the radius of curvature of the doctor blade is the same as that of the flattening blade or larger than that of the flattening blade.

According to a preferred embodiment of the present invention, there is provided the coating apparatus, further comprising: an auxiliary coating roller provided at each of the upstream and downstream sides of the coating roller to the direction where the surface to be coated by the coating roller progresses; and ink distributing rollers, provided between the coating roller and the auxiliary coating rollers, contacting the coating roller and the auxiliary coating roller simultaneously and oscillating in the axial direction.

According to another embodiment of the present invention, there is provided a printing apparatus comprising: a coating apparatus and plate cylinders around which printing plates for receiving ink supply from the coating apparatus are wound.

According to another embodiment of the present invention, there is provided a coating apparatus comprising: a coating roller with an elastic surface; and a doctor blade, configured to move back and forth freely to an outer peripheral surface of the coating roller, for controlling the thickness of coated film formed on the outer peripheral surface; wherein the coating apparatus is provided at least one auxiliary coating roller provided at each of the upstream and downstream sides of the coating roller to the direction where the surface to be coated by the coating roller progresses; and ink distributing rollers, provided between the coating roller and the auxiliary coating rollers, contacting the coating roller and the auxiliary coating rollers simultaneously and oscillating in the axial direction.

According to another embodiment of the present invention, there is provided a coating apparatus comprising: a coating roller with an elastic surface; and a doctor blade, configured to move back and forth freely to an outer peripheral surface of the coating roller, for controlling the thickness of coated film formed on the outer peripheral surface; wherein the coating apparatus is provided at least one auxiliary coating roller provided at each of the upstream and downstream sides of the coating roller to the direction where the surface to be coated by the coating roller progresses; ink distributing rollers, provided between the coating roller and the auxiliary coating rollers, contacting the coating roller and the auxiliary coating rollers simultaneously and oscillating in the axial direction; and at least one flattening member for flattening the surface of the coated film on the coating roller.

According to another embodiment of the present invention, there is provided a coating apparatus comprising: a coating roller with an elastic surface; and a doctor blade, configured to move back and forth freely to the outer peripheral surface of the coating roller, for controlling the thickness of coated film formed on the outer peripheral surface, wherein the coating roller is formed of a non-elastic rotation shaft and an elastic member having a multilayer structure in which at least an uppermost surface layer wrapping the rotation shaft is formed of polyurethane, and hardness of each elastic layer of the elastic member of the coating roller becomes higher than an inner layer as approaching to the surface layer.

According to another embodiment of the present invention, there is provided the coating apparatus wherein surface hardness of the coating roller surface layer is more than 40° of rubber hardness based on JISA.

According to the present invention, there is provided a printing system comprising: an imaging apparatus for generating a change in an imaging characteristic according to imaging data on the imaging medium by irradiation of an energy beam so as to execute imaging; and a printing apparatus for supplying ink to the imaging medium so as to execute printing on recording mediums, wherein a positioning method of the imaging medium in the printing apparatus is substantially the same as that of the imaging medium in the imaging apparatus.

According to a preferred embodiment of the present invention, there is provided the printing system wherein an fixing method of the imaging medium to the printing apparatus is substantially the same as that of the imaging medium to the imaging apparatus.

According to a preferred embodiment of the present invention, there is provided the printing system wherein both the imaging apparatus and the printing apparatus are configured such that the imaging medium is wound around plate cylinders, and the plate cylinders of the imaging apparatus and that of the printing apparatus have substantially the same configuration.

According to a preferred embodiment of the present invention, there is provided the printing system wherein the positioning method of the imaging medium in the imaging apparatus is carried out by engaging positioning holes provided in the imaging medium with positioning pins provided in the imaging apparatus.

According to a preferred embodiment of the present invention, there is provided the printing system wherein the positioning method of the imaging medium in the imaging apparatus and that of the imaging medium in the printing apparatus are carried out by abutting an abutting portion processed to a predetermined shape in the imaging medium against an abutment receiving portion of the imaging apparatus or the printing apparatus.

According to a preferred embodiment of the present invention, there is provided the printing system wherein the positioning method of the imaging medium in the imaging apparatus is carried out based on a detection result of the positioning holes provided in the imaging medium detected by positioning hole detecting means provided in the imaging apparatus.

According to a preferred embodiment of the present invention, there is provided the printing system wherein the positioning method of the imaging medium in the printing apparatus is carried out by engaging positioning holes provided in the imaging medium with positioning pins provided in the printing apparatus.

According to a preferred embodiment of the present invention, there is provided the printing system wherein the positioning method of the imaging medium in the printing apparatus is carried out based on a detection result of the positioning holes provided in the imaging medium detected by positioning hole detecting means provided in the printing apparatus.

According to a preferred embodiment of the present invention, there is provided the printing system wherein the positioning method of the imaging medium in the imaging apparatus is carried out based on a detection result of position of a register mark, formed on the imaging medium prior to imaging, detected by register mark position detecting means provided in the imaging apparatus.

According to a preferred embodiment of the present invention, there is provided the printing system wherein the positioning method of the imaging medium in the printing apparatus is carried out based on a detection result of a position of a register mark, formed on the imaging medium prior to printing, detected by register mark position detecting means provided in the printing apparatus.

According to a preferred embodiment of the present invention, there is provided the printing system, wherein a positioning method of an image on the imaging medium in the imaging apparatus is carried out based on a detection result of a position of a register mark formed on an imaging medium attaching member of the imaging apparatus detected by register mark position detecting means provided in the imaging apparatus.

According to a preferred embodiment of the present invention, there is provided the printing system wherein the positioning method of a printing position in the printing apparatus is carried out based on a detection result of a position of a register mark formed on an imaging medium attaching member of the printing apparatus detected by register mark position detecting means formed in the printing apparatus.

According to another embodiment of the present invention, there is provided a printing method comprising the steps of: positioning an imaging medium at an imaging apparatus; generating a change in an imaging characteristic according to imaging data on the imaging medium by irradiation of an energy beam so as to execute imaging; positioning the imaging medium at a printing apparatus by substantially the same positioning method as the imaging apparatus; and feeding ink to the imaging medium so as to execute printing on a recording medium.

According to another embodiment of the present invention, there is provided a printing method comprising the steps: positioning an imaging mediums at an imaging apparatus; positioning the imaging medium, on which a change in an imaging characteristic according to imaging data is generated by irradiation of an energy beam, at a printing apparatus by substantially the same positioning method as the imaging apparatus; and feeding ink to the imaging medium so as to execute printing on a recording medium.

According to another embodiment of the present invention, there is provided an imaging apparatus for generating a change in an imaging characteristic according to imaging data on an imaging medium by irradiation of an energy beam so as to execute imaging, wherein the imaging medium is positioned by substantially the same method as a printing apparatus for feeding ink onto the imaging medium imaged by the imaging apparatus so as to execute printing on a recording medium.

According to a preferred embodiment of the present invention, there is provided the imaging apparatus wherein the imaging medium is wound around plate cylinder as rotating the plate cylinder in a first rotation direction, imaging is executed in this state, and the imaging medium is detached from the plate cylinder as rotating the plate cylinder in a second rotation direction opposite to the first rotation direction.

According to another embodiment of the present invention, there is provided a printing apparatus, which uses an imaging apparatus for generating a change in an imaging characteristic according to imaging data on an imaging medium by irradiation of an energy beam so as to execute imaging, for printing on a recording medium by feeding ink onto the imaging medium imaged by the imaging apparatus, wherein the imaging medium is positioned by substantially the same method as the imaging apparatus.

According to another embodiment of the present invention, there is provided an imaging method for executing imaging using an imaging apparatus for generating a change in an imaging characteristic according to imaging data on an imaging medium by irradiation of an energy beam so as to execute imaging, wherein the imaging medium is positioned at the imaging apparatus by substantially the same method as a printing apparatus for printing on a recording medium by feeding ink onto the imaging medium imaged by the imaging apparatus.

According to another embodiment of the present invention, there is provided an imaging apparatus, which comprises a feeding apparatus for feeding an imaging medium to the imaging apparatus and a discharging apparatus for discharging the medium from the imaging apparatus on the same side, wherein the imaging medium fed from the feeding apparatus is wound around plate cylinder as rotating the plate cylinder in a first rotation direction, imaging is executed in this state, the imaging medium is detached from the plate cylinder as rotating the plate cylinder in a second rotation direction opposite to the first rotation directions so as to discharge the imaging medium by the discharging apparatus.

According to another embodiment of the present invention, there is provided an imaging apparatus, in which a positioning method of an imaging medium is carried out by engaging positioning holes provided in the imaging medium with positioning pins provided in the imaging apparatus, wherein for use of a resin film as a base material of the imaging medium, when the engagement state between the positioning holes provided in the imaging medium and the positioning pins provided in the imaging apparatus is set such that an opening diameter of each of the positioning holes is larger than an outer diameter of each of the positioning pins, the diameter difference is set to be smaller than the dot pitch, and when the engagement state is set such that the opening diameter of each of the positioning holes is smaller than the outer diameter of each of the positioning pins, the diameter difference is set to be within a range where the positioning holes are not broken by the engagement.

According to another embodiment of the present invention, there is provided a printing apparatus, in which a positioning method of an imaging medium is carried out by engaging positioning holes provided in the imaging medium with positioning pins provided in the printing apparatus, wherein for use of a resin film as a base material of the imaging medium, when the engagement state between the positioning holes provided in the imaging medium and the positioning pins provided in the imaging apparatus is set such that an opening diameter of each of the positioning holes is larger than an outer diameter of each of the positioning pins, the diameter difference is set to be smaller than the dot pitch, and when the engagement state is set such that the opening diameter of each of the positioning holes is smaller than the outer diameter of each of the positioning pins, the diameter difference is set to be within a range where the positioning holes are not broken by the engagement.

According to another embodiment of the present invention, there is provided an imaging apparatus, in which a positioning method of an imaging medium is carried out by engaging positioning holes provided in the imaging medium with positioning pins provided in the imaging apparatus, wherein for use of metal as a base material of the imaging medium, when the engagement state between the positioning holes provided on the imaging medium and the positioning pins provided in the imaging apparatus is set such that an opening diameter of each of the positioning holes is larger than an outer diameter of each of the positioning pins and the diameter difference is smaller than the dot pitch.

According to another embodiment of the present invention, there is provided a printing apparatus, in which a positioning method of an imaging medium is carried out by engaging positioning holes provided on the imaging medium with positioning pins provided in the printing apparatus, wherein for use of metal as a base material of the imaging medium, when the engagement state between the positioning holes provided in the imaging medium and the positioning pins provided in the imaging apparatus is set such that an opening diameter of each of the positioning holes is larger than an outer diameter of each of the positioning pins and the diameter difference is smaller than the dot pitch.

According to another embodiment of the present invention, there is provided the printing system, in which a positioning method of an imaging medium in the imaging apparatus is carried out by engaging positioning holes provided in the imaging medium with positioning pins provided in the imaging apparatus, wherein for use of a resin film as a base material of the imaging medium, when the engagement state between the positioning holes provided in the imaging medium and positioning pins provided in the imaging apparatus is set such that an opening diameter of each of the positioning holes is larger than an outer diameter of each of the positioning pins, the diameter difference is set to be smaller than the dot pitch, and when the engagement state is set such that the opening diameter of each of the positioning holes is smaller than the outer diameter of each of the positioning pins, the diameter difference is set to be within a range where the positioning holes are not broken by the engagement.

According to another embodiment of the present invention, there is provided the printing system, in which a positioning method of an imaging medium in the imaging apparatus is carried out by engaging positioning holes provided in the imaging medium with positioning pins provided in the imaging apparatus, wherein for use of metal as a base material of the imaging medium, when the engagement state between the positioning holes provided on the imaging medium and positioning pins provided in the imaging apparatus is set such that an opening diameter of each of the positioning holes is larger than an outer diameter of each of the positioning pins and the diameter difference is smaller than the dot pitch.

According to another embodiment of the present invention, there is provided the printing system in which a positioning method of an imaging medium in the imaging apparatus is carried out by engaging positioning holes provided in the imaging medium with positioning pins provided in the imaging apparatus, wherein at least one of the sizes, the arrangement, and the shapes of the positioning pins and the positioning holes is changed in each of the cases when the base material of the imaging medium is the resin film and when the base material of the imaging medium is metal.

According to another embodiment of the present invention, there is provided an imaging medium imaged by an imaging apparatus for generating a change in an imaging characteristic according to imaging data on the imaging medium by irradiation of an energy beam so as to execute imaging, wherein at least a side end portion on the opposite side surface to the imaging surface of the imaging medium, in which the imaging medium is started to be wound around an imaging medium attaching member of the imaging apparatus, is chamfered.

According to another embodiment of the present invention, there is provided an imaging medium imaged by an imaging apparatus for generating a change in an imaging characteristic according to imaging data on the imaging medium by irradiation of an energy beam so as to execute imaging, wherein the imaging medium is cut from an opposite side surface of an imaging surface when being cut to a predetermined size.

According to another embodiment of the present invention, there is provided an imaging apparatus for generating a change in an imaging characteristic according to imaging data on the imaging medium by irradiation of an energy beam so as to execute imaging, wherein at least the circumferential surface of an attaching member around which the imaging medium is wound is treated so that it is harder than the base material of the imaging medium.

According to the present invention, there is provided an imaging apparatus for generating a change in an imaging characteristic according to imaging data on the imaging medium by irradiation of an energy beam so as to execute imaging, wherein the imaging apparatus comprising: an attaching member for winding the imaging medium therearound; a motor for rotating the attaching member; and scanning means for scanning an irradiation apparatus of the energy beam in substantially the same direction as the direction of the rotation axis of the attaching member, wherein the scanning direction is inclined against the rotation axis of the attaching member substantially by a ratio of a scanning speed of the scanning means to a peripheral speed of the surface of the imaging medium wound around the attaching member when the irradiation apparatus is scanned in substantially the same direction as the direction of the rotation axis of the attaching member.

According to the present invention, there is provided an imaging apparatus for generating a change in an imaging characteristic according to imaging data on the imaging medium by irradiation of an energy beam so as to execute imaging, wherein the imaging apparatus comprising: an attaching member for winding the imaging medium therearound; a motor for rotating the attaching member; scanning means for scanning an irradiation apparatus of the energy beam in substantially the same direction as the direction of the rotation axis of the attaching member; and positioning means for positioning the imaging medium such that a reference direction of an imaging area is inclined against the rotation axis of the attaching member substantially by a ratio of a scanning speed of the scanning means to a peripheral speed of the surface of the imaging medium wound around the attaching member when the imaging medium is attached to the attaching member.

According to a preferred embodiment of the present invention, there is provided the imaging apparatus wherein the scanning direction of the irradiation apparatus of the energy beam is inclined against the rotation axis of the attaching member substantially by a ratio of a scanning speed of the scanning means to a peripheral speed of the surface of the imaging medium wound around the attaching member.

According to a preferred embodiment of the present invention, there is provided an imaging method wherein when imaging is executed by attaching an imaging medium to an attaching member, rotating the attaching member, scanning an irradiation apparatus of energy beam in substantially the same direction as the direction of a rotation axis of the attaching member and generating a change in an imaging characteristic according to imaging data on the imaging mediums by irradiation of the energy beam, a reference direction of an imaging area is inclined against the rotation axis of the attaching member substantially by a ratio of a scanning speed of the irradiation apparatus to a peripheral speed of the surface of the imaging medium wound around the attaching member when the imaging medium is wound around the attaching member.

According to a preferred embodiment of the present invention, there is provided an imaging method wherein when the irradiation apparatus of energy beam is scanned, a scanning direction of the energy beam is inclined against the rotation axis of the attaching member and about a beam irradiation direction of the irradiation apparatus as the rotation axis substantially by a ratio of a scanning speed of the irradiation apparatus to a peripheral speed of the surface of the imaging medium wound around the attaching member.

According to a preferred embodiment of the present invention, there is provided a printing system comprising: an imaging apparatus for generating a change in an imaging characteristic according to imaging data on an imaging medium by irradiation of an energy beam so as to execute imaging; and a printing apparatus for printing on a recording medium by feeding ink onto the imaging medium imaged, wherein the imaging apparatus comprises an attaching member for imaging to wind the imaging medium therearound, a motor for rotating the attaching member for imaging, and scanning means for scanning an irradiation apparatus of the energy beam in substantially the same direction as the direction of the rotation axis of the attaching member, and the printing apparatus comprises an attaching member for printing to wind the imaging medium therearound after imaging, and a motor for rotating the attaching member for printing, the printing system wherein the direction where the imaging medium is wound around the each attaching member is different substantially by a ratio of a scanning speed of the scanning means of the irradiation apparatus of energy beam to a peripheral speed of the surface of the imaging medium wound around the attaching member in each of the cases when the imaging medium is wound around the attaching member for imaging and when the imaging medium after imaging is wound around the attaching member for printing.

According to a preferred embodiment of the present invention, there is provided the printing system wherein the scanning direction of the irradiation apparatus of energy beam is inclined against the rotation axis of the attaching member and about a beam irradiation direction of the irradiation apparatus as the rotation axis substantially by a ratio of a scanning speed of the scanning means to a peripheral speed of the surface of the imaging medium wound around the attaching member.

According to a preferred embodiment of the present invention, there is provided the printing system wherein a positioning method of the imaging medium in the printing apparatus is substantially the same as that of the imaging medium in the imaging apparatus except for the difference in the winding direction.

According to a preferred embodiment of the present invention, there is provided the printing system wherein a attaching method of the imaging medium in the printing apparatus is substantially the same as that of the imaging medium in the imaging apparatus except for the difference in the winding direction.

According to a preferred embodiment of the present invention, there is provided the printing system wherein the attaching member of the imaging medium in the imaging apparatus and that of a printing plate in the printing apparatus have substantially the same configuration excepting the difference in the winding direction.

According to a preferred embodiment of the present invention, there is provided the imaging apparatus wherein the positioning method of the imaging medium in the imaging apparatus is carried out by engaging positioning holes provided in the imaging mediums with positioning pins provided in the imaging apparatus.

According to a preferred embodiment of the present invention, there is provided the imaging apparatus wherein the positioning method of the imaging medium in the imaging apparatus and that of the imaging medium in the printing apparatus are carried out by abutting an abutting portion of the imaging medium processed to a predetermined shape against an abutment receiving portion of the imaging apparatus.

According to a preferred embodiment of the present invention, there is provided the imaging apparatus wherein a positioning method of an image on the imaging medium in the imaging apparatus is carried out based on a detection result of the positioning holes provided on the imaging medium detected by positioning hole detecting means provided in the imaging apparatus.

According to a preferred embodiment of the present invention, there is provided the imaging apparatus wherein a positioning method of an image on the imaging medium in the imaging apparatus is carried out based on a detection result of a position of a register mark formed on the imaging medium attaching member of the imaging apparatus detected by register mark position detecting means provided in the imaging apparatus.

According to a preferred embodiment of the present invention, there is provided the imaging apparatus wherein a positioning method of an image on the imaging medium in the imaging apparatus is carried out based on a detection result of a position of a register mark, formed on the imaging medium prior to imaging, detected by register mark position detecting means provided in the imaging apparatus.

In the present invention, a plurality of cylinders normally-contacts each other, means that the cylinders contact in a state that the axial directions of the respective cylinder are substantially parallel to each other, and ink or an ink image can be transferred from one of the cylinder to another.

In the present invention, "an imaging medium" indicates a film and a plate for manufacturing a printing plate etc, which have a multilayer structure containing layers showing specific reactions to irradiation by a beam irradiation source such as a laser source.

In many cases, the specific reactions are classified into a photon mode and a heat mode depending on the difference in the reaction.

In the case of the photon mode, a layer showing the specific reaction, that is, a photosensitive layer, physical and chemical properties such as solubility to specific solvent are changed by optical energy of the beam. For example, a soluble property is changed to an insoluble property, and vice versa. Also, there is a possibility that a change in light transmission, and occurrence of an affinity for specific solution in the surface layer will be brought about. Then, a developing process using specific solvent is done after an imaging process, so that a film plate or a printing plate are made.

In the case of the heat mode, there occur changes such as a layer showing the specific reaction, that is, a heat sensitive layer is removed by heat energy of the beam, or the heat sensitive layer is likely to be removed, or the heat sensitive layer is not easily removed. If an irradiation section or a non-irradiation section is not completely removed by only the beam irradiation, a physical post-process is added thereto, so that the irradiation section or the non-irradiation section is completely removed. Thus, physical projections and/or depressions are generated on the surface of the imaging medium, and the film plate or the printing plate are formed.

As the film plate for printing of the photon mode, there are a film plate having a photosensitive layer such as silver salt, a film plate having a resin layer of a photodislocation type or a resin layer of a photopolymerization type. As the film plate for printing of the heat mode, there is a film plate having a thermal decomposition layer, a thermal bonding layer, or a thermal condensing layer.

As the plate for printing, as described in Unexamined Japanese Patent Publication No. 6-186750 (corresponding to U.S. Pat. No. 5,339,737), incorporated by reference, there is favorably used the press plate comprising a substrate, a heat sensitive layer (photosensitive layer) formed thereon, and a surface layer formed on the heat sensitive layer, wherein the heat sensitive layer and the surface layer have a different affinity for printing liquid such as ink or liquid of ink repulsion (dampening water).

Moreover, a primer layer or the like is formed between the heat sensitive layer (photosensitive layer) and the substrate, and the difference in the affinity may be provided between the primer layer and the surface layer. As the heat sensitive layer for the heat mode, a material in which carbon black is diffused to nitrocellulose, or the metal film such as titanium oxide is favorably used.

Thus, in the specification of the present invention, the difference in the shape, or the chemical affinity, or the optical property such as light transmission between the portion subjected to the beam irradiation and the portion not subjected to the beam irradiation are referred to as physical properties of the imaging medium.

In the present invention, "the beam irradiation source" includes a source for generating a beam of light such as a laser beam (including electromagnetic waves such as ultraviolet rays, visible radiation, infrared rays), and a generation source of particle beams such as electron beams. Also, other than the beams having the defined directivity, the following sources are included in the beam irradiation source of the present invention. That is, there are included all sources, which can resultingly cause the change in the physical properties in the minute portion of the imaging medium by the discharge of such as a stylus electrode used in electrostatic printers.

The most favorable beam irradiation source is an optical fiber emission end to which the emission end of the laser light source or the light source is coupled. To miniaturize the apparatus, a semiconductor laser is favorably used as the laser light source. To obtain high power, a gas laser such as an argon ion laser, a carbon dioxide laser, or a solid laser such as a YAG laser is favorably used.

In the present invention, "the attaching member of the imaging medium" is the member for attaching the imaging medium to the imaging apparatus or the printing apparatus in one. Also, the attaching member is formed such that the imaging medium is fixed or moved to a predetermined position with respect to imaging means (a head for imaging) of the imaging apparatus or the recording medium transfer path of the printing apparatus. In the type of apparatus in which the imaging medium is attached to the plate cylinders, the plate cylinders serve as the attaching member. Moreover, in the type of apparatus in which the imaging medium is attached to the interior of the cylinder drum, the cylinder drum serves as the attaching member. Also., in the case of the flat bed arrangement, the base on which the imaging medium is loaded is used as the attaching member.

In the present invention, "the image medium positioning method" indicates the method of positioning the imaging medium at an attaching member in attaching the imaging medium to the attaching member of an imaging apparatus or a printing apparatus. As a preferred embodiment, there is a method using the positioning holes provided in the imaging medium and the corresponding positioning pins provided in the attaching member.

In the present invention, the breakage of the positioning holes indicates the state in which the positioning holes are deformed by a physical force so that the original function is lost. As the breakage of the positioning holes, for example, there are the expansion of the positioning holes due to plastic deformation, the shift of the hole center position, and the generation of cracks around the holes.

In the present invention, "the imaging medium attaching method" indicates the method of attaching the imaging medium to the attaching member in attaching the imaging medium to the attaching member of the imaging apparatus or the printing apparatus.

BEST MODE FOR CARRYING OUT THE INVENTION

The following will explain a multicolor printing apparatus and a duplex printing method of a favorable embodiment of the present invention with reference to drawings.

Figure 1:
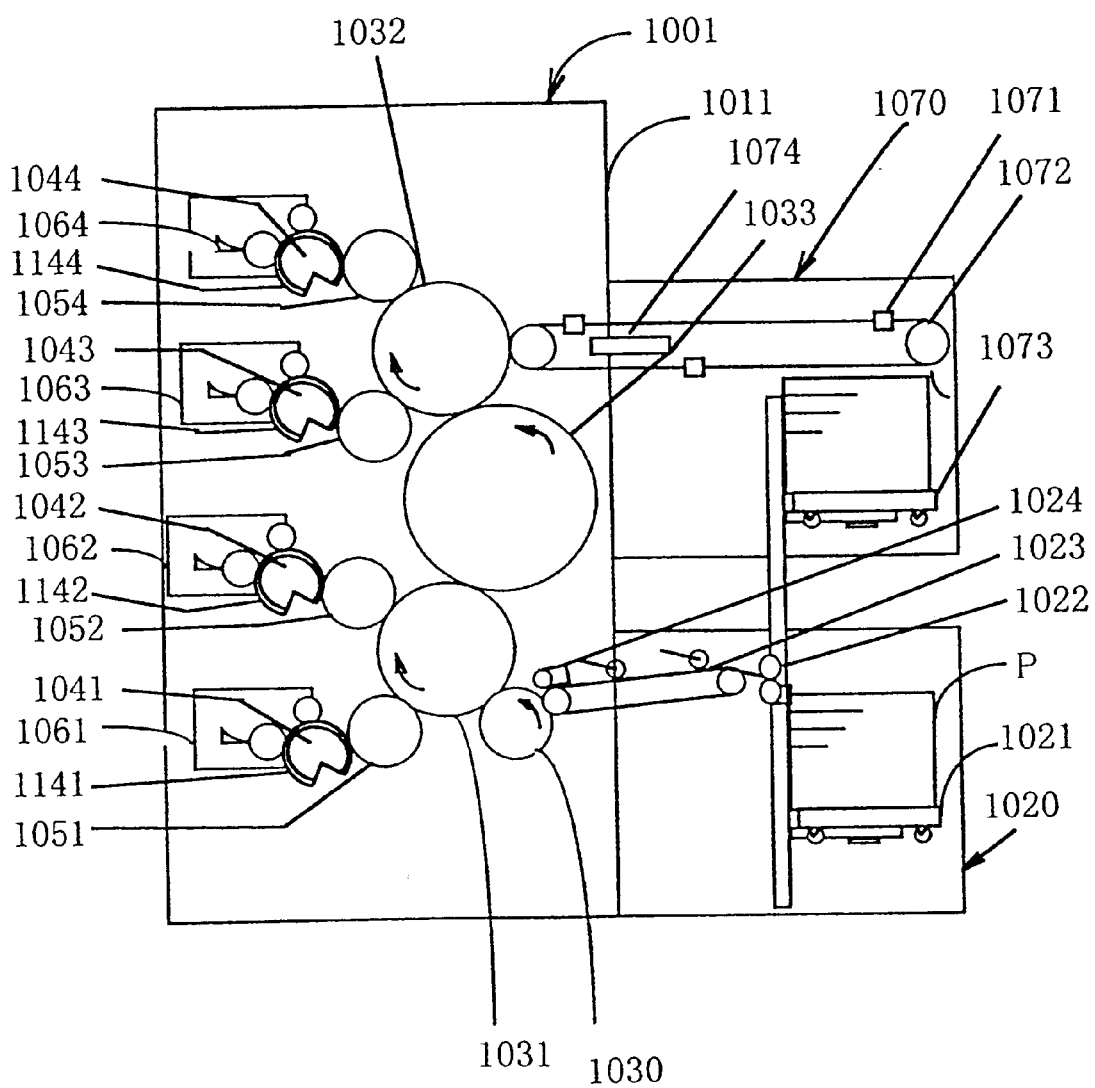
FIG. 1 is a cross-sectional view of a multicolor printing apparatus of one embodiment of the present invention.
Figure 2:
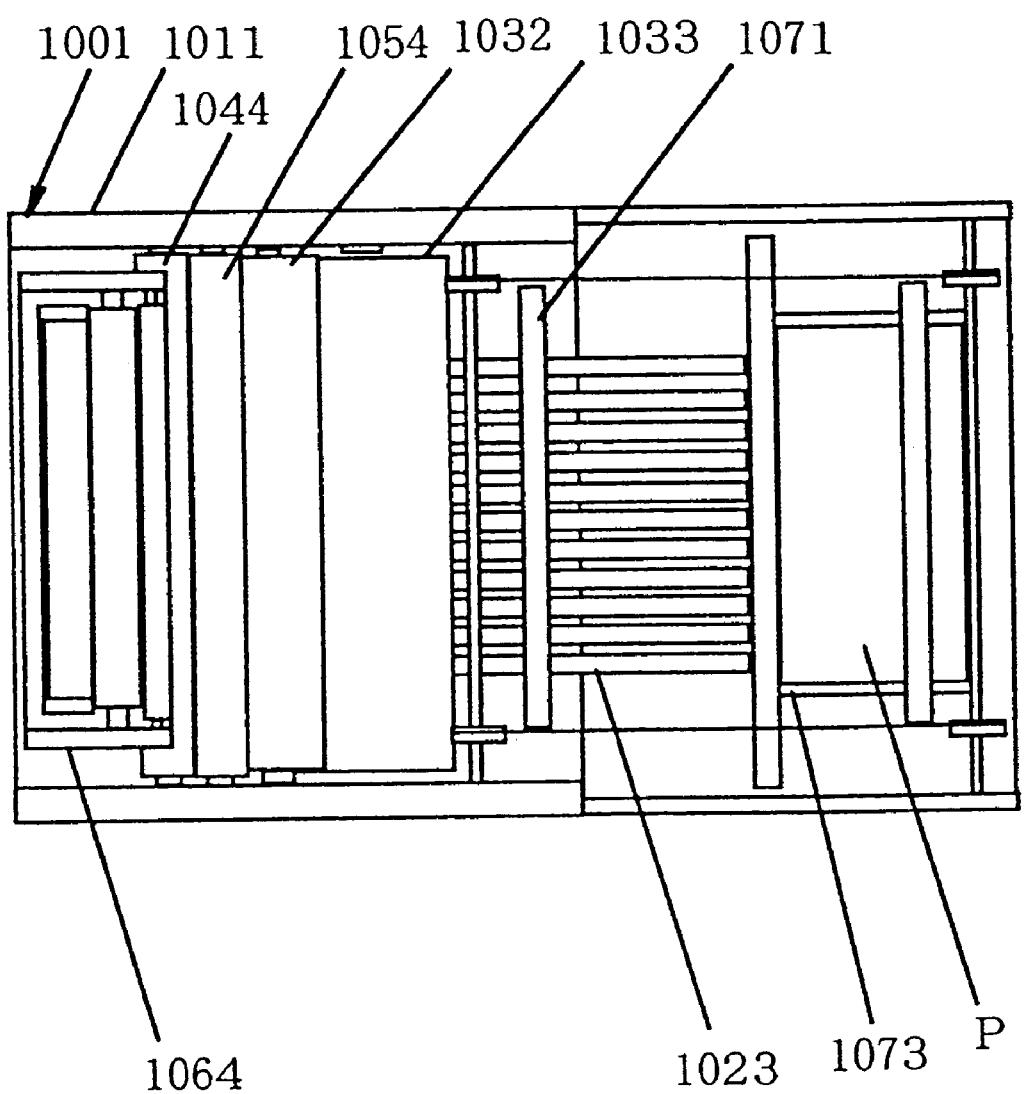
FIG. 2 is a plan view of the multicolor printing apparatus of one embodiment of the present invention.

FIG. 1 is a schematic cross-sectional view of a multicolor printing apparatus of one embodiment of the present invention. FIG. 2 is the plan view.

In the specification and attached drawings, the same structural components are denoted by the same reference signs in order to avoid repetition of description.

As shown in FIG. 1, and in plan view of FIG. 2, a printing apparatus 1001 comprises a frame body 1011. The frame body 1011 comprises a recording medium supplying apparatus 1020 of a unit type, a delivery cylinder 1030, impression cylinders 1031, 1032, a transfer cylinder 1033, a discharging apparatus 1070, and ink coating apparatus 1061, 1062, 1063 and 1064. Plate cylinders 1041, 1042, 1043, 1044 each having a printing plate are attached to the ink coating apparatus 1061, 1062, 1063, 1064, respectively. Blanket cylinders 1051, 1052, 1053, 1054 are provided to contact the plate cylinders 1041, 1042, 1043, 1044, respectively. The paper supplying apparatus 1020 comprises a feeding station 1021, serving as a stacker for a recording medium, a paper pickup apparatus 1022, a paper transfer conveyor 1023, serving as a paper supplying apparatus, a feeding apparatus 1024, which detects a head of a sheet of paper so as to feed paper to the delivery cylinder 1030.

Figure 1A:
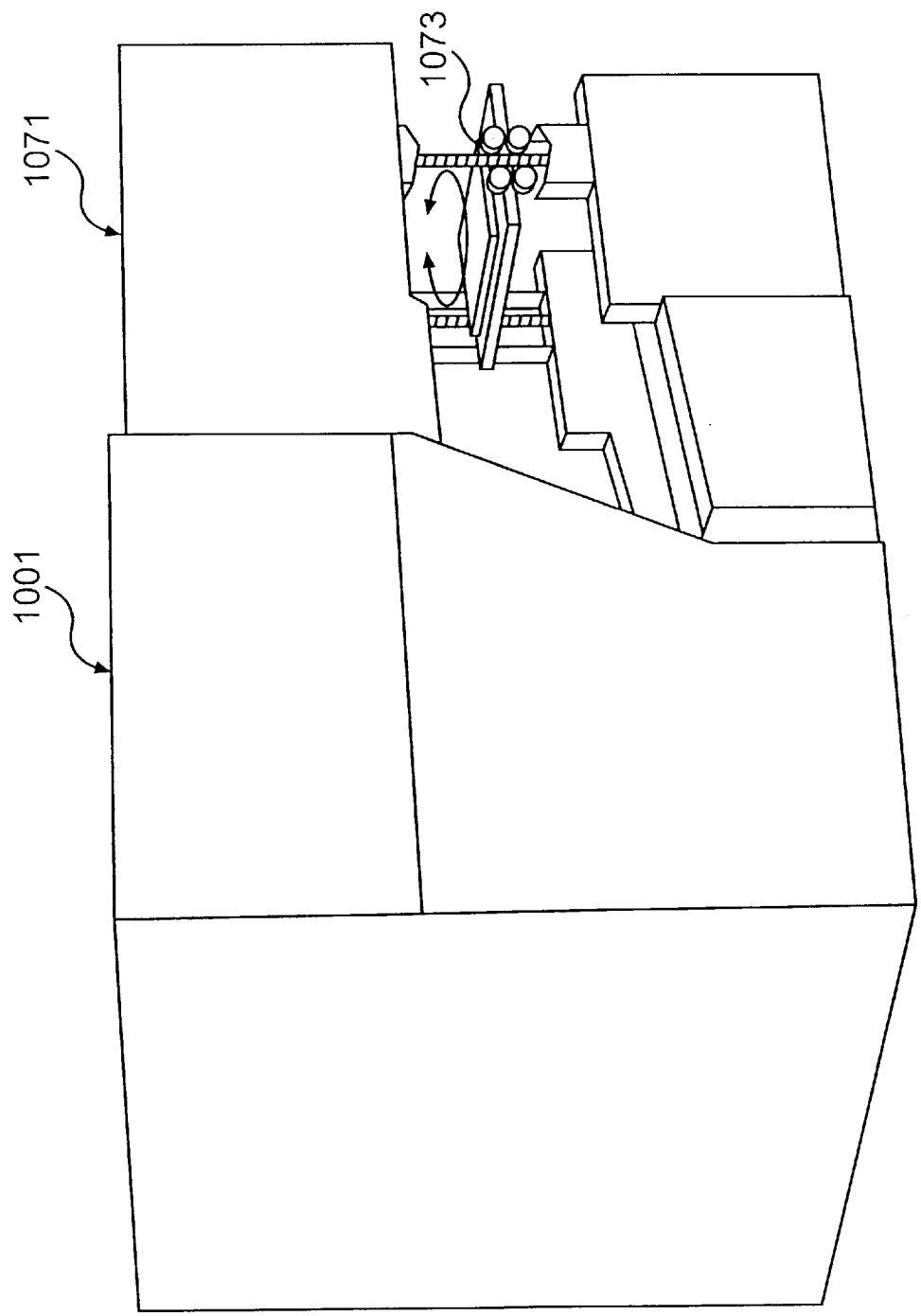
FIG. 1A is a perspective view of the apparatus of FIG. 1, showing rotation of the discharging station.

The discharging apparatus 1070 comprises a rod 1071, a chain delivery 1072, a discharge station 1073, and a dryer 1074. The rod 1071 has a paper holding apparatus for receiving a printed sheet of recording medium P from the impression cylinder. The chain delivery 1072 delivers paper to the discharging station 1073. As shown in FIG. 1A, discharging station 1073 stacks the printed recording mediums and rotates horizontally after the end of printing so as to change the direction by 180° about the direction of the normal line of the recording mediums. The dryer 1074 dries the recording mediums P being delivered by the chain delivery 1072.

In the printing operation in the printing apparatus 1001 of FIG. 1, the sheets of recording mediums P are dealt by a human or a machine, and then stacked in good order at a predetermined position of the feeding station 1021 of FIG. 1. When the printing apparatus 1001 is actuated, the recording mediums P stacked on the feeding station 1021 are separated one by one by the injection of compressed air from an air nozzle (not shown) attached to the paper pickup apparatus 1022. Thereafter, the recording mediums P are sent to the paper transfer conveyor 1023 one by one with a distance by the paper pickup apparatus 1022.

The recording mediums P sent to the paper transfer conveyor 1023 are fed by feeding apparatus 1024 at timing when the head position of the recording medium is just adjusted to the paper holding sections of the delivery cylinder 1030. Then, the head position is held by the paper holding apparatus of the delivery cylinder 1030, and delivered to the paper holding apparatus of the impression cylinder 1031, which rotates synchronously with the delivery cylinder 1030.

The delivery cylinder 1030 and the impression cylinder 1031 are formed such that an outer diameter ratio of the cylinder 1030 to the cylinder 1031 is 1 to 2, and the paper holding sections of the respective cylinders are provided in the respective cylinders at the above ratio. In other words, one paper holding section is provided in the delivery cylinder 1030 and two paper holding sections are provided in the impression cylinder 1031 (the distance between two paper holding sections in the cylinder outer peripheral direction is adjusted to the cylinder outer peripheral length of the delivery cylinder 1030). The feeding pitch of recording mediums P and that of impression cylinder 1031 become the same, and paper can be surely delivered by the paper holding section of the delivery cylinder 1030 and that of the impression cylinder 1031. Also, the paper holding sections do not interfere with each other between the cylinders. In this apparatus, the outer diameter ratio of the cylinder 1030 to the cylinder 1031 is 1 to 2 in order to miniaturize the printing apparatus.

The recording mediums P whose heads are held by the paper holding apparatus of the impression cylinder 1031 rotate with the impression cylinder 1031. Then, the recording mediums P are sandwiched by the contact portion between the blanket cylinder 1051 and the impression cylinder 1031, and the contact portion between the blanket cylinder 1052 and the impression cylinder 1031, sequentially, and predetermined pressure is applied thereto.

At this time, image patterns, in the form of as ink images, on the printing plates 1141 and 1142, which are wound around the plate cylinders 1041, 1042, respectively, are transferred onto the blanket cylinders 1051 and 1052 with color ink supplied by ink coating apparatus 1061, 1062, respectively. Each ink image is transferred onto the recording mediums P rotating with the impression cylinder 1031. The distance from the portion where the impression cylinder 1031 contacts the blanket cylinder 1051 to the portion where the impression cylinder 1031 contacts the blanket cylinder 1052 is set to be longer than the maximum length of the recording mediums P in the direction of the progress. As a result, there occurs no case in which the recording mediums P contact two blanket cylinders at the same time.

Thus, ink images of two colors, which are supplied from the ink coating apparatus 1061 and 1062, respectively, are transferred onto the recording mediums P on the impression cylinder 1031. Then, the recording mediums P are carried from the impression cylinder 1031 to the transfer cylinder 1033 having the same paper holding apparatus as the impression cylinder 1031.

The impression cylinder 1031 and the transfer cylinder 1033 are formed such that an outer diameter ratio of the cylinder 1031 to the cylinder 1033 is 2 to 3. Then, the paper holding sections of the respective cylinders are provided in the respective cylinders at the above ratio, similar to the delivery cylinder. As a result, the paper holding section of the impression cylinder 1031 and that of the transfer cylinder 1033 can deliver the recording mediums P at the same timing. In the printing apparatus 1001, the outer diameter ratio of 2 to 3, which can reduce the diameter of the impression cylinder as small as possible, is set in order that the printing apparatus is miniaturized and the impression cylinder is manufactured at a low cost as possible.

A special paper having a large amount of minute particles is wound around the surface of the transfer cylinder 1033, and print ink of the ink images transferred onto the recording mediums P is not transferred onto the surface of the transfer cylinder 1033.

The recording mediums P thus delivered to the transfer cylinder 1033 are carried from the transfer cylinder 1033 to the impression cylinder 1032 having the same shape and the same paper holding apparatus as the impression cylinder 1031. At this time, image patterns, in the form of ink images, of printing plates 1143 and 1144, which are wound around plate cylinders 1043, 1044, respectively, are transferred onto the blanket cylinders 1053 and 1054 with color ink supplied by ink coating apparatus 1063, 1064, respectively. Sequentially, ink images are transferred onto the recording mediums P, which have been delivered to the impression cylinder 1032 and rotate with the impression cylinder 1032.

The recording mediums P to which four colors have been thus transferred are carried from the impression cylinder 1032 to the rod 1071, which is the paper holding member of the chain delivery 1072. The surfaces of the recording mediums P carried to the rod 1071 are dried by the simple dryer 1074 such as an ultra violet ray curing apparatus in the process in which the recording mediums P are carried to the discharging station 1073 S by the chain delivery 1072. This prevents offset of the print image onto the sheet of paper. The recording mediums P thus carried to the discharging station 1073 by the chain delivery 1072 are stacked, and a series of multicolor printing processes is ended.

At this time, as being obvious from FIG. 1, the printed surfaces of the recording mediums P are placed at a lower surface side of the recording mediums P in a state in which the recording mediums P are stacked on the feeding station 1021. Then, the printed surfaces of the recording mediums P are placed at an upper surface side of the recording mediums P in a state in which the recording mediums P are stacked on the discharge station 1073 at the end of printing. Therefore, even when abnormality such as a print defectiveness occurs during printing, an operator can confirm the printing result immediately.

In the case where the printing to the back face of the printed sheet is sequentially performed, the feeding station 1021 is detached, the discharging station 1073 is rotated, and the direction of the sheet is changed at by 180° horizontally. Then, the recording mediums P are shifted to the position of the feeding station 1021 with the discharging station 1073, and the discharging station 1073 is used as the feeding station 1021. Thereby, the discharging station 1073 can be set to the sheet feeding position of the recording medium supplying apparatus 1020. Namely, in the printing apparatus 1001, the printing to the back face can be continuously performed only by installing the empty feeding station 1021 in place of the discharging station 1073, and complicated movement of the recording mediums at the duplex printing can be kept to a minimum. The printing apparatus 1001 can easily carry out the duplex printing having a good quality even in a small space.

Figure 3:
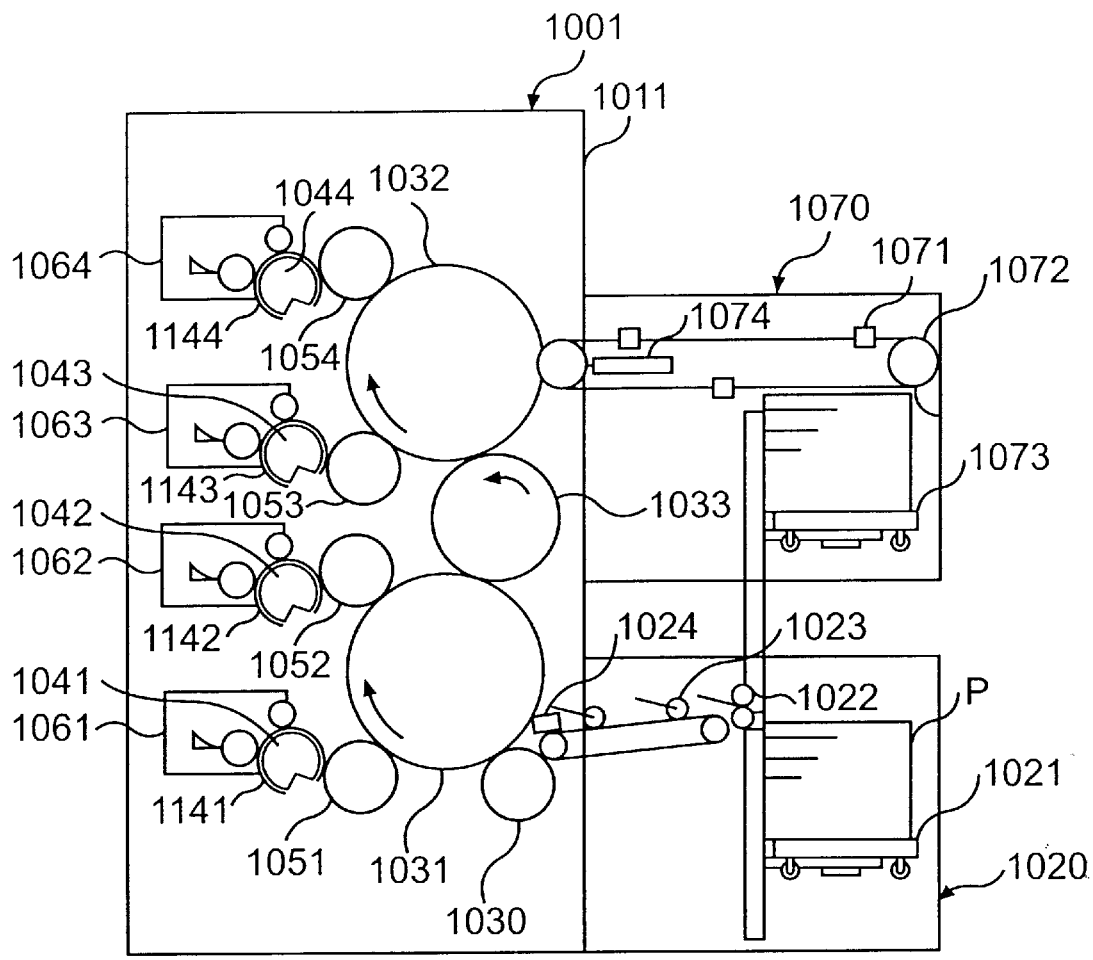
FIG. 3 is a cross-sectional view of a multicolor printing apparatus of another embodiment of the present invention.

In the above embodiment, double-diametered cylinders are used (the outer peripheral length of the surface around which the recording medium is wound was twice as large as the plate cylinder) as the impression cylinders. And as the transfer cylinder, triple-diametered cylinder is used. In addition to such the configuration, waterless plates are used, so that the dampening water apparatus are omitted. As a result, the ink coating apparatus can be easily arranged substantially in a direction of gravity. Note that substantially the same result can be obtained if the configuration having a triple-diametered cylinder as the impression cylinders, and a double-diametered cylinder as the transfer cylinder, are used as shown in FIG. 3. In this case, an outer diameter ratio of the transfer cylinder 1030 to the impression cylinder 1031 is 1 to 3.

Next, one preferred embodiment of the coating apparatus and that of the print apparatus of the present invention will be explained.

Figure 4:
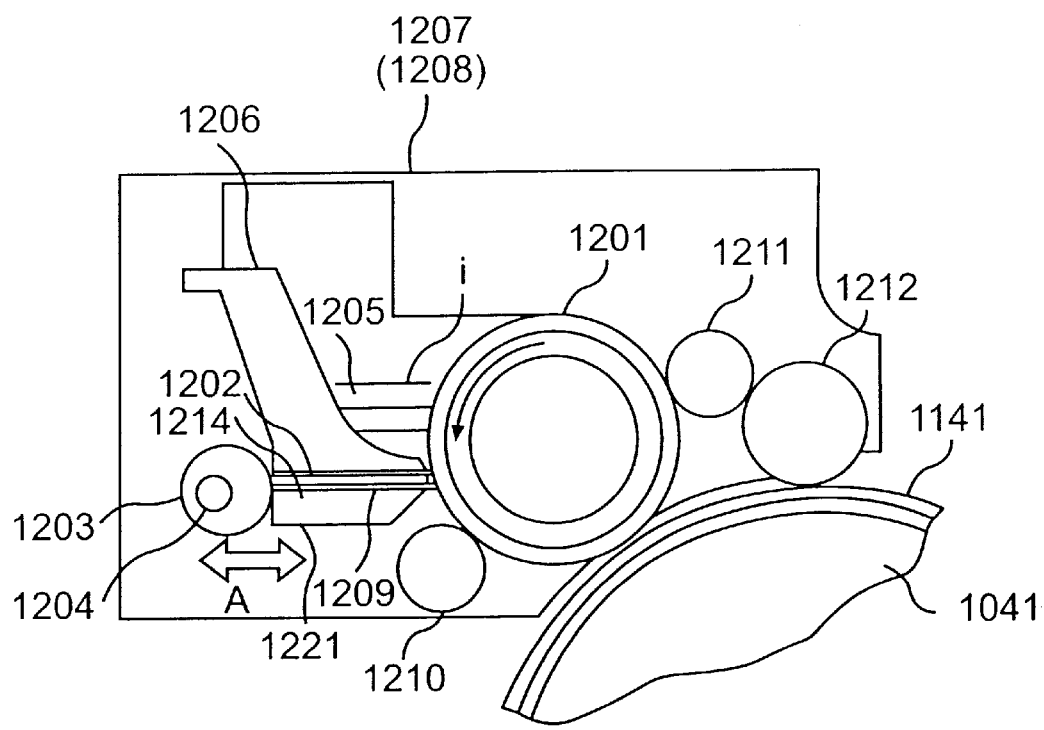
FIG. 4 is a cross-sectional view of a coating apparatus of one embodiment of the present invention.
Figure 5:
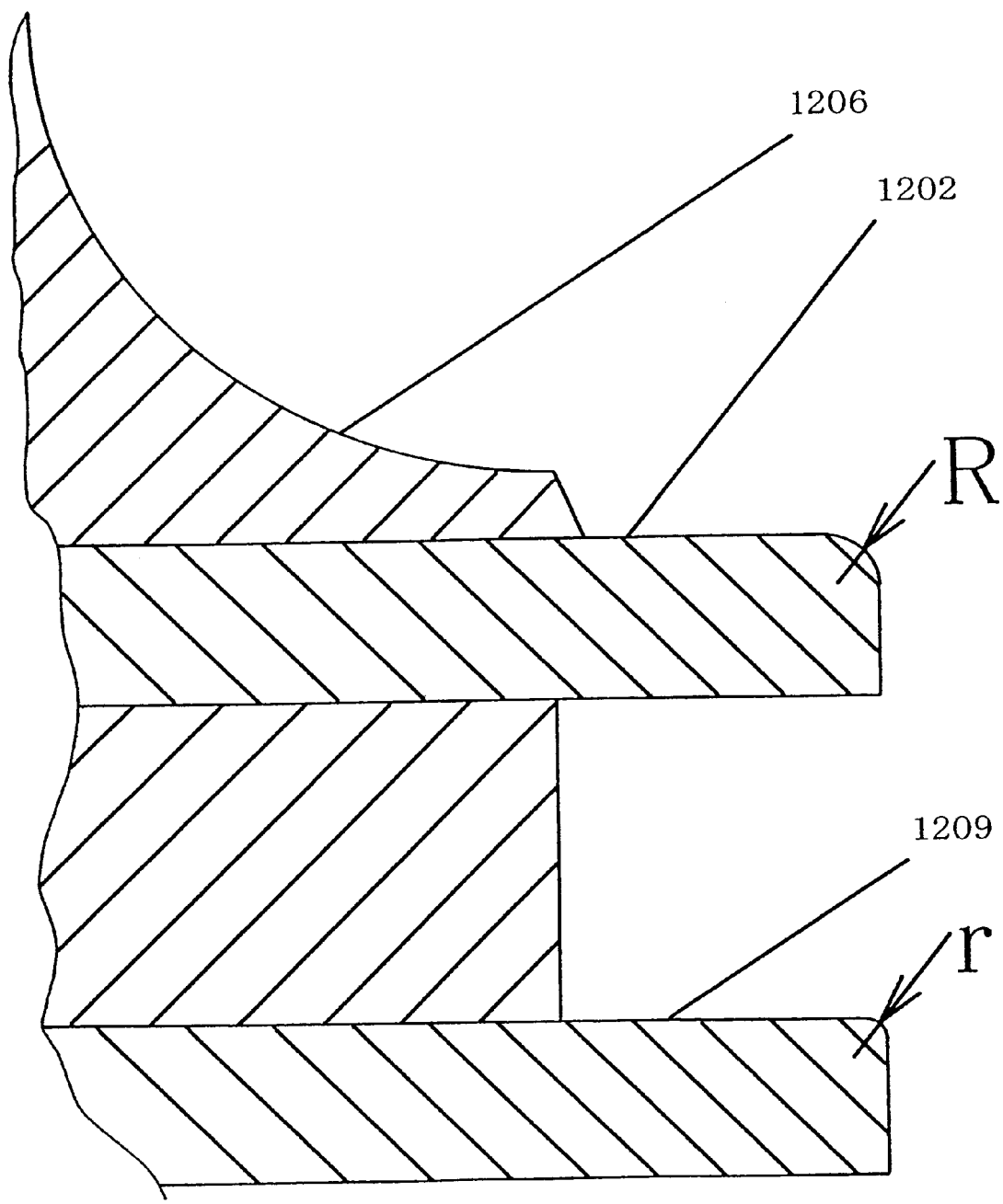
FIG. 5 is a cross-sectional view showing a shape of a front edge portion on a blade leading side according to the present invention.

The multicolor printing or the duplex printing according to the present embodiment uses waterless plates. In this embodiment, there are provided unit-typed ink coating apparatus, which are small and light and detachable. Each ink coating apparatus, as shown in FIGS. 4 and 5, comprises the form roller 1201 having an elastic layer of a single or a multilayer, the doctor blade 1202, the eccentric cam 1203 for controlling the movement of the doctor blade, a flattening member 1209, the ink distributing rollers 1210, 1211, and the auxiliary form roller 1212, serving as an auxiliary coating roller, having an elastic surface.

The form roller 1201, the doctor blade 1202, the side plates 1207 and 1208, which are arranged at both sides of the in the form roller 1201 in its axial direction, and the ink fountain 1206 form the ink fountain space 1205. The side plates 1207 and 1208 are gently pressed to the form roller 1201 so as to be sealed. This prevents ink i of the ink fountain space 1205 from being leaked outside.

A small gear (not shown) rotating solidly with the form roller 1201 is engaged with a large gear (not shown) rotating solidly with a plate cylinder 1041. Thus, the form roller 1201 and the plate cylinder 1041 are synchronized with each other and rotated at the same circumferential speed at their contact section.

The ink coating apparatus is configured so that the eccentric cam 1203 attached to the shaft 1204 is rotated so as to move the doctor blade 1202 back and fourth in a direction of an arrow A, thereby changes the engagement between the doctor blade 1202 and the form roller 1201 in order to control the thickness of the coated ink film formed on the outer periphery of the form roller 1201.

The surface of the coated ink film, whose thickness has been controlled, on the form roller 1201 is flattened by the flattening blade 1209, serving as the flattening member.

The doctor blade 1202 used in this coating apparatus is made of steel such as Swedish steel having a thickness of 0.1 to 0.5 mm. The doctor blade 1202 is held to be inserted from the upper and lower sides by the ink fountain 1206 and a lower face pressing member 1214, thereby forming an ink quantity controlling member 1221. Thus, it is configured that by limiting the rotation angle of a motor (not shown) according to a sensor, which motor is mounted on each of the ink coating apparatus 1061 to 1064, by controlling its reciprocal rotation with an electric circuit, and by slightly rotating the eccentric cam 1203 for controlling the movement of the doctor blade 1202 through the shaft 1204, the engagement quantity of the doctor blade 1202, which forms the ink quantity controlling member 1221, to the surface of the form roller 1201 is controlled. As a result, the thickness of the coated ink film formed on the form roller 1201 can be controlled.

In the embodiment shown in FIGS. 4 and 5, the flattening blade 1209 is used as the flattening member, and the flattening member is made of steel having the thickness of 0.1 to 0.5 mm. Also, one flattening member is provided at the downstream side of the doctor blade 1202 to the direction where the form roller 1201 progresses with an interval of several millimeters. The interval of 1 mm or more is favorable in view of the flattening effect, and the interval of 10 mm or less is favorable in view of the miniaturization of the apparatus. Moreover, a favorable range of the interval is about 1 to 3 mm.

When the flattening member is positioned at the upstream side of the doctor blade 1202 in the direction where the form roller 1201 progresses, the striped defects, which have been generated in the doctor blade portion in the circumferential direction of the surface of the ink layer because of paper dust or the like, do not grow and are not so conspicuous. It is because the surface of the form roller 1201 is once flattened at the place where the flattening member is set. In particular, this is useful in the prevention of the striped defects in the printing pattern, which is uniform to the axial direction of the roller, such as a solid printing, a screen tint printing, etc, and in the printing pattern having a small image area such as rules and characters.

On the other hand, when the flattening member is positioned at the downstream side of the doctor blade 1202 in the direction where the form roller 1201 progresses as shown in FIG. 4, the striped defects, which have been generated in the doctor blade portion 1202, can be easily made not to be conspicuous regardless of the image patterns of the printing plates by the flattening blade 1209 serving as the flattening member. It is because the film thickness of the ink layer on the ink form roller 1201 at the flattering blade 1209 is uniform and substantially as large as at the doctor blade 1202. Moreover, since the film thickness of the ink layer on the ink form roller 1201 at the flattering blade is uniform and substantially as large as at the doctor blade 1202, the contacting pressure between the flattening blade 1209 and the surface of the form roller 1201 can be easily controlled. Therefore, the attaching position of the flattening member is favorably set to the downstream side of the doctor blade in the direction where the form roller 1201 progresses as shown in FIG. 4.

Figure 11:
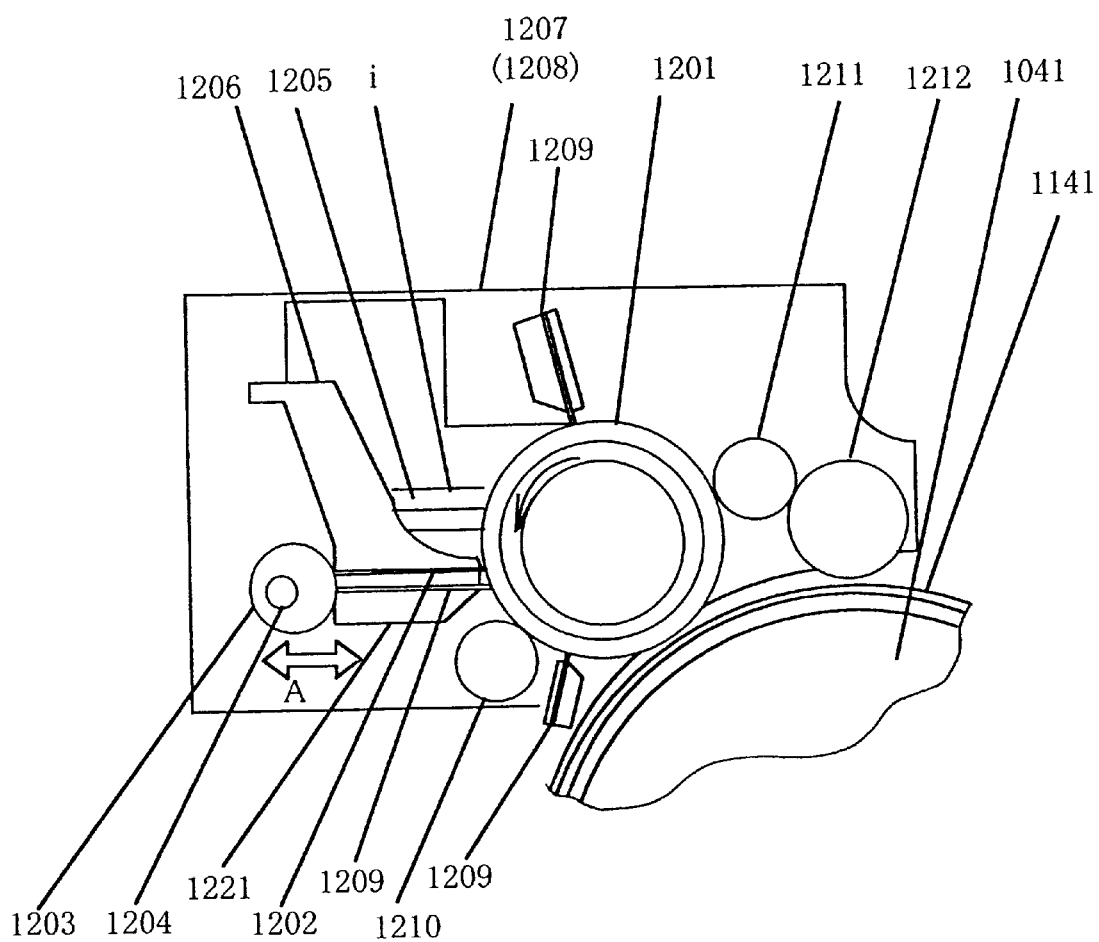
FIG. 11 is a cross-sectional view of an ink unit of a coating apparatus of one embodiment of the present invention.

FIG. 11 shows an example of an ink coating apparatus having one flattening blade 1209 arranged on the upstream side of the doctor blade 1202 and two flattening blades 1209 arranged on the downstream side of the doctor blade 1202. In the apparatus shown in FIG. 11, the ink layer on the form roller 1201, which has been flattened by the upstream flattening blade 1209, is flattened by the doctor blade 1202 and then further by the two downstream flattening blades 1209, thus providing an enhanced flattening effect.

Figure 12:
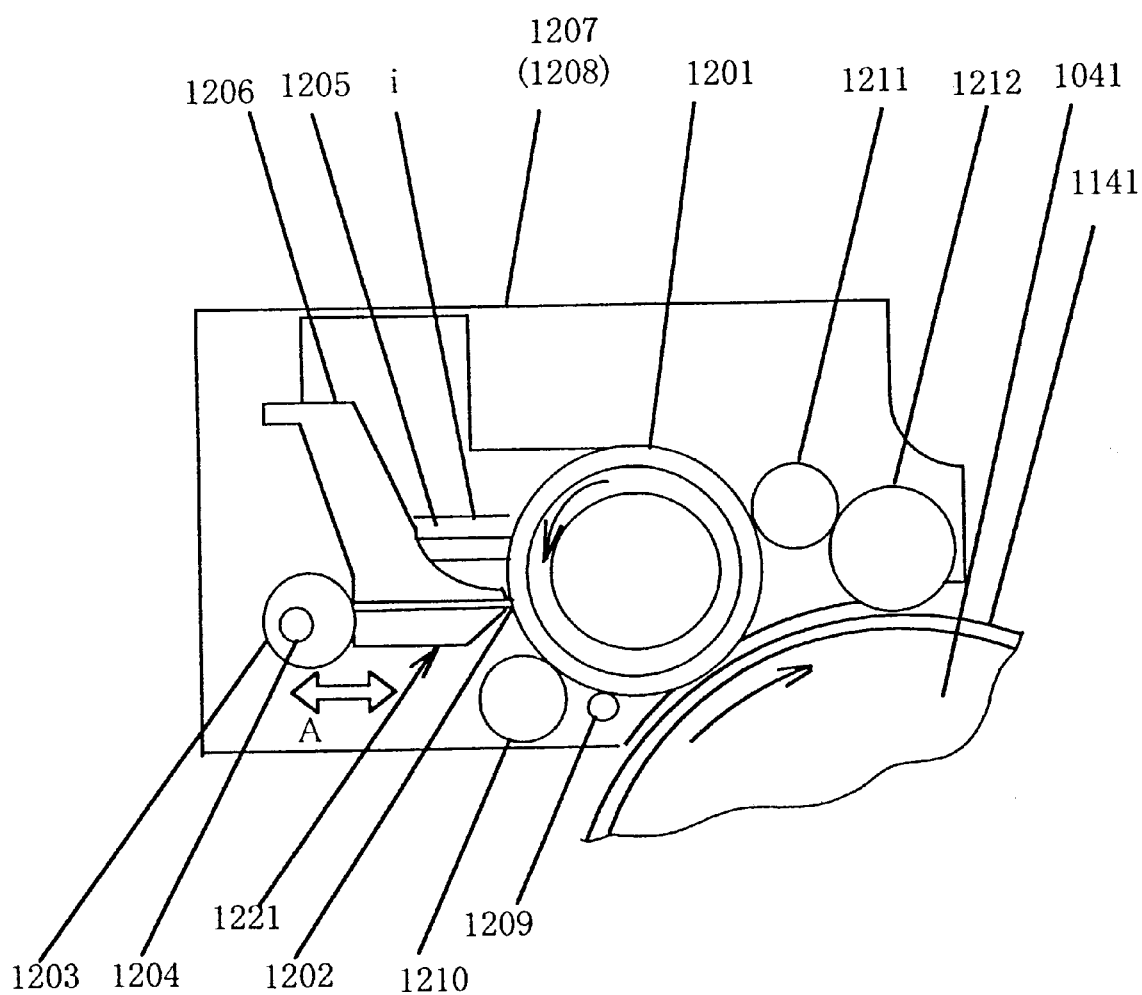
FIG. 12 is a cross-sectional view of another ink unit of a coating apparatus of one embodiment of the present invention.

FIG. 12 illustrates an example of an ink coating apparatus having a flattening shaft 1209, as a flattening member, arranged on the downstream side of a doctor blade 1202 having an enhanced flattening effect. The flattening shaft 1209 occupies small space, compared with the flattening blade 1209, and thus can be used in an ink coating apparatus in which only small space is available.

As a favorable example in which the blade is used as the flattening member as shown in FIG. 4, there is a coating apparatus as shown in FIG. 5. In the coating apparatus, the front edge of the leading side of the doctor blade 1202 and that of the flattening blade 1209, serving as the flattening member are curved. Moreover, the curvature R of the doctor blade 1202 is the same as the curvature r of the flattening blade 1209 or more. For example, if the engagement between the surface of the form roller 1201 and the doctor blade 1202 and between the surface of the form roller 1201 and the flattening blade 1209 are set to be the same, when the ink layer formed on the surface of the form roller 1201 passes through the flattening blade 1209, the ink layer is subjected to resistance by a curvature difference between the front edges of the leading sides. The resistance is higher than resistance which is obtained when the ink layer passes through the doctor blade 1209. Hence, it is easy to provide a coating apparatus which can easily flatten the ink layer surface, and which can easily control the contacting pressure between the surface of the form roller 1201 and the doctor blade 1202 and between the surface of the form roller 1201 and the flattening blade 1209.

Favorable curvature R of the doctor blade 1202 is 15 $\mu$m or more when ordinary waterless ink is used. The curvature R is varied, depending on degree of elasticity of the form roller 1201, relative speed of the form roller 1201 to the doctor blade 1202, viscosity of ink i, etc, so that a suitable value within the range of 15 $\mu$m or more may be selected.

As an example, a favorable value of the curvature R is 50 to 75 $\mu$m under conditions in which the form roller 1201 is one layer roller, a surface rubber hardness is 30° of JISA (corresponding to a durometer A type by Shore), relative velocity to the doctor blade 1202 is 36 m/min., viscosity of ink i is about 900 poise.

In the explanation hereinafter, the rubber hardness indicates JISA hardness based on the corresponding durometer A type by Shore.

The important technical concept of the present invention is to separate two functions, which are conventionally imposed on the doctor blade, that is, the adjustment of film thickness of the coated ink film, and the flattening of the coated ink film surface layer. The function of adjusting ink film thickness is provided to the doctor blade, and the function of flatting the coated ink film surface is provided to the flattening member.

The function of the flattening member is to give suitable resistance to the surface of an ink layer 1251, as a coated layer, during the movement of the ink layer, thereby flattening the ink layer surface just like a trowel.

Figure 6:
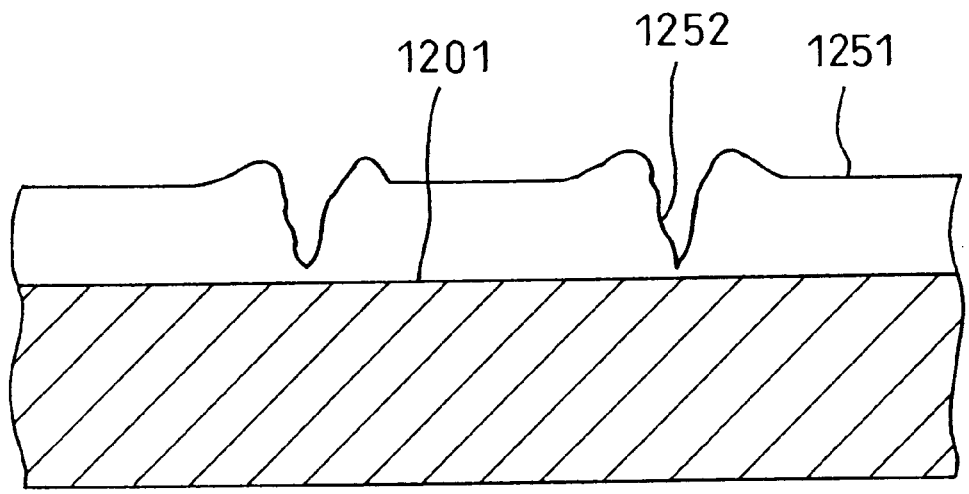
FIG. 6 is a cross-sectional view of striped defects in the circumferential direction of a plate cylinder.
Figure 7:
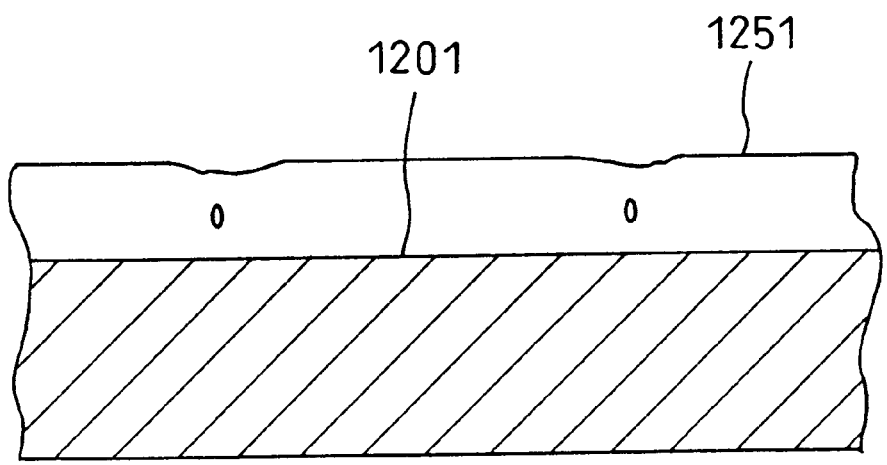
FIG. 7 is a cross-sectional view in which circumferential striped defects in a plate cylinder are flattened.

In other words, when the doctor blade portion 1202 is clogged with paper dust or the like, the form roller 1201 bends at the clogged portion and escapes therefrom. For this reason, the thickness of the ink layer of this portion increases, and the circumferential striped defects 1252 as shown in FIG. 6 are generated in the ink layer with the clogged paper dust or the like. Then the striped defects 1252 contact the flattening member, the risen portion of the ink layer is blocked and ink cannot pass thereunder, so that ink is pressed into the groove portions of the striped defects 1252. The groove portions of the stripped defects 1252 are filled with ink, and flattened as shown in FIG. 7.

The function of the flattening member is as mentioned above, and any member may be used if the member gives the suitable resistance to the surface of the ink layer to block the ink layer. Basically, there is no limitation in the material of the flattening member, the shape, and the quantity. However, in consideration of a simpler structure, and an easier adjustment, it is desirable from the easiness of the manufacture that the flattening member be shaped to be a blade as shown in FIGS. 4 and 5, and that its material be metal such as iron, ceramics, resin, etc.

Figure 8:
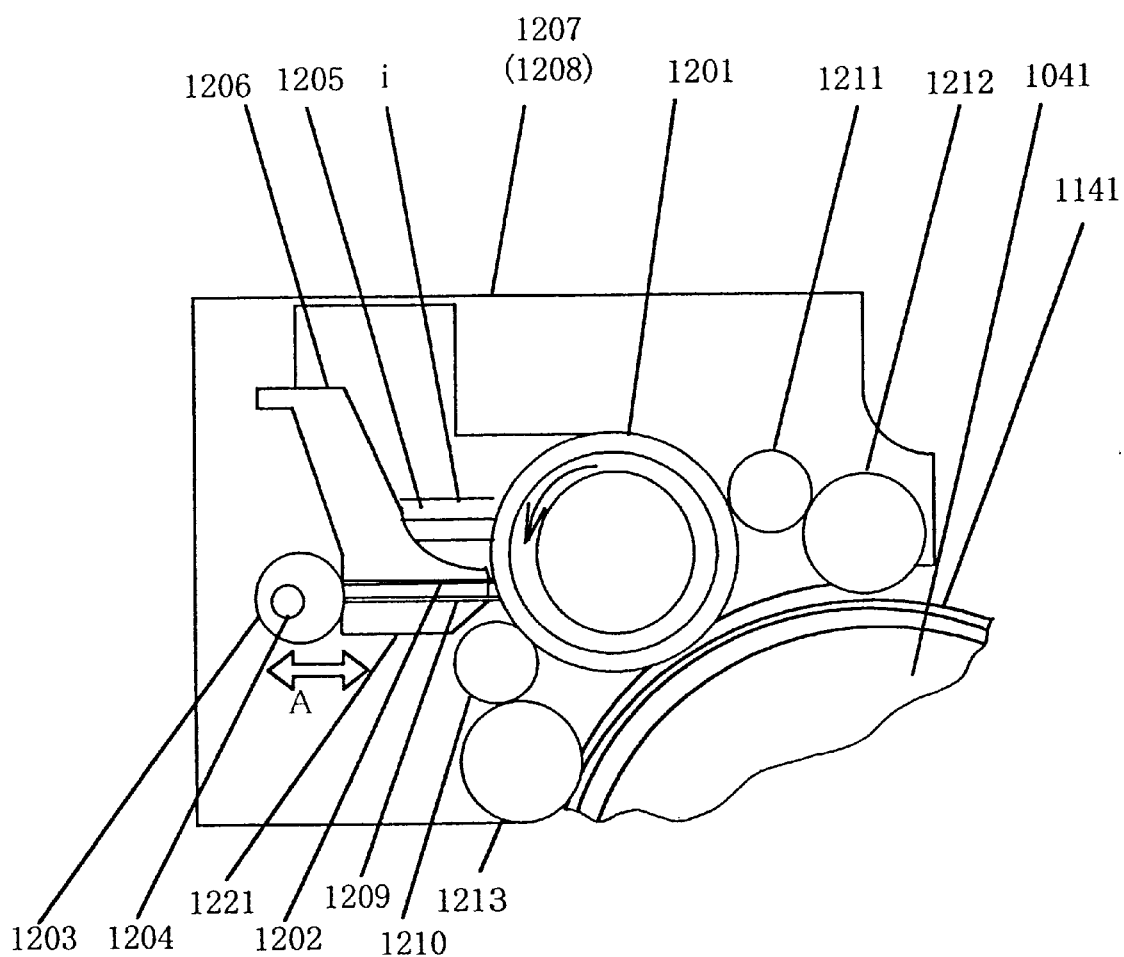
FIG. 8 is a cross-sectional view of an ink unit of a coating apparatus of another embodiment of the present invention.

Moreover, there is a more preferred embodiment of the coating apparatus. As shown in FIG. 8, the auxiliary form rollers 1212, 1213 are provided at the upstream side of the form roller 1201 and the downstream side thereof to the progress direction of the printing plate, serving as surface to be coated by the form roller 1201, respectively. Then, the ink distributing rollers 1210, 1211 are provided between the form roller 1201 and the auxiliary form rollers 1212 and 1213. The ink distributing rollers 1210 and 1211 come in contact with the form roller 1201 and the auxiliary form rollers 1212 and 1213 at the same time, and oscillate in the axial direction.

According to the above coating apparatus, the ink layer surface on the form roller 1201 is flattened by the flattening member, so that the striped defects 1252 are hardly generated in the circumferential direction of the surface of the coated ink film by paper dust or the like. Even if the striped defects are generated, the striped defects become inconspicuous at the time when the ink layer is transferred onto the printing plate 1141. It is because the phases of the striped defects on the auxiliary form roller 1213 and the form roller 1201 and the auxiliary form roller 1213 differ from each other by the functions of the ink distributing rollers 1210 and 1211 oscillating in the axial direction.

Figure 9:
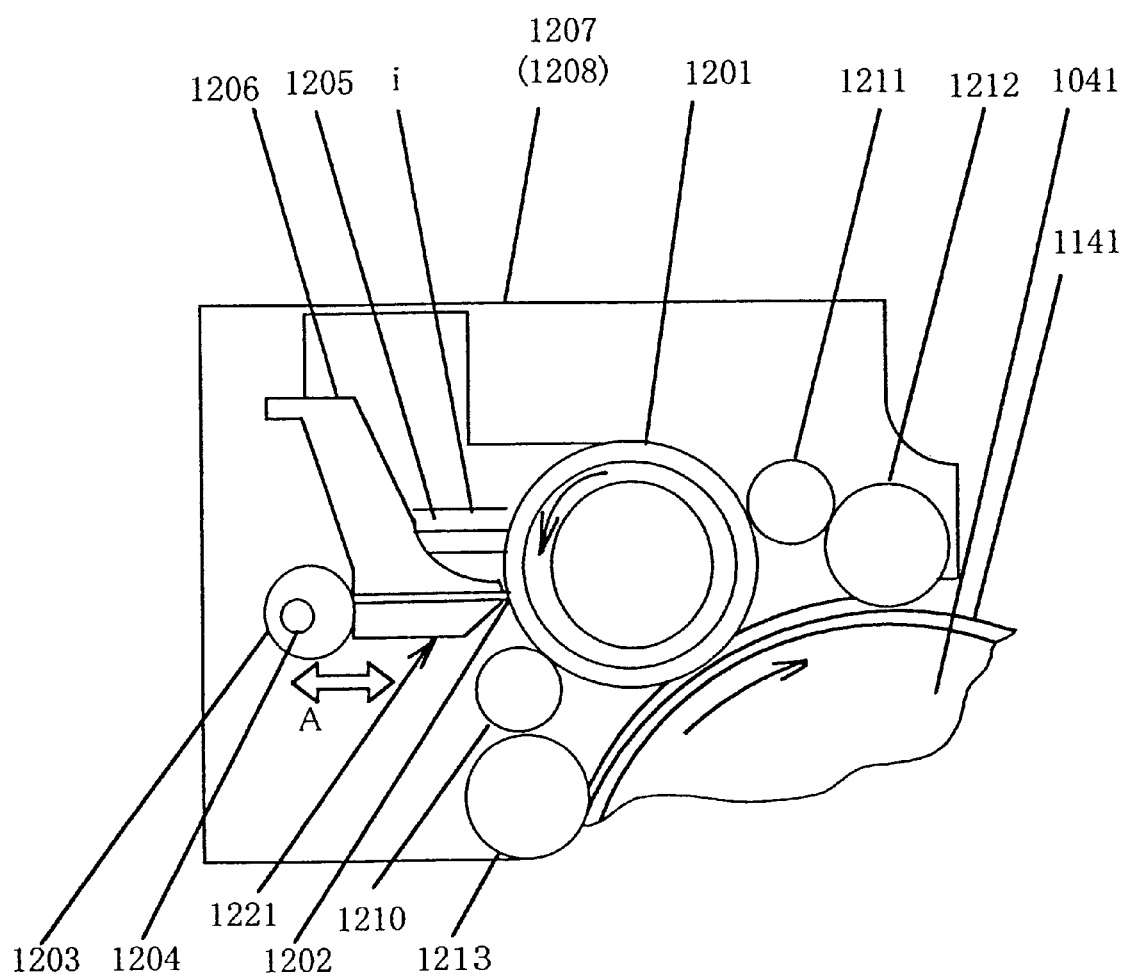
FIG. 9 is a cross-sectional view of a coating apparatus of one embodiment of the present invention.
Figure 10:
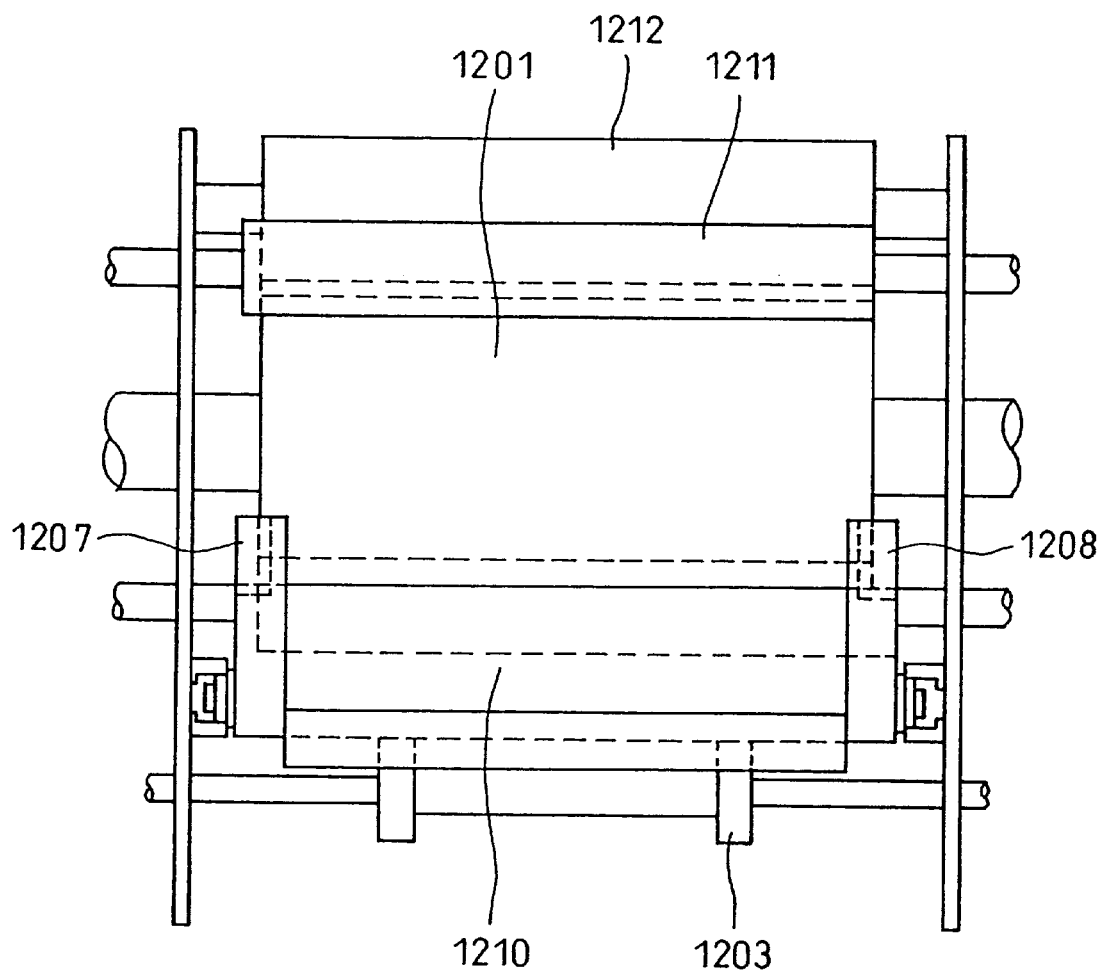
FIG. 10 is a plan view of a coating apparatus of one embodiment of the present invention.

For example, in the ink coating apparatus as shown in FIGS. 9 and 10, even if the striped defects are generated in the portion of the doctor blade 1202, each phase of the striped defects is axially shifted from the form roller 1201, and transferred onto the auxiliary form rollers 1212 and 1213 by the functions of the ink distributing rollers 1210 and 1211 oscillating in the axial direction. For this reason, the ink coating on the printing plate 1141 using each of the auxiliary form roller 1213, the form roller 1201, and the auxiliary form roller 1212 is performed in the state that the phase is axially shifted. As a result, the striped defects become inconspicuous on the printing plate 1141 serving as the coating surface.

The form roller 1201 used in this coating apparatus comprises, for example, a rubber or plastic elastomeric roller having an elastic surface. The structure of the elastic portion of the roller may be one layer. Preferably, a multilayer structure having two or more layers in which its hardness becomes higher than an inner layer as approaching to the surface layer may be used as shown in FIGS. 4, 8, 9, 11, and 12 since the generation of the striped defects can be reduced.

In this type of coating apparatus, the thickness of the coated ink film is controlled by only the change in the engagement between the doctor blade 1202 and the form roller 1201. If, for example, a rubber like nitrile rubber is used as material of the form roller 1201, the thickness of the coated ink film is changed by wear of the roller surface or plasticizer in the rubber is extracted and the surface hardness of the roller becomes 10° or more higher than an initial setting value when such a roller is used for a long period of time. As a result, there occurs a problem in which the striped defects are frequently generated because of paper dust.

For that reason, the form roller 1201 having the multilayer structure in which the hardness of the surface layer is set higher than that of the inner layer may be preferably used. Preferably, the uppermost surface layer is at least polyurethane rubber, and more preferably the respective layers may be polyurethane rubber.

Here, the condition "the hardness of the surface layer is set higher than that of the inner layer" includes the following cases. Namely, attention is paid to the adjacent two layers, and the relationship in which the hardness of the layer close to the surface is higher than that of the layer close to the interior is established in all adjacent two layers as a more favorable configuration. The above condition is not limited to the above-mentioned case. The above condition also means that the average hardness of the surface layer, which is obtained when the multilayer of rubber is divided into two halves in the radial direction, is higher than the average hardness of the inner layer (the average hardness is a value obtained when the total sum, which is obtained by multiplying hardness of each layer by the thickness, is divided by the total thickness). Therefore, even if the rubber layer does not have a definite layer structure, the above condition is satisfied in the case in which the above relationship is established when the layer is divided into two in view of the above point.

The reason why polyurethane rubber is used is as follows:

Polyurethane rubber is rich in elasticity and toughness, and has high tear strength and good abrasion resistance. Due to this, polyurethane rubber has a good dimensional stability at the time of friction between the form roller and the doctor blade, so that the thickness of the coated ink film can be maintained constant. Also, polyurethane rubber has a considerable low content of plasticizer as compared with nitrile rubber or the like, which is generally used in the printing apparatus. The change of the rubber hardness, which is caused when plasticizer in rubber is extracted, is small. Moreover, by use of the multilayer in which the hardness of the surface layer is set higher than that of the inner layer, polyurethane rubber can largely reduce the striped defects due to paper dust as compared with the single layer.

If all layers are formed of polyurethane rubber, abrasion of the roller surface is small. As a result, the change in the thickness of the coated ink film is low even if the roller is used for a long period of time. By use of the multilayer in which the hardness of the surface layer is set higher than that of the inner layer, the generation of the striped defects due to paper dust is low, and plasticizer in rubber is not extracted, so that the change in the rubber hardness is small. Therefore, the use of polyurethane rubber is favorable since good coating conditions can be maintained for a long period time.

In the above-mentioned ink unit, since the form roller 1201 and the doctor blade 1202 rub on each other through the ink layer, the form roller 1201 is easily worn. The wear of the form roller 1201 increases as the surface hardness of the form roller 1201 decreases. Also, the quantity of heat at the portion of the form roller 1201 increases, and ink temperature rises, with the result that they have an unfavorable influence on the printing conditions. In the single layer of polyurethane rubber had a disadvantage in which the surface hardness of the form roller could not be highly increased because of the limitation of hardness. In contrast, when the form roller is formed of the multilayer structure, the condition in which no striped defects are generated can be prepared by reducing the hardness of the inner layer even if the surface hardness of the uppermost layer is set to 50° or more, which cannot be used in the single layer. As a result, the form roller can be used without any problem.

In the form roller 1201 of polyurethane rubber, it is required that the engagement with the doctor blade 1202 be maintained constant. For this reason, there is favorably used an elastic structure In which the form roller is immediately returned to the original state from the deformed state. A foaming structure, which needs much time to return to the original state from the deformed state, is not favorable.

The present invention obtained the above-mentioned good advantages by using the polyurethane rubber of the multilayer structure, which was conventionally difficult to be manufactured.

As polyurethane rubbers that can be used in the present invention, there are UV Summit by Meiwa Rubber Industrial Co., Ltd, Uron H by Kinyousha Co., Ltd, New UV by Kanuki Roller Works, Col, Ltd, etc.

In a case where the form roller 1201 having the single structure of rubber or plastic elastomer is used, the surface hardness of the form roller 1201 is preferably set to 15° to 70° based on the rubber hardness defined by JISA (corresponding to a durometer A type by Shore). It is because it is difficult to form a thin ink film if the hardness is below 15°. Also, a stable ink film can neither be obtained and normal ink transfer to the plate surface can nor be performed if the hardness exceeds 70°.

The favorable value of the hardness is 25° to 50°. The reason is as follows:

Specifically, if the surface hardness of the form roller 1201 is low, a frictional heat between the form roller 1201 and the doctor blade 1202 pressure contacted to the form roller 1201 during the printing is largely generated. By this influence, the form roller 1201 is thermally expanded, a difference in peripheral speed between the form roller 1201 and the plate cylinders occurs and a slip is induced, and the blanket cylinders easily become dirty. The favorable value of the surface hardness of the form roller 1201, which can avoid the above problem, is 40° to 50°.

On the other hand, when the form roller 1201 having the multilayer structure of rubber or plastic elastomer is used, the stable ink film can be obtained by reducing the hardness of the inner layer even if the surface hardness exceeds 70°. There is no problem as long as the surface hardness does not become too low. Therefore, the favorable value of the hardness of the outermost layer of the form roller 1201 is 40° or more.

Next, the following will explain a favorable embodiment of each of the imaging apparatus of the present invention, the imaging method, the imaging medium, the printing system, the printing apparatus, and the printing method with reference to the drawings.

Figure 13:
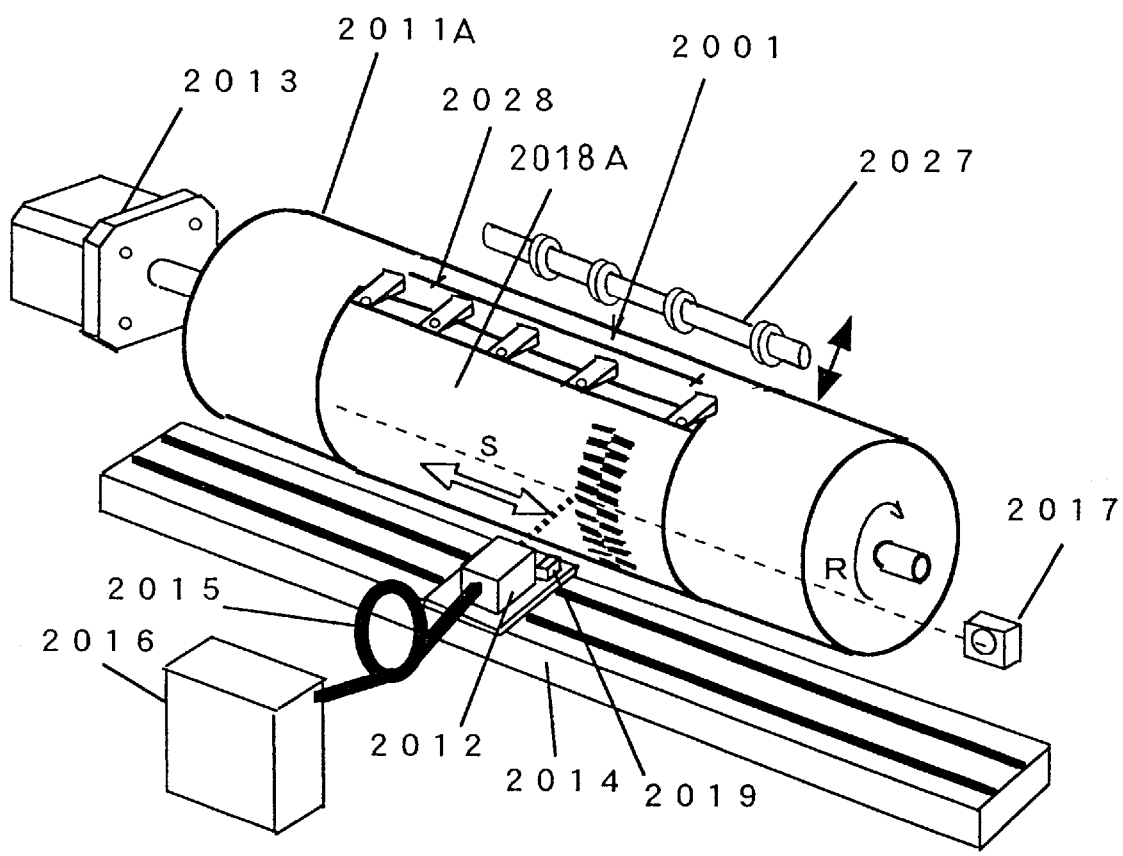
FIG. 13 is a perspective view showing an imaging apparatus of one embodiment of the present invention.

FIG. 13 shows a perspective view of one embodiment of the imaging apparatus of the present invention. As shown in FIG. 13, an imaging apparatus 2001 comprises a plate cylinder 2011A, serving as a medium support drum for winding an imaging medium 2018A around its outer surface, an imaging head 2012 including a beam irradiation source and an optical system for focusing beams emitted from the beam irradiation source, a control unit 2016 for controlling the beam irradiation source, and a cable 2015 for connecting the imaging head 2012 and the control unit 2016 to each other.

The imaging head 2012 is fixed onto a linear stage 2014 for realizing a parallel movement to an axial direction of the plate cylinder 2011A. The distance between the imaging head 2012 and the imaging medium 2018A is controlled such that the beams are focused on the surface of the imaging medium. The output of the beam irradiation source is controlled based on a value of a laser power detector 2017. More specifically, the output of the beam irradiation source is controlled in order to sufficiently generate the change in the physical properties such as physical projections and depressions or the change in solubility to solvent at a beam irradiated section and non-radiated section of the imaging medium 2018A.

Then, when the imaging of the print pattern is executed, the plate cylinder 2011A around which the imaging medium 2018 is wound is rotated in a direction of an arrow R of the figure directly by use of a drive motor 2013 such as a pulse motor or through a change gear. In addition, the beam irradiation source is switched according to imaging data as moving the imaging head 2012 fixed onto the linear stage 2014 in a direction of an arrow S parallel to the shaft of the plate cylinder in the figure. Thereby, the imaging apparatus 2001 generates the change in the physical properties such as physical concave and convex portions or the change in solubility to solvent on the surface of the imaging medium 2018A according to two dimentional imaging data.

In the imaging apparatus 2001, the use of a plurality of beam irradiation sources, which can drive independently, can be considered to improve the performance. In this case, the improvement of the performance of the imaging apparatus 2001 means improvement of imaging speed and resolution, and a trade-off relationship is established between the imaging speed and the resolution.

The resolution in this case shows how many dots can be formed per unit length, and dpi (dots per inch) is generally used as a unit. For example, 2540 dpi corresponds to 100 dots/mm.

Suppose that i lines continuous to a fast scan direction emitted simultaneously from i beam irradiation sources are imaged using the imaging head 2012 having i beam irradiation sources.

In this case, dot pitches $d_p$ for achieving a predetermined resolution r are 1/r. A direction R of lines imaged by the rotation of the plate cylinder 2011, is defined as a fast scan direction, and a direction S of lines imaged by the parallel movement of the imaging head 2012 is defined as a slow scan direction. The imaging head is shifted in the slow scan direction by a predetermined distance after finishing the imaging corresponding to one revolution in the fast scan direction. The predetermined distance is i times as large as the dot pitch $d_p$ on the imaging medium. Thereafter, next i lines are imaged, and a series of operations is repeated so that the imaging of the entire imaging area is finished.

Thus, by use of i beam irradiation sources, time required for imaging can be reduced to 1/i when the resolution is the same. In order to increase the resolution j times, it is needed that the dot pitch be set to $d_p/j$ and that the distance of the movement of the imaging head be set to $d_p \times i/j$. Then, time required for imaging results in j/i times.

Figure 14:
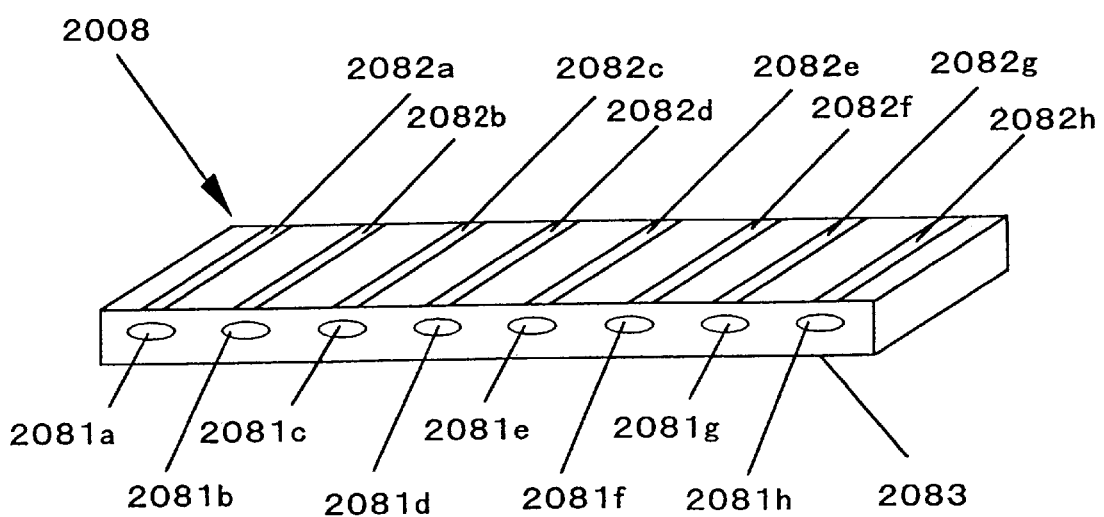
FIG. 14 is a perspective view showing a laser diode array used in an imaging apparatus of one embodiment of the present invention.

There is a laser diode array as one of methods using a plurality of beam irradiation sources. The general outline view is shown in FIG. 14.

A laser diode array 2008 includes eight laser diodes, which are capable of driving independently, in one chip. Laser beam emission ends 2081a to 2081h, drive side electrodes 2082a to 2082h, a rear face common electrode 2083 common to all laser diodes are provided to the eight diodes, respectively. A predetermined current to the drive side electrodes 2082a to 2082h allows the laser beam to be emitted from the corresponding laser beam emission ends 2081a to 2081h. In this case, the predetermined current means a current value more than a threshold value at which the laser diode starts to generate a laser beam.

Figure 15:
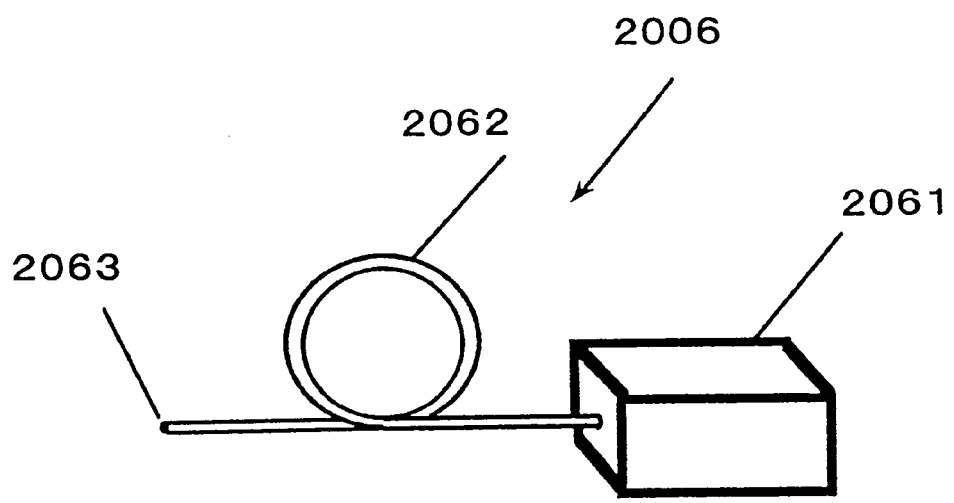
FIG. 15 is a perspective view showing a fiber array used in an imaging apparatus of one embodiment of the present invention.

There is a fiber array as one of another methods using a plurality of beam irradiation sources. The outline view of a laser apparatus 2006 for a fiber output is shown in FIG. 15.

The laser apparatus 2006 comprises a package section 2061 and an optical fiber 2062 for guiding a laser beam to an outer unit. The package section 2061 comprises a laser diode chip having at least one light-emission end, a conductive member for an electrical contact between an electrode of the diode chip and the outer unit, a heat conduction member for radiating heat from the diode chip to the outer unit, and an optical system for making the laser beam being incident onto the optical fiber from the laser diode. Then, the laser beam is emitted from an emission end 2063 of the optical fiber 2062.

Figure 16:
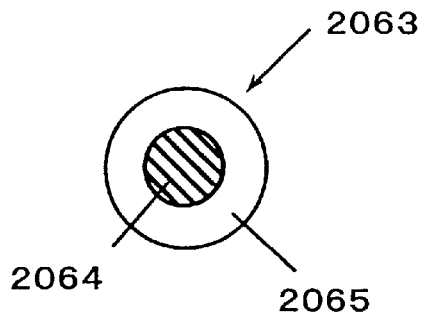
FIG. 16 is a front view showing an outgoing end of the optical fiber of FIG. 15.

The emission end 2063 of the optical fiber 2062 shown in FIG. 16 has a core portion 2064 and a clad portion 2065, and the laser beam is emitted from the core portion 2064. Then, the emission ends 2063 of the plurality of fibers of the laser apparatus for the fiber output are arranged in an array form and fixed to form the fiber array. When the fiber array is used as the beam irradiation source, the minimum distance between the beam irradiation sources is restricted by an outside dimension of the clad portion 2065.

Figure 17:
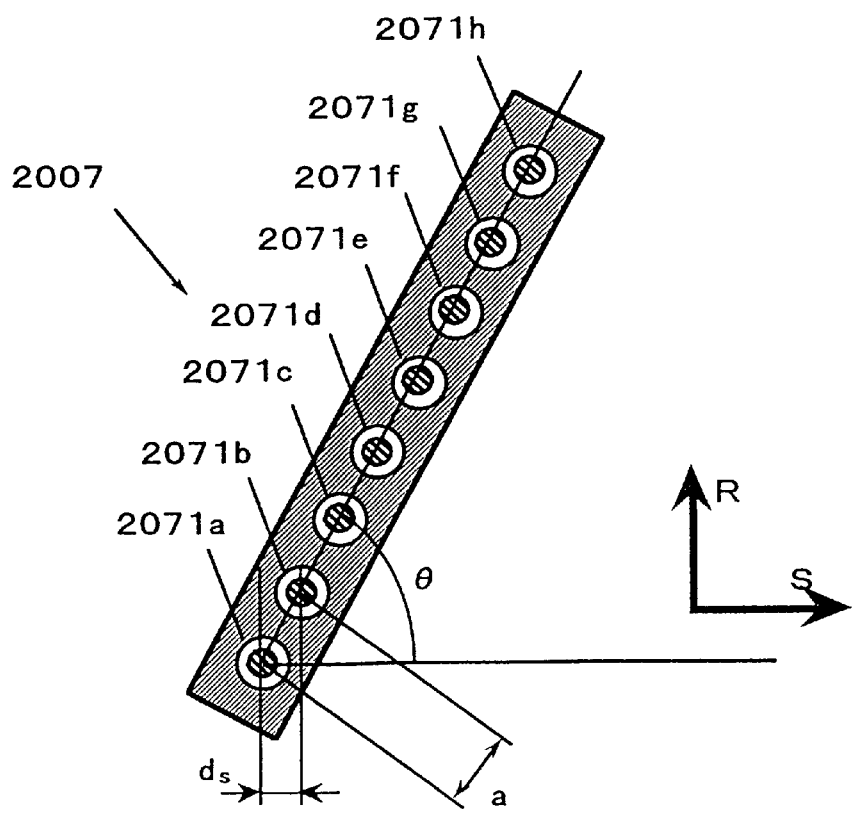
FIG. 17 is a front view for explanation of an inclination of an array.

In many cases, it is impossible to arrange the beam irradiation sources, that are the respective emission ends, to be close to each other without any space in either of the methods of the laser diode array and the fiber array. In order to perform the imaging in the imaging area of the imaging medium without any space, the array must be inclined to the slow scan direction S by a predetermined angle θ as shown in FIG. 17. An array 2007 comprises eight beam irradiation sources 2071a to 2071h, and its inclination angle θ is defined by the following equation (1).

$$\cos\theta = d_s/a \qquad \text{Eq. (1)}$$

where a is the interval between the beam irradiation sources, a dot pitch at light source surface $d_s$ that is obtained by converting the dot center pitch corresponding to the predetermined resolution in the slow scan direction S to the dimension on the beam irradiation source surface, which is obtained by dividing the medium surface dot pitch $d_p$ by the magnification of the optical system. For example, when the resolution is 2540 dpi, i.e, $d_p=10$ μm and the magnification of the optical system is ¼, $d_s=40$ μm is met.

In order to improve the quality of printing in the multi-color printing, it is obviously important to improve the position accuracy of the dots on the imaging medium imaged by the imaging apparatus having a single head or a plurality of imaging heads. It is also obviously important to align the imaging start position of the imaging medium for each color. In other words, if the imaging medium is directly imaged without using the intermediate member and the imaging start position of the imaging medium is set to the same position, a minute positional shift of the printing pattern of the imaging medium of each color in the multi-color printing can be can be reduced, which is effective means for improving the quality of multicolor printing without taking much time.

Conventionally, sharing of the positioning method, the attaching method, and components were not conducted between the imaging apparatus and the printing apparatus for the following reasons: 1) the direct imaging to the imaging medium was not often performed, 2) there was few common items in the technical concept in manufacturing the apparatus, e.g., the imaging apparatus aimed to obtain weight reduction while the printing apparatus aimed to increase strength to obtain high quality of printing, 3) generally, the manufacturers are not the same in the imaging apparatus and the printing apparatus.

Even these days when immediate preparation of the imaging medium by the imaging apparatus is frequently done, the above-mentioned sharing has not been conducted.

The feature of the printing system of the present invention lies in the point that the positioning method of the imaging medium in the printing apparatus is substantially the same as used the imaging apparatus. For example, in the imaging apparatus in which the positioning holes are provided in the imaging medium and the printing pattern is directly formed on the imaging medium with the energy beam with reference to the positioning holes, the plate cylinder used in the printing apparatus is provided as the attaching member of the imaging medium. Thereby, the reference attaching position of the imaging medium to the imaging apparatus and the reference attaching position to the printing apparatus are set to be the same as each other.

In this way, the minute positional shift, which is caused by the difference in the reference attaching position of the imaging medium between the respective apparatus, is eliminated. Moreover, the minute positional shift, which is caused by the curvature specific to the plate cylinders of both apparatus and the habit of the apparatus caused at the time of winding the imaging medium, can be minimized. As a result, the designing and manufacturing cost is reduced by sharing the plate cylinders. Thereby, the printing apparatus and the imaging apparatus are structured at reasonable cost.

Even in a case where the complete sharing with the plate cylinders of the printing apparatus cannot be executed due to weight reduction of the plate cylinders of the imaging apparatus, the structure of the imaging medium attaching section may be shared. Thus, the minute positional shift, which is caused by the difference in the reference attaching position of the imaging medium between the respective apparatus, can be minimized. Also, the minute positional shift, which is caused by the curvature peculiar to the plate cylinders of each apparatus and the habit of the apparatus caused at the time of winding the imaging medium, can be minimized. Therefore, it is obvious that the high quality printing in which the positional shift of the similar imaging mediums is small can be carried out as well as the case of the sharing of the plate cylinders.

Figure 18:
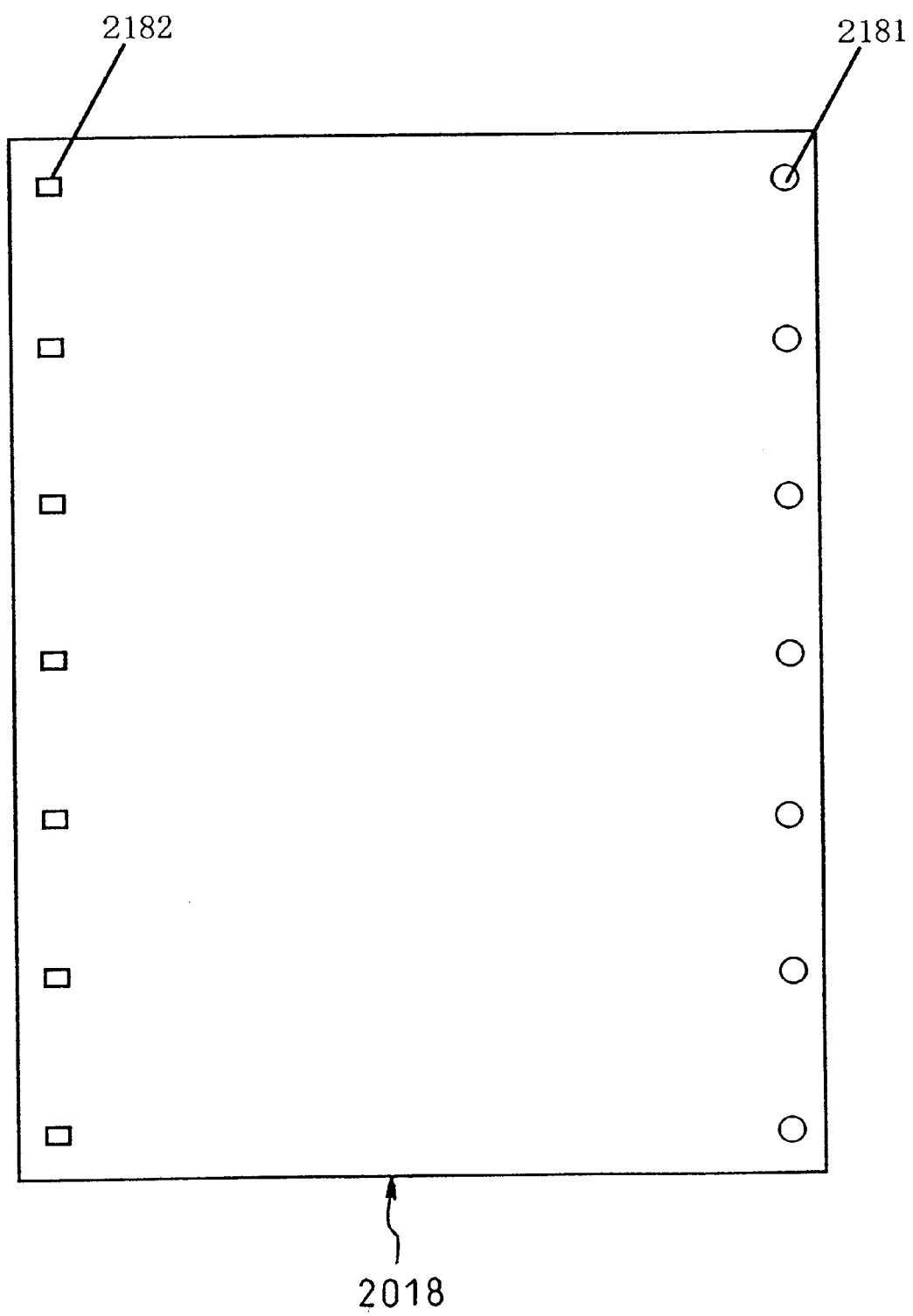
FIG. 18 is a plan view of an imaging medium for an imaging apparatus of one embodiment of the present invention.

FIG. 18 shows an example of the imaging medium in the case where the positioning method of the imaging medium in the printing system of the present invention is carried out by engaging positioning holes provided in the imaging medium with positing pins provided in the imaging apparatus. FIG. 13 is a perspective view of the imaging apparatus relating to this case.

As shown in FIG. 18, an imaging medium 1018A has a plurality of positioning holes 2181 at the imaging medium head portion and attaching holes 2182 at the imaging medium bottom portion. In the plurality of positioning holes 2181 and the attaching holes 2182, the imaging medium is cut such that two sides, having at least one of two sides along the feeding direction to the plate cylinder and a head side of the imaging medium, intersect at right angles at the time of preparing the imaging medium 2018A. Thereafter, the positioning holes 2181 and the attaching holes 2182 are correctly processed to predetermined shapes by a special-purpose processing machine based on the two sides intersecting at right angles. In the plate making and the printing, the reference attaching position of the imaging medium is set to the plurality of positioning holes 2181. Two sides, that is, the side, serving as a reference of holing, and the head side of the imaging medium, do not necessarily intersect at right angles. However, two sides preferably intersect at right angles since workability increases in the cutting process of the imaging medium, the holing process of the positioning holes 2181, and the packing process of the imaging medium.

The engagement of the positioning holes 2181 provided in the imaging medium with the positioning pins provided in the imaging apparatus will be explained as follows. That is, for use of a resin film as the base material of the imaging medium, when the opening diameter of each of the positioning holes of the imaging medium is larger than the outer diameter of each of the positioning pins, the difference between the opening diameter and the outer diameter are smaller than the dot pitch. On the other hand, when the opening diameter of each of the positioning holes of the imaging medium is smaller than the outer diameter of each of the positioning pins, the positioning is preferably set to a range in which the positioning holes provided in the resin film are not broken.

The reason will be explained as follows. That is, for use of the resin film as the base material of the imaging medium, even if the outer diameter of each of the positioning pins is larger than each of the opening diameters of the positioning holes 2181, the resin film is elastically deformed and the positioning pins are fitted to the positioning holes. As a result, a good positioning can be made without breaking the positioning holes. However, when the outer diameter of each of the positioning pins is smaller than each of the opening diameters of the positioning holes 2181, the positioning accuracy worsens by a space between the positioning holes 2181 and the positioning pins.

For use of metal as the base material of the imaging medium, the opening diameter of each of the positioning holes 2181 provided in the imaging medium is preferably larger than the outer diameter of each of the positioning pins. And, the difference between the opening diameters and the outer diameters is preferably smaller than the dot pitch.

The reason will be explained as follows. That is, for use of metal as the base material of the imaging medium, when the outer diameter of each of the positioning pins is larger than the opening diameter of each of the positioning holes, the positioning holes are broken and the positioning accuracy worsens. When the outer diameter of each of the positioning pins is much smaller than the opening diameter of each of the positioning holes, the positioning accuracy worsens by the space between the positioning holes and the positioning pins.

Figure 19:
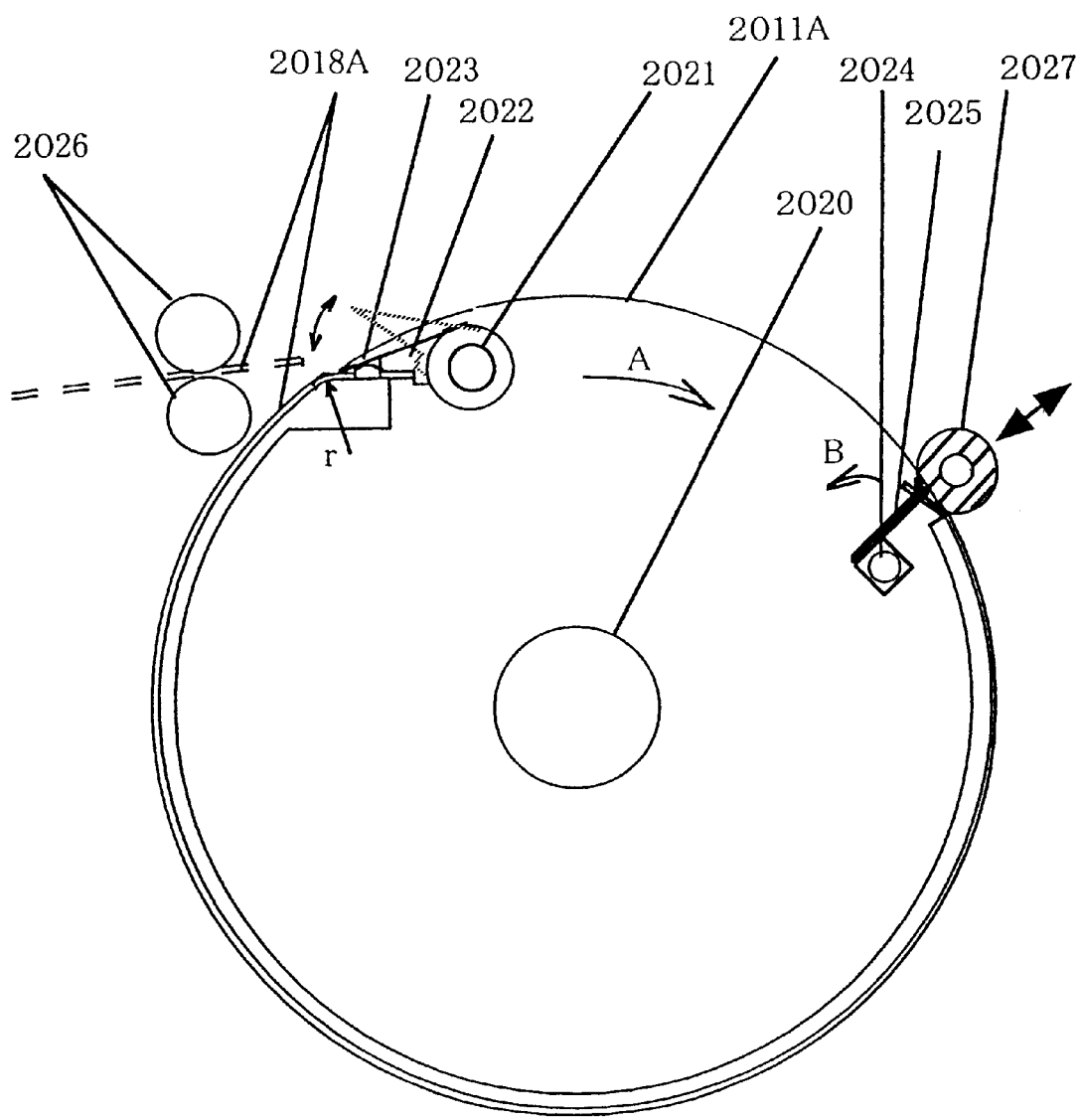
FIG. 19 is a cross-sectional view of a plate cylinder of an imaging apparatus of one embodiment of the present invention.

An operation of attaching/detaching the imaging medium to/from the imaging apparatus in this embodiment will be explained as follows:

FIG. 19 shows the state in which the imaging medium 2018A is attached to a plate cylinder 2011A in the imaging apparatus 2001 of FIG. 13.

The imaging medium 2018A mounted on a stocker (not shown) is fed to the plate cylinder 2011A by a feeding roller 2026. The plate cylinder 2011A has the same structure as the pin-attaching typed plate cylinder of the printing apparatus. The plate cylinder 2011A comprises a shaft 2020, a pin row 2023 for positioning, a head portion fixing claw 2022, and a bottom portion fixing claw 2025. The shaft 2020 holds the plate cylinder 2011A to be rotatable, and serves as a center of rotation. The pin row 2023 for positioning is axially arranged to be engaged with the positioning holes of the head portion of the imaging medium 2018A. The head portion fixing claw 2022 is a member for fixing the head portion of the imaging medium 2018A in a state that a shaft 2021 is a center of rotation. The bottom portion fixing claw 2025 is a member for fixing the bottom portion of the imaging medium 2018A in a state that a shaft 2024 is a center of rotation and for applying tension to the imaging medium 2018A so as to eliminate looseness of the imaging medium.

In order to maintain the phase of the plate cylinder 2011A at the plate cylinder stopping time, a sensor (not shown) detects the phase to control a drive motor 2013, thereby controlling the stopping position. The imaging medium 2018A sent to the plate cylinder 2011A stopped at a predetermined position is stopped to be fed by a feed roller 2026 for feeding the imaging medium by a signal from a position detecting sensor (not shown) for detecting the head position of the imaging medium 2018A. Also, the imaging medium 2018A is positioned by engaging the positioning holes 2181 with the pin row 2023 when the head fixing claw 2022 actuates in accordance with the signal from the position detecting sensor and rotates anticlockwise.

A pressing force is applied to the pin row 2023 through the shaft 2021 having the head fixing claw 2022 by a spring, etc. As a result, the imaging medium 2018A whose head portion is positioned is surely held on the plate cylinder 2011A. Thereafter, the plate cylinder 2011A is rotated by the drive motor 2013 at considerable low speed less than $\frac{1}{10}$ of the peripheral speed of 2 to 10 m/sec at which the imaging operation is executed. Also, the imaging medium 2018A is wound around the plate cylinder 2011A as being fed by the feeding roller 2026 at the same peripheral speed as the plate cylinder 2011A.

The portion of intersection between the pin row 2023 and the outer periphery of the plate cylinder 2011A is finished such that no flaws are formed on the imaging medium 2018A at the attaching time and no looseness is generated in the imaging medium 2018A. More specifically, the portion of intersection between the pin row 2023 and the outer periphery of the plate cylinder 2011A is finished to have a smooth curvature r with a radius of about 15 mm along the peripheral direction of the plate cylinder 2011A. As a result, the flaws are not easily formed on the imaging medium at the winding time.

A pressing roller 2027 is placed around the plate cylinder 2011A. The pressing roller 2027 comprises a metal shaft having a plurality of rollers formed of soft and elastic material such as rubber sponge. The pressing roller 2027 is freely rotatable, and has a touching/detouching mechanism to/from the plate cylinder 2011A. Also, when the plate cylinder 2011A rotates, the roller 2027 is rotated while engaged such that no looseness is generated in the imaging medium 2018A wound around the plate cylinder 2011A.

The plurality of rollers of the pressing roller 2027, the head portion fixing claw 2022, and the bottom portion fixing claw 2025 are arranged to be axially shifted such that the rollers and the claws do not collide with each other.

At the time when the imaging medium bottom portion of the imaging medium 2018A passes through the pressing roller 2027 by the rotation of the plate cylinder 2011A, the bottom portion attaching claw 2025 is driven by a cam (not shown) and rotates about the shaft 2024 in a B direction. Tension is applied to the imaging medium 2018A by the spring through the bottom portion fixing claw 2025 inserted to a attaching hole 2128 of the bottom portion. Also, the pressing roller 2027 is separated from the plate cylinder 2011A by the connecting/separating mechanism. In this way, the attaching operation of the imaging medium 2018A is ended.

A register mark 2028 is provided on the plate cylinder 2011A as shown in FIG. 13, and a register mark detecting apparatus 2019 provided on the imaging head 2012 reads the register mark 2028. Thereby, the imaging apparatus 2001 confirms the positional relationship between the imaging head 2012 and the plate cylinder 2011A, and starts imaging. The position of the imaging medium 2018A attached to the plate cylinder 2011A is maintained by the pin row 2023.

When the imaging is started at a predetermined position by the imaging head 2012 as controlling and driving the plate cylinder 2011A at a fixed peripheral speed, the printing pattern is formed at a determined position on the imaging medium 2018A. Therefore, in the multicolor printing, the minute position shift of the imaging pattern of the imaging medium of each color can be minimized and the imaging medium having high position accuracy can be created without taking much time.

The engagement of the positioning holes 2181 provided in the imaging medium 2018A with the positioning pins 2023 provided in the imaging apparatus 2001 will be explained as follows. That is, for use of the resin film as the base material of the imaging medium 2018A, when the opening diameter of each of the positioning holes 2181 of the imaging medium is larger than the outer diameter of each the positioning pins, the difference between the opening diameters and the outer diameters is smaller than the dot pitch. On the other hand, when the opening diameter of each of the positioning holes 2181 is smaller than each of the outer diameters of the positioning pins, the positioning is preferably set to a range in which the positioning holes 2181 provided in the resin film are not broken.

For use of metal as the base material of the imaging medium, as mentioned above, the engagement of the positioning holes 2182 provided in the imaging medium with the positioning pins are preferably set such that the opening diameter of each of the positioning holes 2181 is larger than the outer diameter of each of the positioning pins and that the difference between the opening diameters and the outer diameters is smaller than the dot pitch.

In order to satisfy the above condition, at least one of the size, the arrangement, and the shape in the positioning holes and the positioning pins may be changed at each of the cases when the imaging medium is the resin film and when the imaging medium is the metal.

For example, it is assumed that the pin diameter of the pin row 2023 of the plate cylinder 2011A is the same as in the case when the imaging medium is the resin film and the case when the imaging medium is the metal. When the base material is the resin film, the diameter of each of the positioning holes 2181 provided in the imaging medium is larger than that of the positioning pins and the difference between the positioning pins and the positioning holes is smaller than the dot pitch. Or, the diameters of the positioning holes may be smaller than those of the positioning pins in the range where the positioning holes are not broken. When the base material is the metal, the diameters of the positioning holes may be larger than those of the positioning pins, and the difference between the positioning pins and the positioning holes may smaller than the dot pitch.

As another example, it is assumed that the diameters of the positioning holes 2181 are the same as in the case when the resin film is used as the base material of the imaging medium and in the case when the metal is used as the base material. When the base material is the resin film, the pin diameters of the pin row 2023 of the plate cylinder 2011A are smaller than those of the positioning holes and the difference between the positioning pins and the positioning holes is smaller than the dot pitch. Or, the diameters of the positing pins may be larger than those of the positioning holes in the range where the positioning holes are not broken. When the base material is the metal, the diameters of the positioning pins may be larger than those of the positioning holes and the difference between the positioning pins and the positioning holes may be smaller than the dot pitch.

In this case, a half of the pins of the pin row 2023 may be used for the film and the other half may be used for the metal. As the method for arranging the pins of the pin row 2023, there is a method in which the pins of both ends are used for the film and the inner pins are used for the metal, and the further inner pins are used for the film in order. Or, there is a method in the pins for the film and the pins for the metal are arranged in a staggered form. To sum up, the same effect can be obtained by either method unless the pins for the film and the pins for metal are arranged in the same phase in the circumferential direction.

Also, as another method, the pin shapes of the pin row 2023 provided in the plate cylinder 2011A are differently formed such as circles and squares in each of the cases when the imaging medium base material is the film and when the imaging medium base material is the metal. The holes of the imaging medium placed at the positions where no pins are used for positioning may be sufficiently enlarged with respect to the pins. According to the present invention, the holes with the diameter of 5 to 4.995 mm were formed in the imaging medium of the film base material with respect to the pins having the diameter of 5 to 4.995 mm.

As mentioned above, at least one of the sizes, the arrangement, and the shapes in the positioning holes and the positioning pins, which are used for positioning the imaging medium 2018A in the imaging apparatus 2001, may be changed in each of the cases when the imaging medium is the resin film and when the imaging medium is the metal. In the method other than the above-mentioned methods, it is obvious that the same effect can be obtained if two or more of the size, the arrangement, and the shape in the positioning holes and the positioning pins are changed.

Next, the example of the imaging apparatus using the imaging medium with no positioning holes will be explained with reference to FIGS. 20 and 21.

Figure 20:
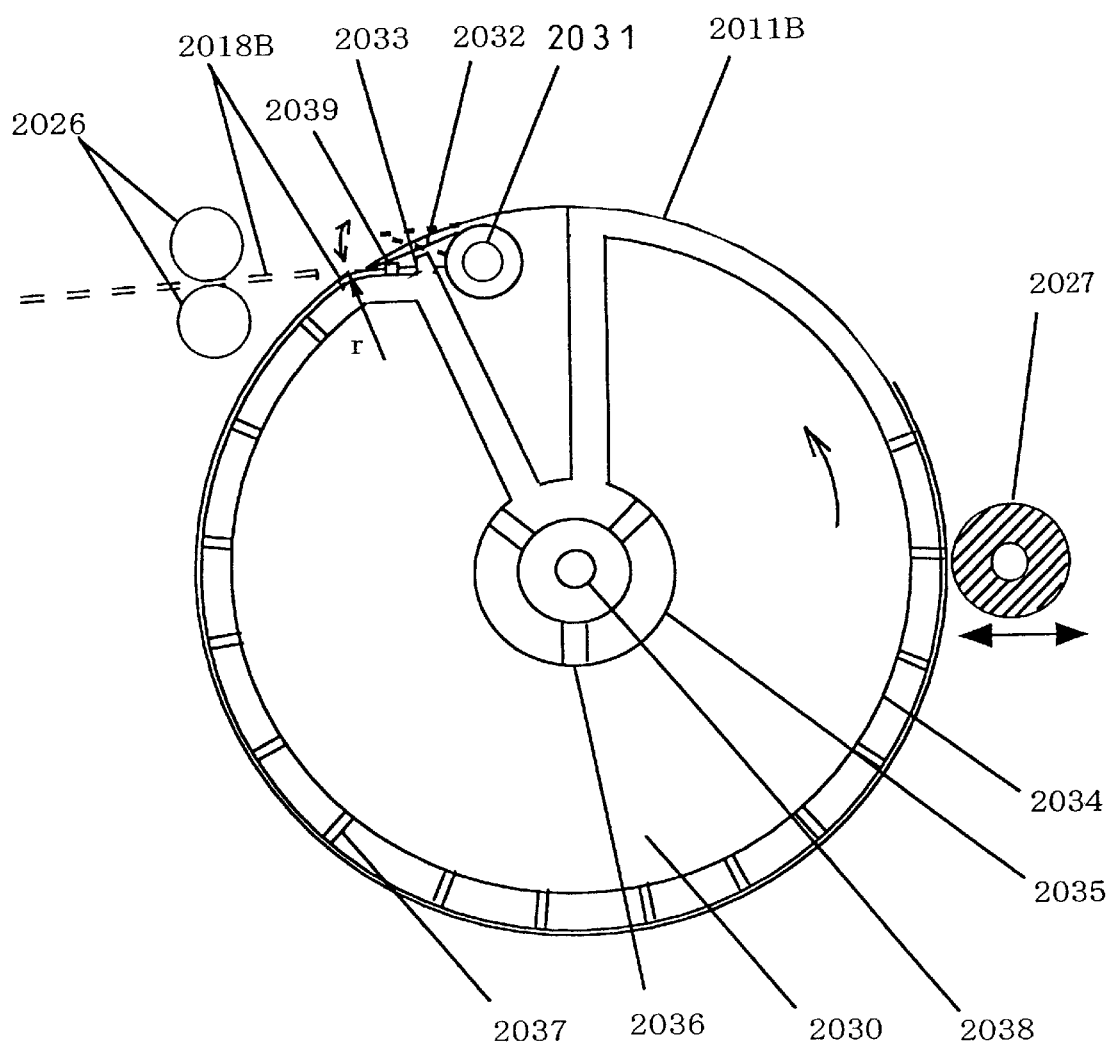
FIG. 20 is a cross-sectional view of a plate cylinder of an imaging apparatus of another embodiment of the present invention.

As shown in FIG. 20, after preparing an imaging medium 2018B having the two sides along the feeding direction to the plate cylinder, one of which intersects with the head side of the imaging medium at right angles, the imaging medium 2018B is attached to the stocker (not shown). Then, the imaging medium 2018B is fed to a plate cylinder 2011B by the feeding roller 2026.

The plate cylinder 2011B has the same structure as the plate cylinder of the printing apparatus of the system in which the imaging medium is fixed by the griping claw. Specifically, the plate cylinder 2011B comprises a shaft 2038, a projection 2033 for positioning in the circumferential direction, a projection 2039 for positioning in the axial direction, a gripping claw 2032, and a suction hole 2037. The shaft 2038 holds the plate cylinder 2011B to be rotatable, and serves as a center of rotation. The projection 2033 abuts against the side of the head portion of the imaging medium 2018B to be positioned in the circumferential direction. The gripping claw 2032 fixes the head portion of the imaging medium. The suction hole 2037 fixes the bottom portion of the imaging medium by vacuum suction.

In the above case, a portion ranging from a portion close to a point where two sides of the imaging medium intersect at right angles to the side of the medium head portion corresponds to the abutting portion of the imaging medium processed to the predetermined shape in the present invention. Note that the respective sides do not necessarily intersect at right angles as far as they are formed to the predetermined shapes.

In order to maintain the phase of the plate cylinder 2011B at the plate cylinder stopping time, a sensor (not shown) detects the phase to control the drive motor 2013, thereby controlling the stopping position. The imaging medium 2018B, which is sent to the plate cylinder 2011B stopped at a predetermined position, is stopped to be fed by the feed roller 2026 by a signal from a position detecting sensor (not shown) of the imaging medium head position. Also, the imaging medium 2018B is positioned by abutting the respective sides of the imaging medium 2018b against the projection 2033 for positioning circumferentially and the projection 2039 for positioning axially.

A pressing force is applied to the head portion fixing claw 2022 through the shaft 2031 by a spring, etc, thereby the imaging medium 2018B whose head portion is positioned is surely held on the plate cylinder 2011B. Thereafter, the plate cylinder 2011B is rotated by the drive motor 2013 at considerable low speed less than 1/10 of the peripheral speed of 2 to 10 m/sec at which the imaging operation is executed. Also, the imaging medium 2018B is wound around the plate cylinder 2011B as being fed by the feeding roller 2026 at the same peripheral speed as the plate cylinder 2011B.

A point of intersection between the circumferential positioning portion and the outer periphery of the plate cylinder 2011B is finished such that no flaws are formed on the imaging medium 2018B at the attaching time and no looseness is generated in the imaging medium 2018B, i.e., the point of intersection between the circumferential positioning portion and the outer periphery of the plate cylinder 2011B is finished to have a smooth curvature r of about 15 mm along the peripheral direction of the plate cylinder 2011B. As a result, the flaws are not easily formed on the imaging medium when the imaging medium is wound around the plate cylinder.

The pressing roller 2027 is placed around the plate cylinder 2011B. The pressing roller 2027 comprises a metal shaft having a plurality of rollers formed of soft and elastic material such as rubber sponge. The pressing roller 2027 is freely rotatable, and has a connecting/separating mechanism to/from the plate cylinder 2011B.

Also, when the plate cylinder 2011B rotates, the roller 2027 is pressingly rotated such that no looseness is generated in the imaging medium 2018B wound around the plate cylinder 2011B.

The plurality of rollers of the pressing roller 2027 and the head portion fixing claw 2022 are arranged to be axially shifted such that the rollers and the fixing claws do not collide with each other.

The suction is started through a hole 2036 from a vacuum suction hole 2038 by a suction apparatus (not shown) at the same time with starting the rotation of the plate cylinder 2011B. Then, the imaging medium 2018B wound around the plate cylinder 2011B is sucked and fixed from an imaging medium suction hole 2037 through a space 2030 surround with a side plate of the plate cylinder 2011B, and bulkheads 2034, 2035. Then, at the time when the bottom portion of the imaging medium 2018B passes through the pressing roller 2027, the pressing roller 2027 releases the engagement to the plate cylinder 2011B and separates therefrom, thereby the attaching operation to the imaging medium 2018B is ended.

Figure 21:
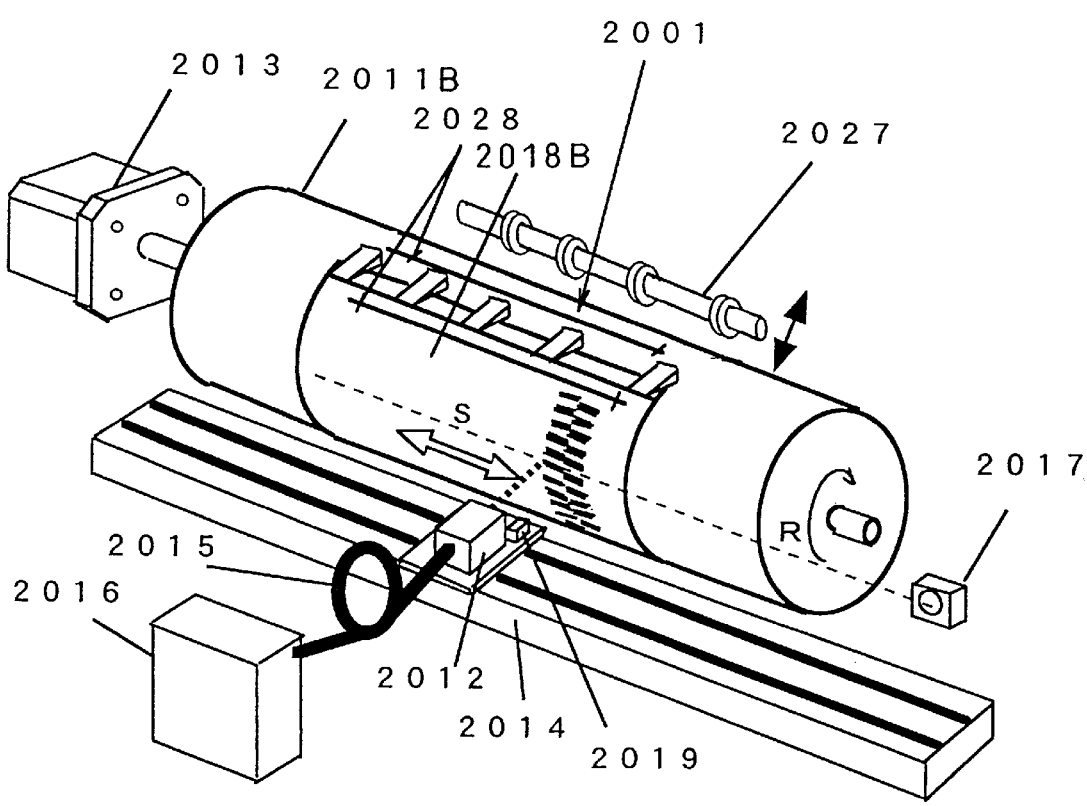
FIG. 21 is a perspective view of an imaging apparatus of one embodiment of the present invention.

As shown in FIG. 21, a register mark 2028 is provided on the plate cylinder 2011B, and the register mark 2028 is read by a register mark detecting apparatus 2019 formed on the imaging head 2012. Thereby, the positional relationship between the imaging head 2012 and the plate cylinder 2011B is confirmed, and the imaging is started. The attaching position of the imaging medium 2018B attached to the plate cylinder 2011B is maintained by abutting the end surface of the imaging medium 2018B against the projection 2033 for positioning circumferentially and the projection 2039 for positioning axially. Therefore, if the imaging is started at the predetermined position by the imaging head 2012 as controlling and driving the plate cylinder 2011B at a fixed peripheral speed, the printing pattern is prepared at the predetermined position on the imaging medium 2018B.

As a result, it is possible to minimize the minute positional shift of the printing pattern of the imaging medium of each color in the multicolor printing. Then, the imaging medium with high positional accuracy can be prepared without taking much time.

The following will explain another method for correctly preparing the printing pattern at the predetermined position on the imaging medium 2018. The following process is carried out before the imaging medium 2018 is attached to the imaging apparatus 2001 to image the print pattern. As shown in FIG. 21, the positions of a plurality of register marks 2028P (register holes for positioning is possible) formed on the imaging medium 2018 in advance are detected from the imaging head by a register detecting apparatus 2019 provided at the predetermined position. Thus, the position of the imaging medium 2018 in the circumferential direction and that of the imaging medium 2018 in the axial direction are detected.

Thereafter, the imaging is started at the predetermined position by the imaging head 2012 based on the detected circumferential and axial positions of the imaging medium 2018 as controlling and driving the plate cylinder 2011 at the fixed peripheral speed. As a result, the printing pattern is prepared at the correct position on the imaging medium 2018. Then, it is possible to minimize the minute positional shift of the printing pattern of the imaging medium for each color in the multicolor printing. Also, the imaging medium with high positional accuracy can be prepared without taking much time. The method using the register marks formed on the imaging medium may be supplementally used to improve the accuracy of the abutting method shown in FIGS. 20 and 21.

According to the method in which a plurality of register marks formed on the imaging medium 2018 in advance or a plurality of register pin hole positions are used as a reference for imaging, the imaging medium is not necessarily formed to have the rectangular outline. Also, an imaging medium having the two sides along the feeding direction to the plate cylinder, one of which intersects with the head side of the imaging medium at right angles, and it can be easily inferred that even in this case the imaging medium with high position accuracy can be obtained by executing the imaging medium cutting process and the holing processing based on the plurality of register marks in a post-process. However, the two sides preferably intersect at right angles since workability increases in the imaging medium cutting process and the holing process of the positioning holes 2181, and the imaging medium packing process.

Next, the imaging medium is detached from the plate cylinder of the imaging apparatus as follows.

Figure 22:
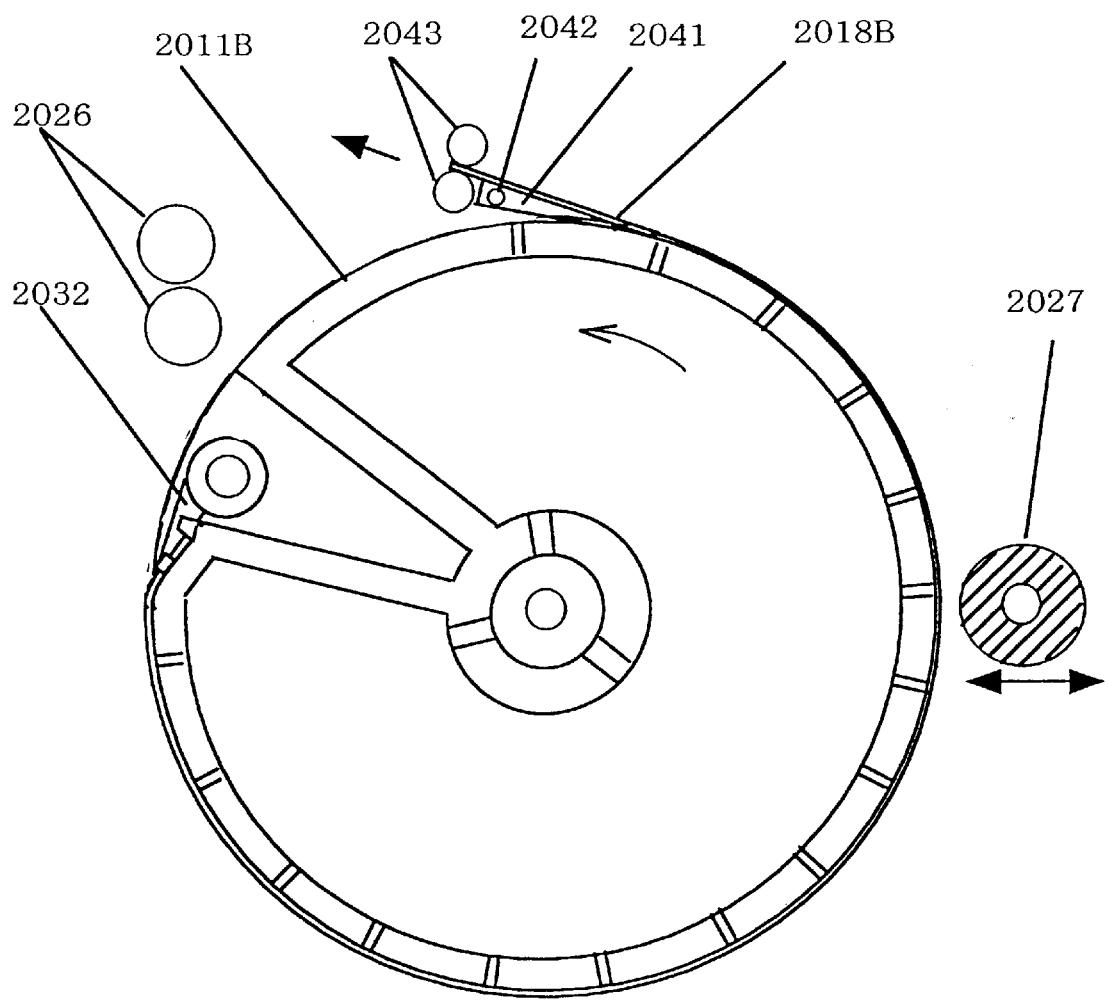
FIG. 22 is an explanatory view of a detachment of an imaging medium of one embodiment of the present invention.

For instance, in the case of the apparatus shown in FIG. 20, the rotation of the plate cylinder 2011B is stopped after the imaging of the printing pattern is ended as shown in FIG. 22. Thereafter, the plate cylinder 2011B is rotated in the direction opposite to the case of the imaging time by the driving motor 2013.

At this time, the plate cylinder 2011B is rotated at considerable low speed less than 1/10 of the peripheral speed of 2 to 10 m/sec at which the imaging operation is executed in order that no flaws are formed on the imaging medium 2018. At the same time with the rotation of the plate cylinder 2011B, the imaging medium 2018 is sequentially separated from the plate cylinder 2011B by a separation claw 2041 for separating the imaging medium 2018. The separation claw 2041 has the touching/detouching mechanism to/from the plate cylinder 2011B around a shaft 2042. Then, the imaging medium 2018 is discharged by an image medium discharge roller 2043 whose peripheral speed is the same as the plate cylinder 2011B.

The head portion fixing claw 2022 by which the head portion of the imaging medium 2018 is fixed is rotated by a cam (not shown) and releases the imaging medium 2018B before reaching the separation claw 2041. As a result, the imaging medium 2018B is smoothly discharged by the plate cylinder 2011B so as to be sent to a post-process. This operation is not limited to the apparatus shown in FIG. 20. Namely, this operation can be easily applied to the apparatus having the positioning pin row shown in FIG. 19 if only a member for lifting the imaging medium head portion is added thereto.

Generally, in the imaging medium making apparatus, which carries out the positioning of the imaging medium, in many cases, the fixing of the imaging medium is made by firmly fixing the imaging medium head portion by the fixing claw. Then, a complicated mechanism is required in detaching the imaging medium. Therefore, as mentioned above, the plate cylinder is inversely rotated in detaching the imaging medium. Then, the imaging medium is detached from the imaging medium bottom side having the structure in which the imaging medium is relatively easily detached. As a result, the imaging medium can be surely detached with the simple structure without damaging the imaging medium.

Also, the direction of moving the imaging medium in attaching and detaching the imaging medium is reversely set so that the work side where the imaging medium is attached and detached can be provided at the same side. As a result, the work side can be concentrated at one location, and it is unnecessary to provide extra locations at the opposite work side of the imaging apparatus and the right and left sides thereof. Therefore, the imaging apparatus having a good workability can be easily configured even if the setting space is small.

Moreover, the image medium feeding apparatus and the discharge apparatus are provided at the same side, so that the imaging medium can be continuously fed and discharged. Therefore, the continuous imaging operation can be carried out and the apparatus can be set at the location having a small area since the operation sides are provided at the same location.

As mentioned above, the imaging medium positioning method to the plate cylinder and the fixing method in the printing apparatus 1001 shown in FIGS. 1 and 2 is the same as in the imaging apparatus. Then, there is no the minute positional shift, which is caused by the difference in the reference position for attaching imaging medium between the printing apparatus and the imaging apparatus.

The positioning method of the imaging medium to each of the plate cylinders 1141 to 1144 of the printing apparatus 1001 is substantially the same as the positioning method of the imaging medium to the plate cylinders 2011 of the imaging apparatus 2001. For example, it is assumed that the imaging medium is positioned by the method in which the positioning holes are provided in the imaging medium and the positing pins are provided in the plate cylinder side in the imaging apparatus. In this case, the same method or the method for detecting the positions of the positioning holes is preferably used even in the printing apparatus.

Also, when the imaging medium is positioned by the method using the abutting portion of the imaging medium and the abutment receiving portion of the plate cylinder, the same method is preferably used in the printing apparatus. If the sufficient positioning accuracy can be expected, the imaging medium may be positioned by the method using the pin holes in the imaging apparatus, and is positioned by the abutting method in the printing apparatus side, or the opposite combination may be used. Thus, substantially the same effect can be obtained. However, in many cases, the use of the same or similar positioning method in both apparatus is simple and results in the good positioning accuracy.

Moreover, the fixing method of the imaging medium in the printing apparatus is substantially the same as in the imaging apparatus. Therefore, even in a case where the habit such as deformation is formed in the imaging medium, the habit is positively used so that the imaging medium can be fixed with high accurate positioning. Since the design of the plate cylinder is set to be the same or substantially the same in both apparatus, the influence of curls exerted on the imaging medium is substantially the same in both apparatus.

The laser array or the fiber array is generally used as an energy beam irradiation source of the imaging apparatus. In either case, the distance between the imaging head including the optical system for condensing the emitted beams and the imaging medium is small, and the depth of focus is extremely small such as several tens of $\mu$m. In consideration of the accuracy of the entire assembly, the vibration of the attaching member of the imaging apparatus and the thickness accuracy of the imaging medium, the diameter accuracy of the attaching member in the imaging apparatus is about ±5 $\mu$m. Conventionally, there was no imaging apparatus in which the surface of the attaching member was subjected to coating process or some contrivance so that the attaching member is not heated, in order to obtain the diameter accuracy of the attaching member in the imaging medium.

Generally, the imaging medium attaching member of the imaging apparatus is formed of aluminum of 6000 family, e.g., A6061,which is generally called corrosion resisting aluminum, and its surface hardness of $H_B$ ranges from 30 to 95 of Brinell hardness. On the other hand, the imaging medium using the metal as the base material is formed of aluminum of A1000 family, e.g., A1100, which is generally called pure aluminum, and its surface hardness of $H_B$ ranges from 23 to 44.

As mentioned above, the difference between the attaching member of the imaging medium and the base material of the imaging member in the hardness is small. For this reason, the following problem is considered if the imaging member is used for a long period of time.

That is, a side end portion on the opposite side surface to the imaging surface of the imaging medium, in which the imaging medium is started to be wound around the imaging medium attaching member, rubs against the imaging medium attaching member when the imaging medium is attached thereto. As a result, there is fear that the surface of the imaging medium attaching member is roughened, and that the diameter accuracy of the imaging medium attaching member cannot be maintained.

According to the present invention, in the printing system having the imaging apparatus for generating the change in the imaging characteristic according to imaging data on the imaging medium by the irradiation of the energy beam so as to execute the imaging and the printing apparatus for printing on the recording medium by supplying ink to the imaged imaging medium, the imaging medium is subjected to the following processes, thereby eliminating the above-mentioned problem in advance.

That is, at the time of winding the imaging medium around the attaching member of the imaging apparatus, the side end portion on the opposite side surface to the imaging surface of the imaging medium, in which the imaging medium is started to be wound around the imaging medium attaching member, is chamfered. Or, at the time of cutting the imaging medium to the predetermined size to be wound around the attaching member, the imaging medium is cut and processed from the opposite side surface of the imaging surface.

In the imaging apparatus according to the above embodiment of the present invention, the surface of the imaging medium attaching member is subjected to a coating process such as electroless plating at low temperature with nickel or the like. This process is performed not to exert influence on the process accuracy of at least the circumferential surface of the attaching member around which the imaging medium is wound. Thereby, the surface of the attaching member is hardened to a value corresponding to hardened steel of HB 200 or more, in terms of Brinell hardness.

Next, the following will explain a preferred embodiment of each of the imaging apparatus of the present invention, the imaging method, and the printing system with reference to the drawings.

Figure 23:
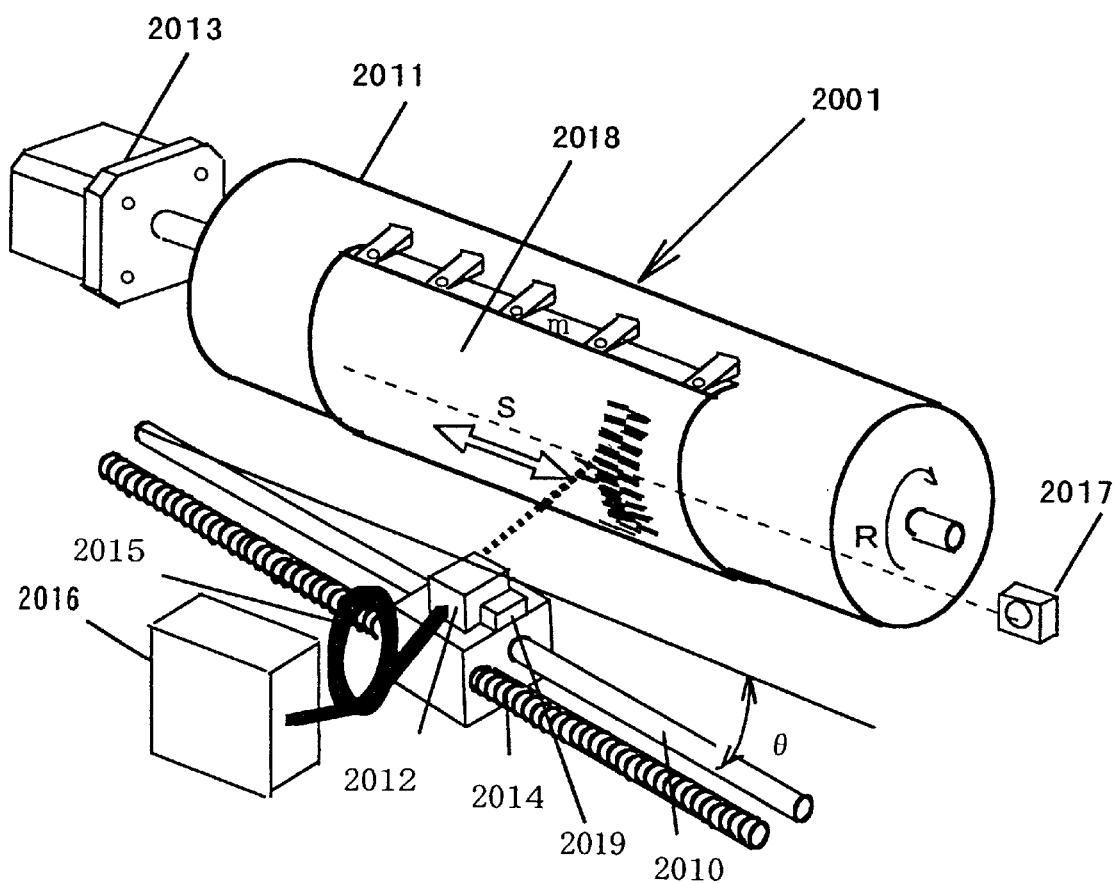
FIG. 23 is a perspective view of an imaging apparatus of the present invention.

FIG. 23 shows a perspective view of one embodiment of the imaging apparatus of the present invention.

As shown in FIG. 23, the imaging apparatus 2001 comprises the plate cylinder 2011 for winding the imaging medium 2018 around its outer surface, the imaging head 2012 including the beam irradiation source and the optical system for condensing beams emitted from the beam irradiation source, the beam irradiation source control unit 2016, and the cable 2015 for connecting the imaging head 2012 and the control unit 2016 to each other, and the ball screw unit 2014 for scanning in an axial direction of the energy beam irradiation apparatus. A guide shaft 2010 is provided to extend parallel to the axis of a ball screw unit 2014 to help move the ball screw unit 2014 straight. The guide shaft 2010 is dispensable as long as the ball screw unit 2014 can be moved straight with sufficient precision.

With respect to the rotation axis of the plate cylinder 2011 serving as the attaching member for winding the imaging medium 2018 on its outer surf ace, the shaft of the ball screw unit 2014, which executes the scanning in the axial direction of the energy beam irradiation apparatus, is inclined at only θ corresponding to a ratio of the scanning speed to the axial direction of the energy beam irradiation apparatus to the peripheral speed of the imaging medium 2018 wound around the plate cylinder 2011.

The distance between the imaging head 2012 and the imaging medium 2018 is controlled such that the beams are condensed on the surface of the imaging medium. The output of the beam irradiation source is controlled based on a value of a laser power detector 2017. And, the output of the beam irradiation source is controlled in order to sufficiently generate the change in the physical properties such as physical projections and depressions or the change in solubility to solvent at the beam irradiation section and the non-radiation section of the imaging medium 2018.

Then, when the imaging of the print pattern is executed, the plate cylinder 2011 around which the imaging medium 2018 is wound is rotated in a direction of an arrow R of the figure directly by use of the drive motor 2013 such as a pulse motor or through a change gear. In addition, the beam irradiation source is switched according to imaging data as moving the imaging head 2012 fixed onto the ball screw unit 2014 in a direction of an arrow S in the figure.

Figure 27A:
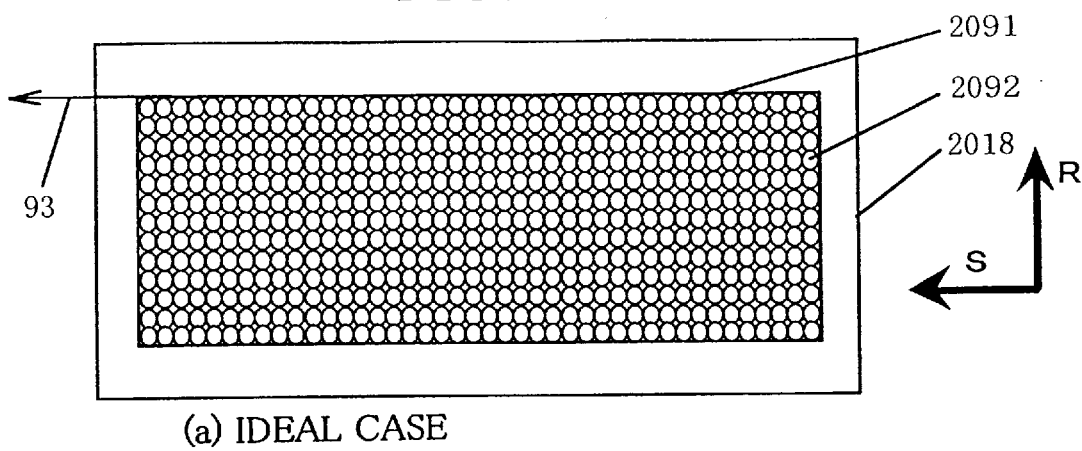
FIGS. 27A to 27C are explanatory views of an image shape created by an imaging apparatus of the present invention.
Figure 27B:
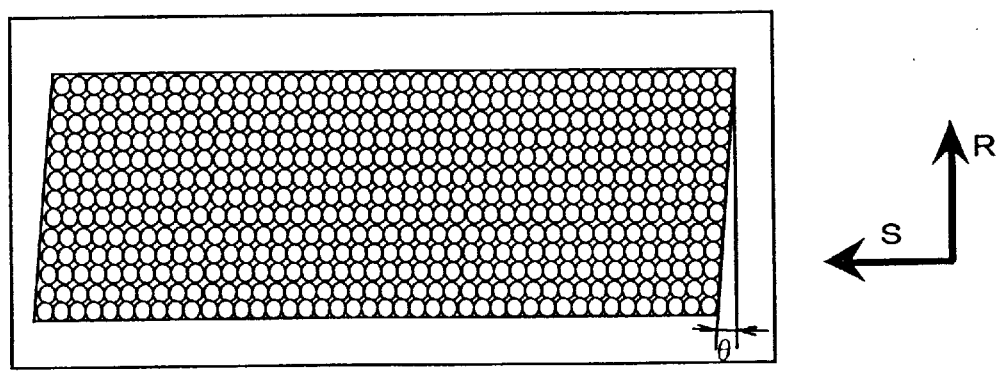
Figure 27C:
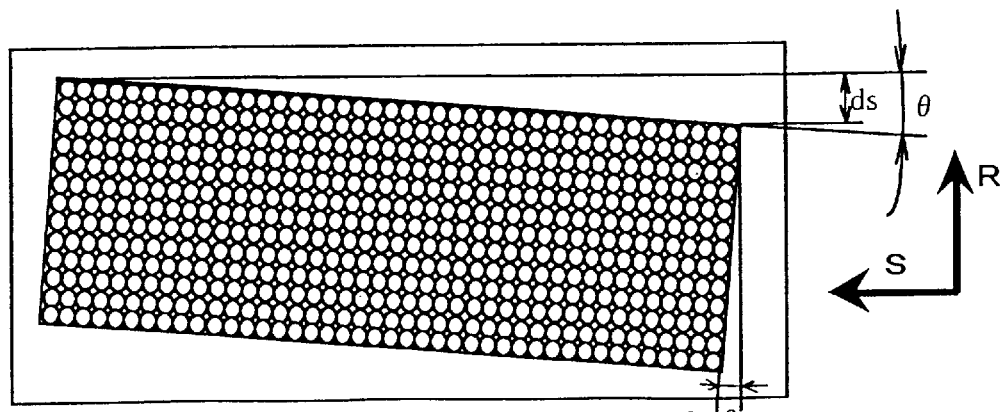

In this way, the change in the physical properties according to two-dimensional imaging data such as physical projections and depressions or the change in solubility to solvent is generated on the surface of the imaging medium. For example, even if imaging data of a rectangle is imaged as scanning in the axial direction of the energy beam irradiation apparatus and the circumferential direction of the imaging medium 2018 wound around the plate cylinder 2011 at the same time, the two-dimensional imaging pattern formed on the surface of the imaging medium is not distorted to a parallelogram as in FIG. 27C. If the direction of scanning by the beam irradiation apparatus in FIG. 23 is not inclined, the imaging pattern is formed as shown in FIG. 27B. Specifically, the imaging pattern is not inclined relative to the external of the imaging medium 2018, but distorted into a parallelogram.

Figure 24:
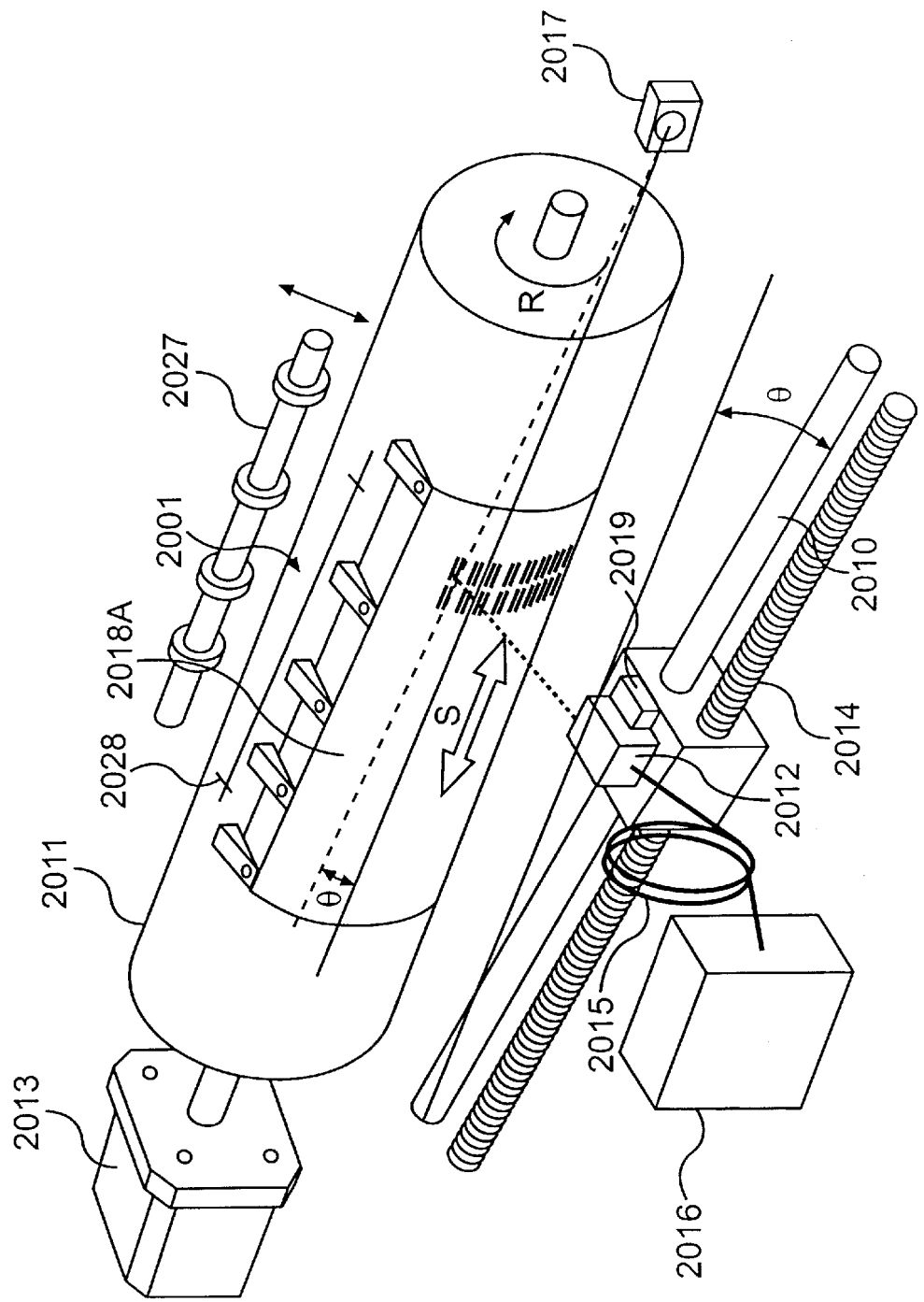
FIG. 24 is a perspective view of an imaging apparatus of one embodiment of the present invention.

FIG. 24 shows a perspective view of one embodiment of another imaging apparatus of the present invention.

As shown in FIG. 24, the imaging apparatus 2001 comprises the plate cylinder 2011 for winding the imaging medium 2018A around its outer surface, the imaging head 2012 including the beam irradiation source and the optical system for condensing beams emitted from the beam irradiation source, the control unit 2016, and the cable 2015 for connecting the imaging head 2012 and the control unit 2016 to each other.

The imaging medium 2018A is fixed to the plate cylinder 2011 to be inclined by the ratio of the scanning speed in the axial direction of the energy beam irradiation apparatus to the peripheral speed of the imaging medium 2018A wound around the plate cylinder 2011. The imaging head 2012 is fixed onto a ball screw unit 2014, which moves to be inclined with respect to the rotation axis of the plate cylinder 2011 by the ratio of the scanning speed to the axial direction of the energy beam irradiation apparatus to the peripheral speed of the imaging medium 2018A wound around the plate cylinder 2011. The distance between the imaging head 2012 and the imaging medium 2018A is controlled such that the beams are condensed on the surface of the imaging medium.

The output of the beam irradiation source is controlled based on the value of the laser power detector 2017. That is, the output of the beam irradiation source is controlled in order to sufficiently generate the change in the physical properties such as physical projections and depressions or the change in solubility to solvent by the beam irradiation section and the non-radiation section of the imaging medium 2018A.

Then, when the imaging of the print pattern is executed, the plate cylinder 2011 around which the imaging medium 2018 is wound is rotated in a direction of an arrow R of the figure directly by use of the drive motor 2013 such as a pulse motor or through the change gear. In addition, the beam irradiation source is switched according to imaging data as moving the imaging head 2012 fixed onto the ball screw unit 2014 in a direction of an arrow S substantially parallel to the shaft of the plate cylinder in the figure.

Thus, the change in the physical properties according to two-dimensional imaging data such as physical projections and depressions or the change in solubility to solvent is generated on the surface of the imaging medium.

As mentioned above, it can be easily considered that the plurality of beam irradiation sources, which are capable of independently driving, is used as the method for improving the performance of the imaging apparatus.

For example, suppose that n lines continuous to a fast scan direction emitted simultaneously from n beam irradiation sources are imaged using the imaging head having n beam irradiation sources. At this time, dot pitches $d_p$ for achieving a predetermined resolution r are 1/r.

The direction R, which is substantially parallel (inclined only an angle θ) to the lines to be imaged by the rotation of the plate cylinder 2011, is defined as a fast scan direction. Then, the direction S, which is substantially parallel (inclined only an angle θ) to the lines to be imaged by moving the imaging head 2012, is defined as a slow scan direction. The imaging head is shifted in the S direction by a predetermined distance s after finishing the imaging corresponding to one revolution in the fast scan direction. The predetermined distance s is n times as large as the dot pitch $d_p$ on the imaging medium. Thereafter, next n lines are imaged, and a series of operations is repeated so that the imaging of the entire imaging area is finished.

By use of n beam irradiation sources, time required for imaging can be reduced to 1/n when the resolution is the same. In order to increase the resolution j times, it is needed that the dot pitch be set to $d_p/j$ and that the distance of the movement of the imaging head be set to $d_p \times n/j$. Then, time required for imaging is multiplied by j/n times.

For example, when the imaging medium is attached to the imaging medium attaching member, if the outer diameter is 160 mm, a modulation frequency of laser is 1 MHz and dot density is 2540 dpi (dot pitch is 10 μm), the rotation speed of the imaging medium is 1193. 7 rpm, and the peripheral speed is 10 m/sec. Also, if the number of beam irradiation sources of the imaging head is 40, the feeding of the energy beam in the direction, which is substantially the same as the direction of the rotation axis, is 400 μm/rotation and the scanning speed is 8 mm/sec.

Therefore, the inclination θ of the imaging medium becomes 0.046°. Then, the imaging medium is inclined about 0.4 mm with respect to the axial length of 480 mm to be used as an imaging area corresponding to an A3 horizontal size.

Figure 25:
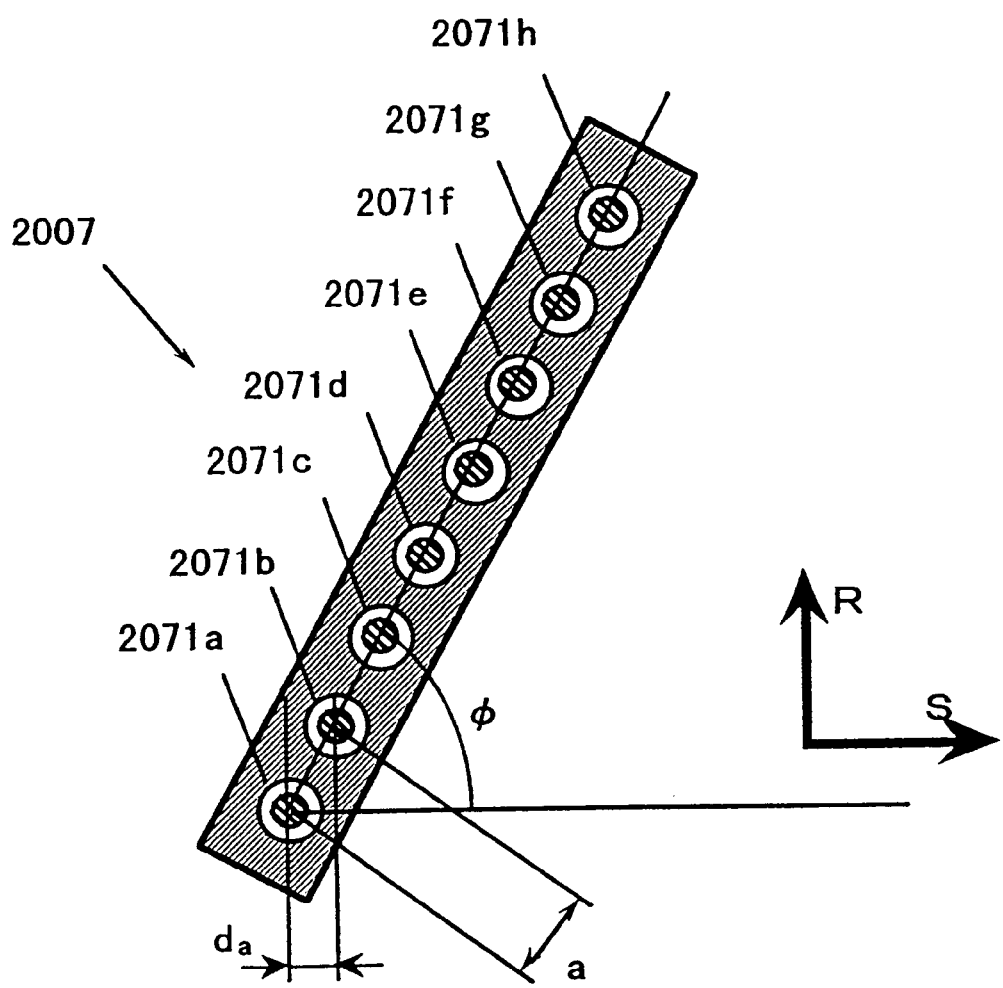
FIG. 25 is a front view explaining an inclination of an array.

The use of the laser diode array or the fiber array as one of the methods using the plurality of beam irradiation sources has been already mentioned. In many cases, however, it is impossible to arrange the beam irradiation sources, i.e., the respective emission ends to be close to each other without any space in either of the methods of the laser diode array and the fiber array. In order to perform the imaging in the imaging range of the imaging medium without any space, the array is often inclined to the slow scan direction S by a predetermined angle φ as shown in FIG. 25. The array 2007 comprises eight beam irradiation sources 2071a to 2071h, and its inclination angle φ is defined by the following equation (2).

$$\cos\phi = d_a/a \qquad \text{Eq. (2)}$$

where a is the interval between the beam irradiation sources, a dot pitch at light source surface pitch $d_a$ that is obtained by converting the dot center pitch corresponding to the predetermined resolution in the slow scan direction S to the dimension on the beam irradiation source surface, which is obtained by dividing the medium surface dot pitch $d_p$ by the magnification of the optical system. For example, when the resolution is 2540 dpi, i.e., $d_p=10$ μm and the magnification of the optical system is ¼, $d_a=40$ μm is met.

The feature of the imaging apparatus of the present invention is the imaging apparatus for generating the change in the imaging characteristic according to imaging data on the imaging medium by the irradiation of the energy beam so as to execute the imaging wherein the imaging apparatus comprises the attaching member for winding the imaging medium, means for rotating the attaching member, scanning means for scanning the energy beam irradiation apparatus to substantially the same direction as the axial direction of the attaching member, and positioning means for positioning the imaging medium such that a reference direction of the imaging area is inclined against the shaft of the attaching member as a rotation center substantially by the ratio of the scanning speed of the scanning means of the energy beam to the peripheral speed of the surface of the imaging medium wound around the attaching member.

Figure 26:
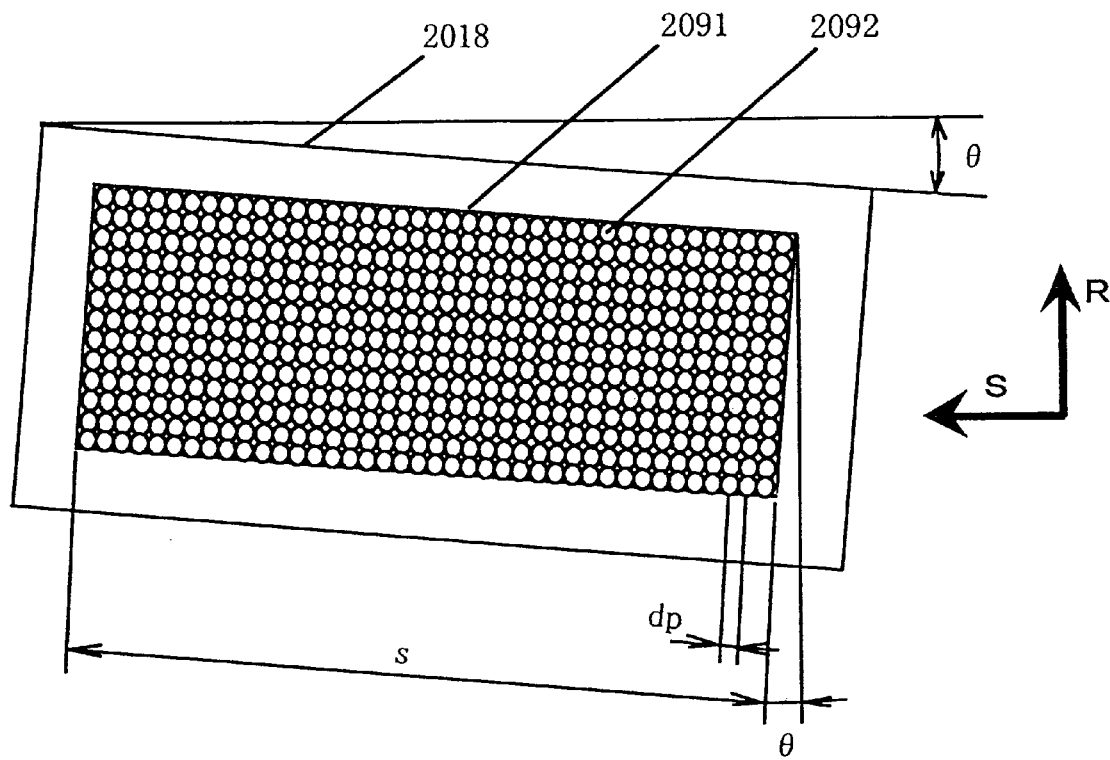
FIG. 26 is an explanatory view of an image shape created by an imaging apparatus of the present invention.

FIG. 26 shows the relationship between the imaging medium attaching direction and the image to be generated in connection with FIG. 23. As mentioned above, the imaging medium mounting direction is inclined by θ, thereby making it possible to obtain the imaging which is the same as the ideal state shown in FIG. 27A.

By the positioning the imaging medium to be inclined as mentioned above, the image on the imaging medium is formed at the correct position without being inclined to the imaging medium. Therefore, when the operator attaches a printing plate, which is the imaging medium prepared by the above-mentioned method, to the printing apparatus, the operator does not have to incline the imaging medium. As a result, the positioning can be carried out without taking extra time.

Also, in a register pin system in which the positioning holes provided on a plate blank in advance is used to position the printing plate in the printing apparatus, the image on the imaging medium can be formed at the accurate position without being inclined to the imaging medium. Therefore, it is possible to use the printing plate prepared by a direct plate-making. Also, the position of the printing plate in the printing apparatus can be extremely easily adjusted. Also, in the printing apparatus having no plate twisting and adjusting mechanism of the printing plate, the printing plate can be easily attached.

The corrected positioning method in the printing apparatus, which is substantially the same as in the imaging apparatus and the method in which the inclination caused when the imaging medium is cancelled, is favorably used. Thus, the load of attaching the printing plate in the printing apparatus and that of positioning the plate of each color in the multicolor printing can be greatly reduced. Note that the same effect can be obtained by the method in which inclination on the imaging apparatus side is not done and the similar inclination is done to the printing apparatus side, instead. Essentially, in both cases, the inclination at the time of positioning the imaging medium may be made different by the angle θ. It is needless to say that the direction of the inclination should be such that it cancels the inclination of the imaging area caused by scanning of the energy beam irradiation apparatus of the imaging apparatus.

For example, in the imaging apparatus, in which the positioning holes are provided in the imaging medium in advance and the printing pattern is directly formed in the imaging medium with the energy beams based on the positioning holes, the same plate cylinder as used in the printing apparatus is provided as the imaging medium attaching member, except for the presence and absence of the above-mentioned correction of inclination. Thus, the reference position of attaching the imaging medium to the imaging medium and that of attaching the imaging medium to the printing apparatus can be the same.

In this way, the minute positional shift, which is caused by the difference in the reference attaching position of the imaging medium between the respective apparatus, is eliminated. Also, the minute positional shift, which is caused by the curvature specific to the plate cylinders of each apparatus and the habit of the apparatus caused at the time of winding the imaging medium, are minimized. As a result, the designing and manufacturing cost is reduced by sharing the plate cylinders. Thus, the printing apparatus and the imaging apparatus are structured at reasonable cost.

Even in a case where the complete sharing with the plate cylinders of the printing apparatus cannot be executed due to weight reduction of the plate cylinders of the imaging apparatus, the structure of the imaging medium attaching section is shared. Thus, the minute positional shift, which is caused by the difference in the reference attaching position of the imaging medium between the respective apparatus, can be eliminated. Also, the minute positional shift, which is caused by the curvature peculiar to the plate cylinders of each apparatus and the habit of the apparatus caused at the time of winding the imaging medium, can be minimized. Therefore, it is obvious that the high quality printing in which the positional shift of the similar imaging mediums is small can be carried out as well as the case of the sharing of the plate cylinders. Thus, the structure of the imaging medium attaching section is shared in both apparatus and the main part of the plate cylinder itself is shared, thereby the plate cylinder of the imaging apparatus and that of the printing apparatus can be substantially the same. Also, the outer diameters of the respective plate cylinders are preferably coincide to each other.

FIG. 18 shows an example of the imaging medium in the case where the positioning method of the imaging medium in the present invention is carried out by engaging positioning holes provided in the imaging medium with positing pins provided in the imaging apparatus. FIG. 24 is a perspective view of the imaging apparatus relating to this case.

As shown in FIG. 18, an imaging medium 1018A has a plurality of positioning holes 2181 at the imaging medium head portion and attaching holes 2182 at the imaging medium bottom portion. In the plurality of positioning holes 2181 and the attaching holes 2182, the imaging medium is cut such that two sides, having at least one of two sides along the feeding direction to the plate cylinder and a head side of the imaging medium, intersect at right angles at the time of preparing the imaging medium 2018A. Thereafter, the positioning holes 2181 and the attaching holes 2182 are accurately processed to predetermined shapes by a special-purpose processing machine based on the two sides intersecting at right angles. In the plate making and the printing, the reference attaching position of the imaging medium is set to the plurality of positioning holes 2181. Two sides, that is, the side, serving as a reference of holing, and the head side of the imaging medium, do not necessarily intersect at right angles. However, two sides preferably intersect at right angles since workability increases in the cutting process of the imaging medium, the holing process of the positioning holes 2181, and the packing process of the imaging medium. In many cases, the direction, which is parallel to either one of the sides of the outer shape of the imaging medium or the array direction of the pin hole row, is used as a reference direction of the imaging area.

According to the present embodiment, though the attachment and detachment of the imaging medium to/from the imaging apparatus are the same as the case of θ=0, there is no problem since the angle θ is sufficiently small.

Figure 28:
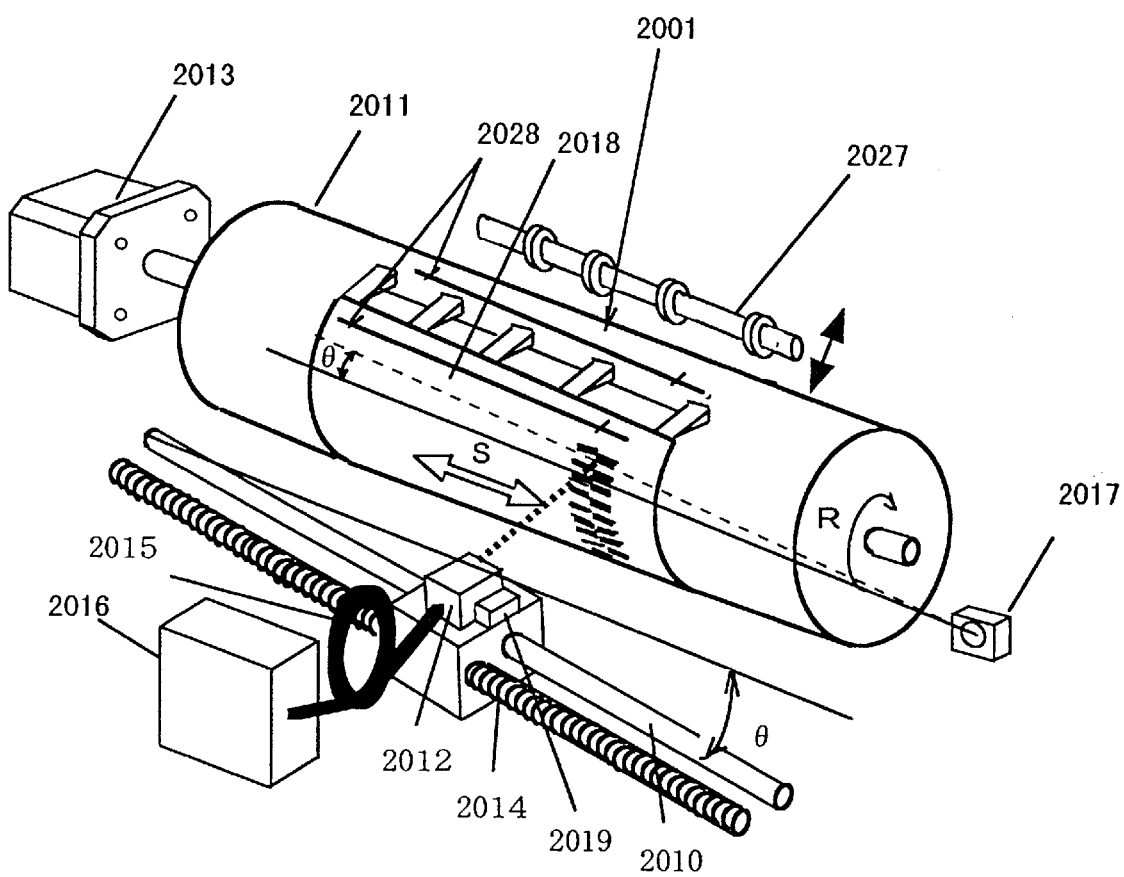
FIG. 28 is a perspective view of an imaging apparatus of one embodiment of the present invention.
Figure 29:
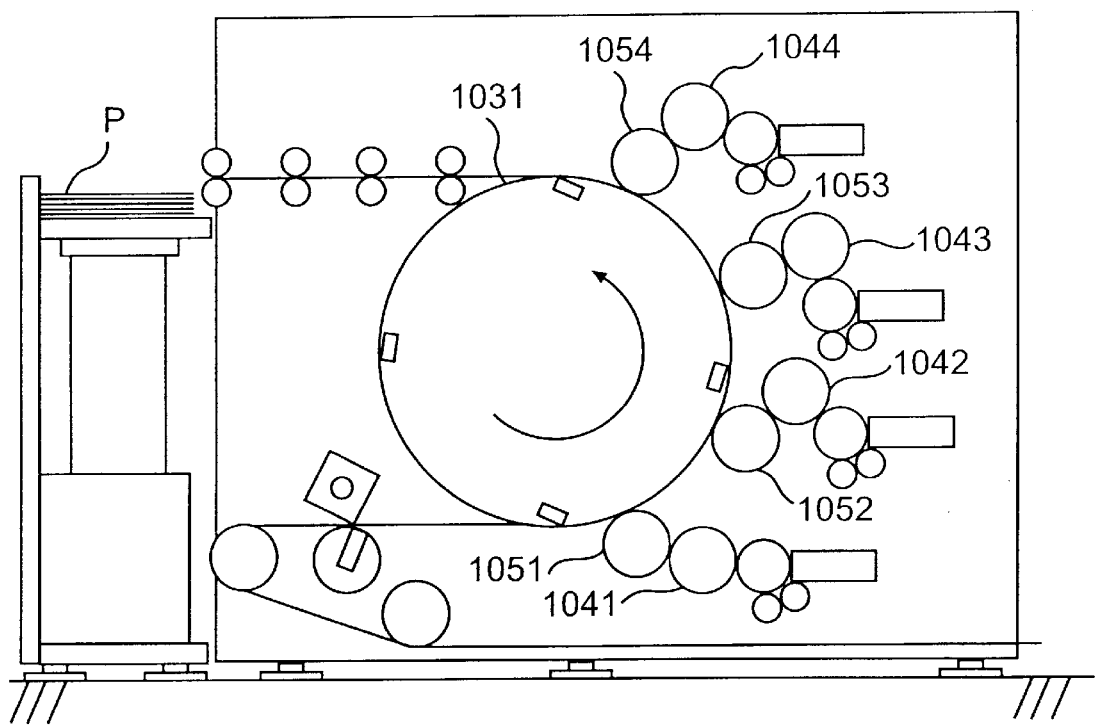
FIG. 29 is a front view of a conventional multicolor printing apparatus disclosed in Unexamined Japanese Patent Publication No. 54-152504.
Figure 30:
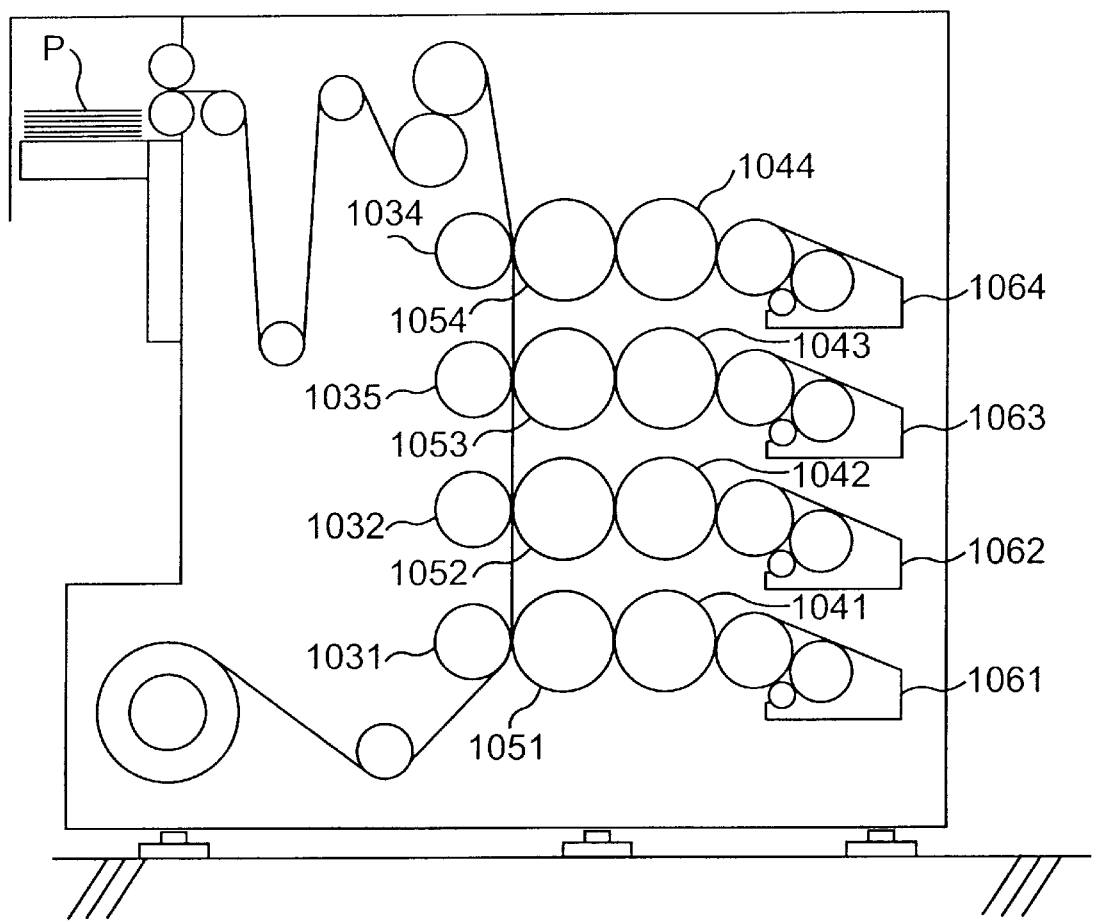
FIG. 30 is a front view of a conventional multicolor printing apparatus disclosed in Examined Japanese Patent Publication No. 55-28860.
Figure 31:
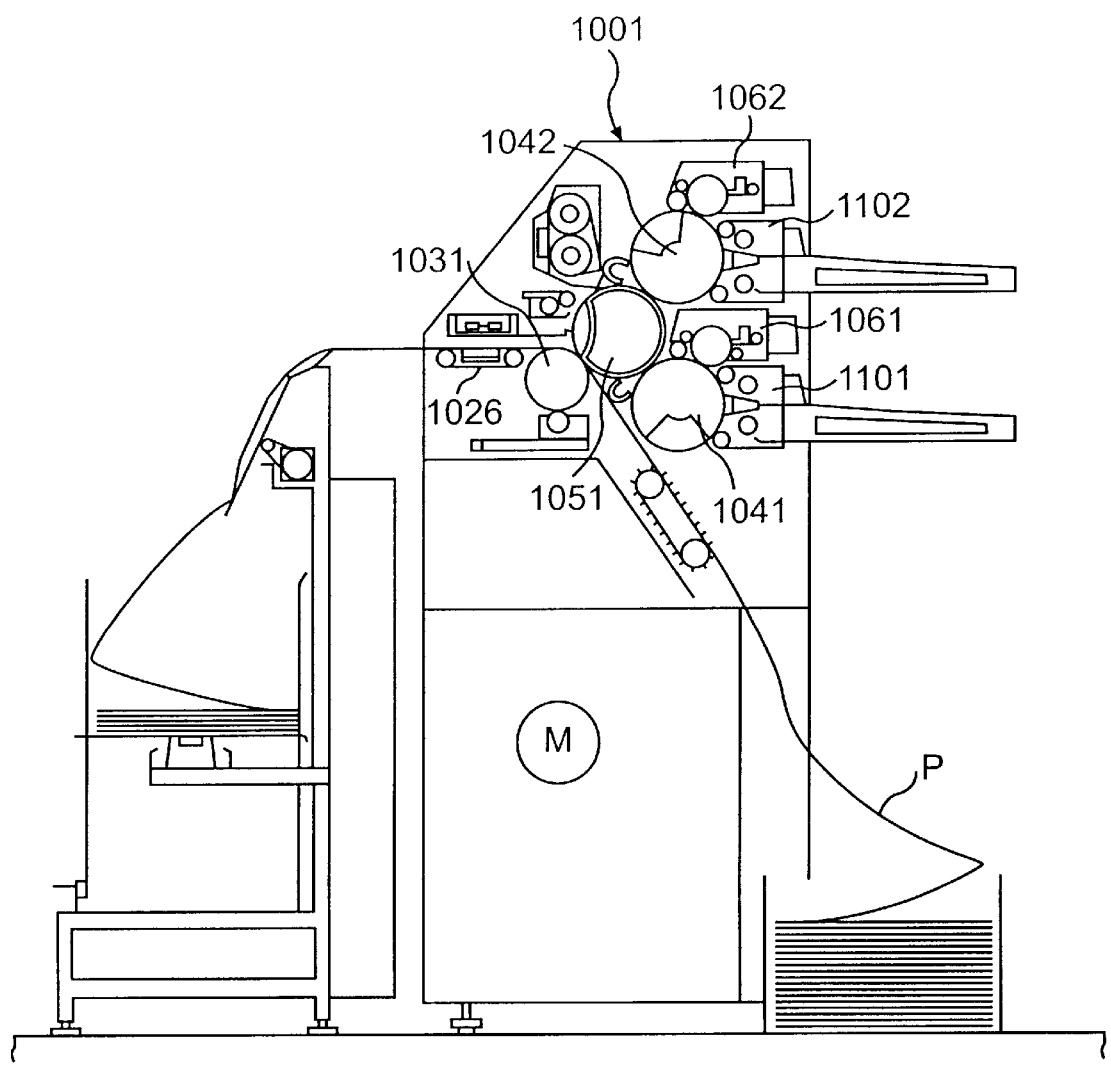
FIG. 31 is a front view of a conventional multicolor printing apparatus disclosed in Examined Japanese Patent Publication No. 3-71983.
Figure 32:
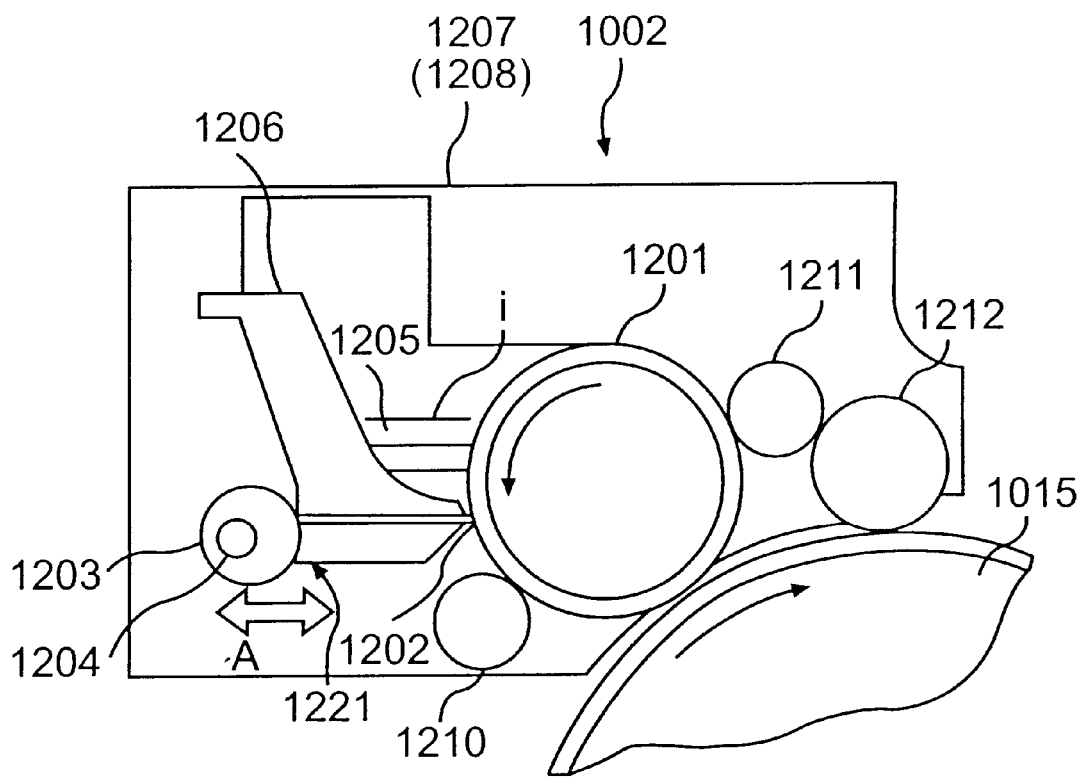
FIG. 32 is a cross-sectional view of a conventional coating apparatus disclosed in Examined Japanese Patent Publication No. 4-68147.
Figure 33:
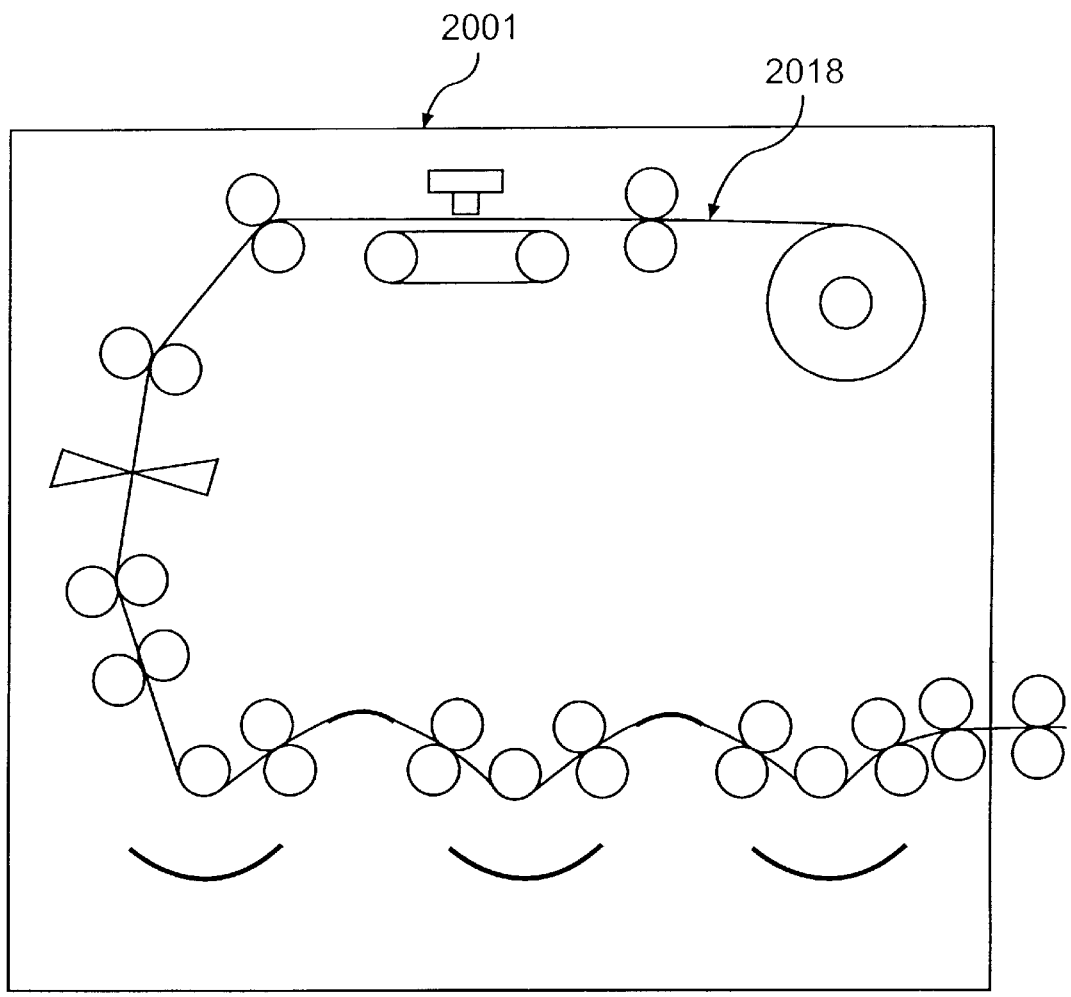
FIG. 33 is a schematic cross-sectional view of a conventional imaging apparatus disclosed in Unexamined Japanese Patent Publication No. 3-24549.
Figure 34:
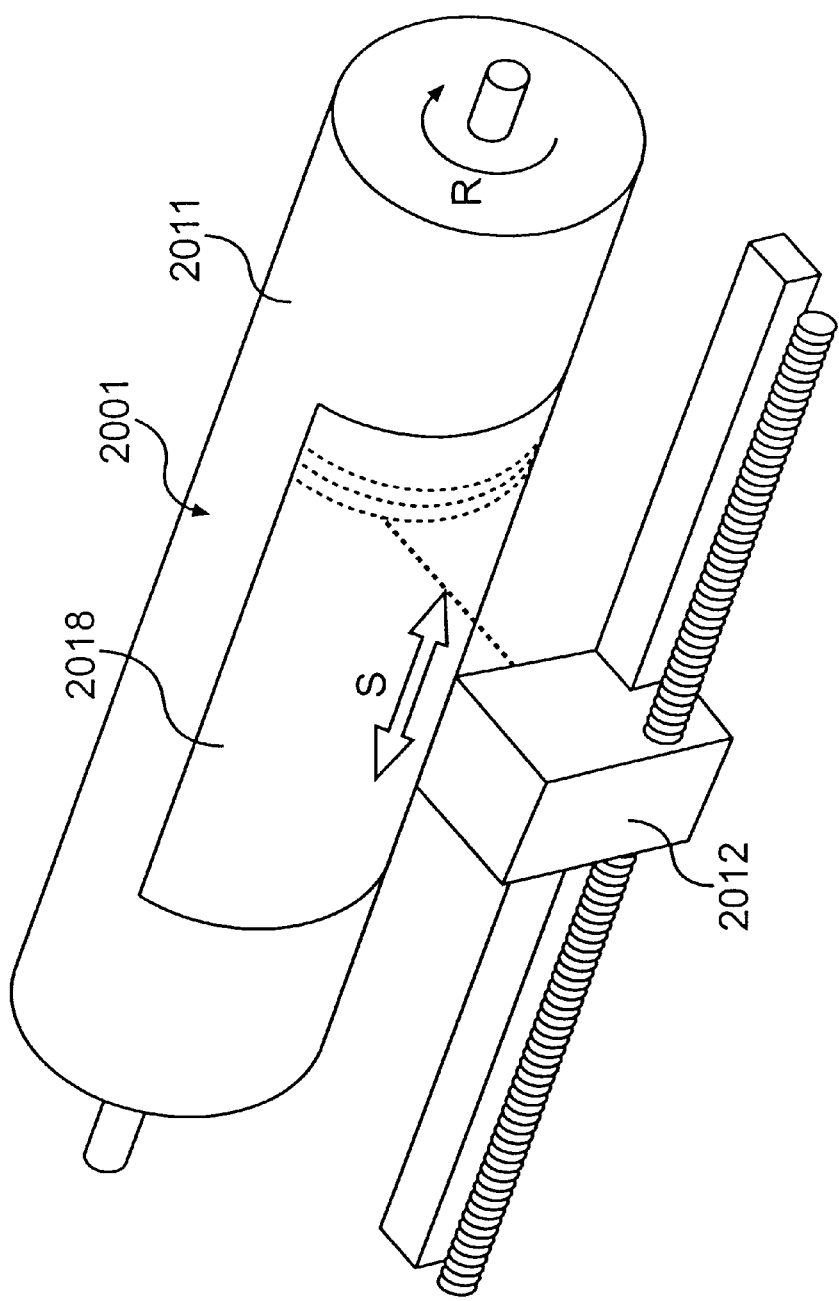
FIG. 34 is a perspective view of a conventional imaging apparatus disclosed in Unexamined Japanese Patent Publication No. 5-8366.
Figure 35:
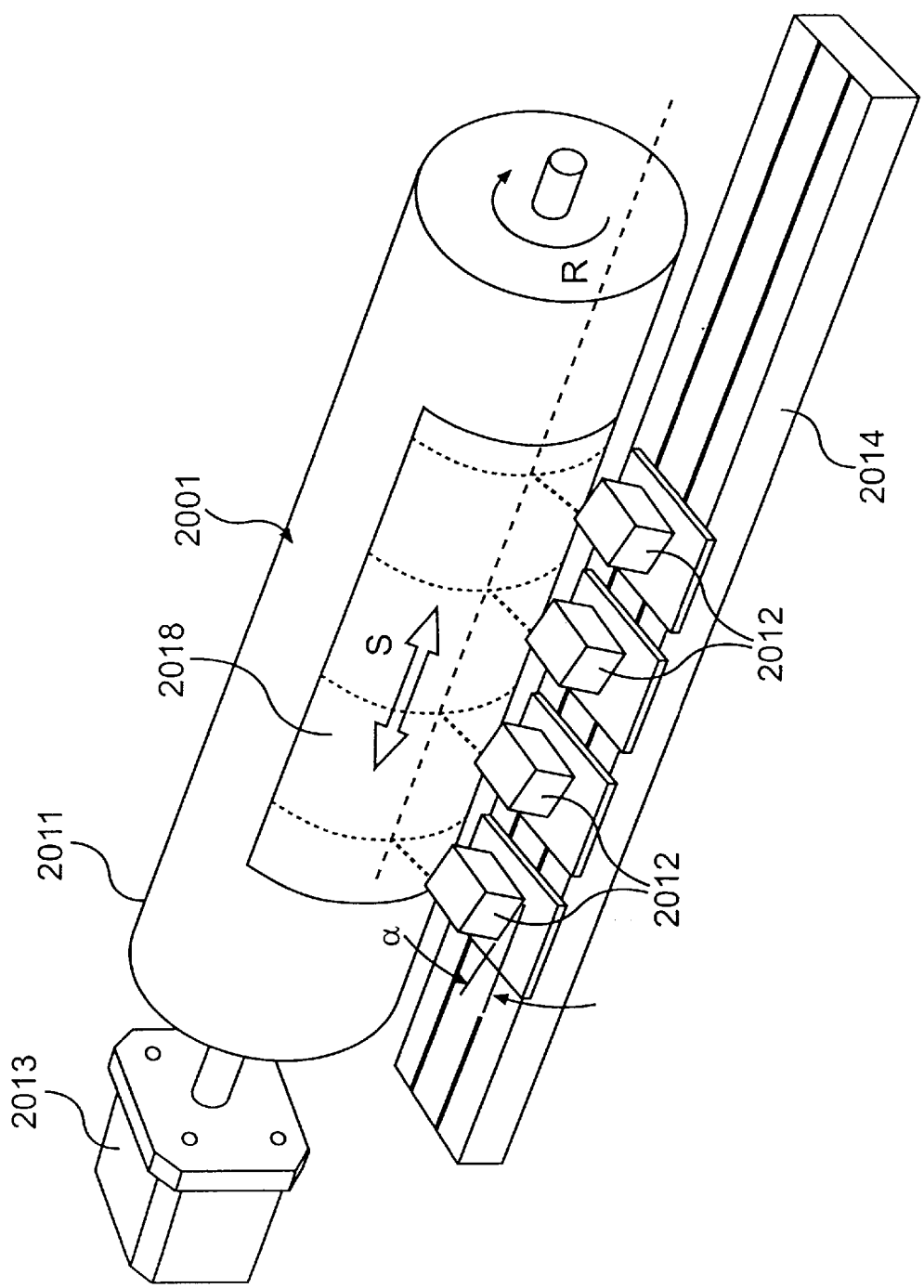
FIG. 35 is a perspective view of a conventional imaging apparatus disclosed in Unexamined Japanese Patent Publication No. 8-72311.

Even in the type of imaging apparatus using the imaging medium having no positioning pin holes as shown in FIG. 28, the attachment and detachment of the imaging medium to/from the imaging apparatus is the same as in the case of θ=0, similar to the type of imaging apparatus using the imaging medium having the positioning pin holes. In this case, it is obvious that there is no problem since the angle θ is sufficiently small.

In either case, although the imaging head is configured to be scanned in the direction inclined by θ than the rotation axial direction of the plate cylinder, the imaging head may be scanned in the direction coinciding to the rotation axial direction of the plate cylinder. In this case, the timing of the beam irradiation is slightly shifted, thereby the image can be prevent from being deformed to the parallelogram.

The printing apparatus to be used in the printing system of the present invention corresponds to the multicolor printing shown in FIGS. 1 and 2.

As mentioned above, the imaging medium positioning method to the plate cylinder and the fixing method in the printing apparatus 1001 is the same as in the imaging apparatus except for no arranged inclination (inclination corrected) in the positioning of the imaging medium in the attaching body for imaging. Then, there is no minute positional shift, which is caused by the difference in the reference position for attaching imaging medium between the printing apparatus and the imaging apparatus.

The positioning method of the imaging medium to each of the plate cylinders 1141 to 1144 of the printing apparatus 1001 is substantially the same as the positioning method of the imaging medium to the plate cylinders 2011 of the imaging apparatus 2001.

For example, when the imaging medium is positioned by the method in which the positioning holes are provided in the imaging medium and the positing pins are provided in the plate cylinder side in the imaging apparatus, the same method or the method for detecting the positions of the positioning holes is preferably used in the printing apparatus. Also, when the imaging medium is positioned by the method using the abutting portion of the imaging medium and the abutment receiving portion of the plate cylinder, the same method is preferably used even in the printing apparatus. When the sufficient positioning accuracy can be expected, the imaging medium may be positioned by the method using the pin holes in the imaging apparatus, and is positioned by the abutting method In the printing apparatus side, or the opposite combination may be used. Thus, substantially the same effect can be obtained. Generally, in many cases, the use of the same or similar positioning method in both apparatus is simple and results in the good positioning accuracy.

Moreover, the fixing method of the imaging medium in the printing apparatus is substantially the same as in the imaging apparatus. Therefore, even in a case where the habit such as deformation is formed in the imaging medium in the imaging apparatus side, the habit is positively used so that the imaging medium can be fixed with high accurate positioning. Since the design of the plate cylinder is set to be the same or substantially the same in both apparatus, influence of curls exerted on the imaging medium is substantially the same in both apparatus.

EXAMPLE 1

The ink unit of FIG. 4 was attached to the printing apparatus of the present invention shown in FIGS. 1 and 2, and a print evaluation test was performed at printing speed 5000 sheets/hour under conditions of room temperate of 23° C. and humidity of 40%.

As a result, as shown in Table 1, in the printing apparatus of the present invention shown in FIGS. 1 and 2, no striped defects were generated before the number of printed sheets reached 1500 as compared with the conventional coating apparatus shown in Examined Japanese Patent Publication No. 4-68147 in which striped defects were generated when the number of printed sheets reached 100.

As the conditions of the rollers and the blades, one-layer rubber roller having the rubber hardness of 43° of JISA (corresponding to a durometer A type by Shore), the outer diameter of 60.1 mm was used as the form roller 1201. One-layer rubber roller having the rubber hardness of 35° of JISA, the outer diameter of 30.1 mm was used as the auxiliary form roller 1212. The stainless roller having the outer diameter of 19.6 mm was used as the ink distributing rollers 1210, 1211.

As the doctor blade 1202 and the flat blade 1209, steel having the thickness of 0.15 mm, the curvature at the front edge of the leading side of the scraper portion was used, and the curvatures of the doctor blade 1202 and the flat blade 1209 were 50 μm, and 15 μm, respectively. The distance between the doctor blade 1202 and the flat blade 1209 was set to 2 mm. Wood free paper, 70 Kg at Shiroku-han size (788 mm×1091 mm), and A3-size was used as the sheets.

EXAMPLE 2

The ink unit of FIG. 8 was attached to the printing apparatus of the present invention shown in FIG. 1, and a print evaluation test was performed at printing speed 5000 sheets/hour under conditions of room temperate of 23° C. and humidity of 40%.

As a result, as shown in Table 1, in the printing apparatus of the present invention shown in FIGS. 1 and 2, no striped defects were generated before the number of printed sheets reached 2000 as compared with the conventional coating apparatus shown in Examined Japanese Patent Publication No. 4-68147 in which striped defects were generated when the number of printed sheets reached 100.

As the conditions of the rollers and the blades, one-layer rubber roller having the rubber hardness of 43°, the outer diameter of 60.1 mm was used as the form roller 1201. One-layer rubber roller having the rubber hardness of 35°, the outer diameter of 30.1 mm was used as the auxiliary form rollers 1212, 1213. The stainless roller having the outer diameter of 19.6 mm was used as the ink distributing rollers 1210, 1211.

As the doctor blade 1202 and the flat blade 1209, steel having the thickness of 0.15 mm, the curvature at the front edge of the leading side of the scraper portion was used, and the curvatures of the doctor blade 1202 and the flat blade 1209 were 50 μm, and 15 μm, respectively. The distance between the doctor blade 1202 and the flat blade 1209 was set to 2 mm. Wood free paper, 70 Kg at Shiroku-han size (788 mm×1091 mm), and A3-size was used as the sheets.

EXAMPLE 3

The ink unit of FIG. 9 was mounted on the printing apparatus of the present invention shown in FIGS. 1 and 2, and a print evaluation test was performed at printing speed 5000 sheets/hour under conditions of room temperate of 23° C. and humidity of 40%.

As a result, as shown in Table 1, in the printing apparatus of the present invention shown in FIGS. 1 and 2, no striped defects were generated before the number of printed sheets reached 1000 as compared with the conventional coating apparatus shown in Examined Japanese Patent Publication No. 4-68147 in which striped defects were generated when the number of printed sheets reached 100.

As the conditions of the rollers and the blade, one-layer rubber roller having the rubber hardness of 43°, the outer diameter of 60.1 mm was used as the form roller 1201. One-layer rubber roller having the rubber hardness of 35°, the outer diameter of 30.1 mm was used as the auxiliary form rollers 1212, 1213. The stainless roller having the outer diameter of 19.6 mm was used as the ink distributing rollers 1210, 1211.

As the doctor blade 1202, steel having the thickness of 0.15 mm, the curvature at the front edge of the leading side of the scraper portion was used, and the curvature of the doctor blade 1202 was 50 μm. Wood free paper, 70 Kg at Shiroku-han size (788 mm×1091 mm), and A3-size was used as the sheets.

EXAMPLE 4

The ink unit of FIG. 9 was attached to the printing apparatus of the present invention shown in FIGS. 1 and 2, and a print evaluation test was performed at printing speed 5000 sheets/hour under conditions of room temperate of 23° C. and humidity of 35%.

As a result, as shown in Table 1, in the printing apparatus of the present invention shown in FIGS. 1 and 2, no striped defects were generated even when the number of printed sheets reached 6000 as compared with the conventional coating apparatus shown in Examined Japanese Patent Publication No. 4-68147 in which striped defects were generated when the number of printed sheets reached 100.

As the conditions of the rollers and the blade, two-layer polyurethane rubber roller having the outer layer rubber hardness of 40°, the inner layer rubber hardness of 25°, and the outer diameter of 59.5 mm was used as the form roller 1201. One-layer polyurethane rubber roller having the rubber hardness of 35°, the outer diameter of 30.2 mm was used as the auxiliary form rollers 1212, 1213. The Rilsan roller having the outer diameter of 19.6 mm was used as the ink distributing rollers 1210, 1211.

As the doctor blade 1202, steel having the thickness of 0.15 mm, the curvature at the front edge of the leading side of the scraper portion was used, and the curvature of the doctor blade 1202 was 30 μm. Wood free paper, 70 Kg at Shiroku-han size (788 mm×1091 mm), and A3-size was used as the sheets.

The evaluation results of Examples 1 to 4 are as shown in Table 1. At the time of using the ink unit disclosed in Examined Japanese Patent Publication No. 4-68147, striped defects were generated when the number of printed sheets reached 100. It was confirmed that the number of sheets, which was printed before striped defects were generated, was increased to 1500 in Example 1, 2000 in Example 2, 100 in Example 3, and 6000 or more in Example 4.

TABLE 1

Number of sheets before striped defects are generated

| Apparatus Specification | Number of Printed Sheets |
| --- | --- |
| Conventional Apparatus (Examined Japanese Patent Publication No. 4-68147) | 100 |
| Example 1 | 1500 |
| Example 2 | 2000 |
| Example 3 | 1000 |
| Example 4 | 6000 or more |

INDUSTRIAL APPLICABILITY

As mentioned above, according to the multicolor printing apparatus, the back face printing can be easily carried out with the minimum movement of the recording medium and good workability.

According to the present invention, there can be provided the multicolor printing apparatus having a good printing quality at low cost without requiring a large space for setting the printing apparatus.

According to the coating apparatus of the present invention, even if striped detects are generated on the surface of the coated ink film in the circumferential direction because of clogging with paper dust, the coated ink film surface is flattened by the flattening material, thereby the generation of striped detects can not easily occurs on the surface of the coated ink film in the circumferential direction.

According to the present invention, the imaging medium prepared by the imaging apparatus can be positioned only by attaching the imaging medium to the printing apparatus, the imaging medium positioning operation can largely reduced, the printing quality can be improved without taking much time, no large setting space is needed, so that the imaging apparatus having good workability can be easily structured.

According to the imaging apparatus of the present invention, the imaging apparatus executes the imaging by scanning the beam irradiation apparatus in substantially the same direction as the rotation axis of the attaching member at a fixed speed as continuously rotating the attaching member around which the imaging medium is wound at a fixed speed, thereby the image is formed without being inclined to the imaging medium, the imaging medium can be easily positioned as the imaging apparatus and the printing apparatus are separately maintained, and the image position on the imaging medium is always correctly set without being inclined, with the result that there can be easily configured the imaging apparatus, which can easily execute the positioning of the printing plate in the printing apparatus, and there can be easily configured the printing system having good workability.

What is claimed is:

1. A multicolored printing apparatus comprising:

a plurality of blanket cylinders normally-contacting to an impression cylinder of a plurality of impression cylinders;

plate cylinders normally-contacting to the respective blanket cylinders;

ink coating apparatus for coating the respective plate cylinders with ink, wherein said ink coating apparatus are arranged in a substantially vertical direction parallel to the direction of gravity;

a feeding apparatus for feeding sheets of recording mediums to said printing apparatus; and a discharging apparatus for discharging sheets of recording mediums, wherein said feeding apparatus and said discharging apparatus being provided on a side opposite to a setting side of said ink coating apparatus with respect to said blanket cylinders; and a discharge station on which the printed sheets of recording mediums are stacked after the printed sheets of recording mediums are discharged between a final blanket cylinder and a final impression cylinder, said discharge station is configured to be horizontally rotatable, thereby said stacked printed sheets of recording mediums can be rotatable in a 180° arc with respect to the direction of a normal line.

2. The multicolored printing apparatus according to claim 1, further comprising discharge station moving means for moving said discharge station to the feeding position of said recording medium of said feeding means after said stacked printed sheets of recording mediums are rotated in a 180° arc with respect to the direction of the normal line of said recording mediums.

3. A duplex printing method, in a printing apparatus comprising a plurality of blanket cylinders normally-contacting to an impression cylinder, plate cylinders normally-contacting to the respective blanket cylinders, and ink coating apparatus, arranged in a substantially vertical direction parallel to the direction of gravity, for coating the respective plate cylinders with ink, said duplex printing method comprising the steps of:

feeding recording mediums to said blanket cylinders of said printing apparatus from a recording medium feeding position on a side opposite to a side where said ink coating apparatus are arranged;

passing said sheets of recording mediums between said blanket cylinders and said impression cylinder so as to transfer an ink image onto a first surface of said recording mediums;

stacking said recording mediums discharged from said opposite side on a discharge station;

rotating said discharge station in a 180° arc with respect to the direction of a normal line of said recording mediums so as to feed said stacked recording mediums to said recording medium feeding position; and passing said recording mediums again between said blanket cylinders and said impression cylinder so as to transfer an ink image onto a second surface of said recording mediums.

* * * * *

UNITED STATES PATENT AND TRADEMARK OFFICE
CERTIFICATE OF CORRECTION

PATENT NO. : 6,227,109 B1
DATED : May 8, 2001
INVENTOR(S) : Inoue et al.

It is certified that error appears in the above-identified patent and that said Letters Patent is hereby corrected as shown below:

<u>Drawings,</u>
Figs. 3, 4, and 24, delete the words "PRIOR ART" appearing below each Figure.

Signed and Sealed this

Fourth Day of February, 2003

JAMES E. ROGAN
*Director of the United States Patent and Trademark Office*